United States Patent
Schaefer et al.

(10) Patent No.: US 11,907,061 B2
(45) Date of Patent: *Feb. 20, 2024

(54) METHODS AND DEVICES FOR ERROR CORRECTION

(71) Applicant: Lodestar Licensing Group LLC, Evanston, IL (US)

(72) Inventors: Scott E. Schaefer, Boise, ID (US); Aaron P. Boehm, Boise, ID (US)

(*) Notice: Subject to any disclaimer, the term of this patent is extended or adjusted under 35 U.S.C. 154(b) by 12 days.

This patent is subject to a terminal disclaimer.

(21) Appl. No.: 17/559,531

(22) Filed: Dec. 22, 2021

(65) Prior Publication Data

US 2022/0188186 A1    Jun. 16, 2022

Related U.S. Application Data

(63) Continuation of application No. 16/579,219, filed on Sep. 23, 2019, now Pat. No. 11,216,333.

(Continued)

(51) Int. Cl.
*G06F 11/00* (2006.01)
*G06F 11/10* (2006.01)
(Continued)

(52) U.S. Cl.
CPC ........ *G06F 11/1012* (2013.01); *G06F 11/073* (2013.01); *G06F 11/0793* (2013.01); *G06F 11/1068* (2013.01); *G06F 13/28* (2013.01)

(58) Field of Classification Search
CPC ............... G06F 11/1012; G06F 11/073; G06F 11/0793; G06F 11/1068; G06F 11/102; G06F 13/28
See application file for complete search history.

(56) References Cited

U.S. PATENT DOCUMENTS

| 6,285,681 B1 | 9/2001 | Kolze et al. |
| 7,558,887 B2 | 7/2009 | Gower et al. |

(Continued)

FOREIGN PATENT DOCUMENTS

| CN | 101622603 A | 1/2010 |
| CN | 101622604 A | 1/2010 |

(Continued)

OTHER PUBLICATIONS

Chinese Patent Office, "Office Action and Search Report", issued in connection with Chinese Patent Application No. 201980074219.7 dated Oct. 8, 2022 (11 pages).

(Continued)

*Primary Examiner* — Joseph D Manoskey
(74) *Attorney, Agent, or Firm* — Holland & Hart LLP

(57) ABSTRACT

Methods, systems, and devices are described herein for using codewords to detect or correct errors in data (e.g., data stored in a memory device). A host device may generate one or more codewords associated with data to be stored in the memory device. In some cases, the host device may generate one or more codewords for error detection and correction (e.g., corresponding to data transmitted by the host device to the memory device). In some cases, the host device may transmit the codewords and the associated data using an extended (e.g., adjustable) burst length such that the one or more codewords may be included in the burst along with the data. Additionally or alternatively, the host device may transmit one or more of the codewords over one or more channels different than the one or more channels used to transmit the data.

20 Claims, 20 Drawing Sheets

Related U.S. Application Data

(60) Provisional application No. 62/746,316, filed on Oct. 16, 2018.

(51) Int. Cl.
    *G06F 11/07*    (2006.01)
    *G06F 13/28*    (2006.01)

(56) References Cited

U.S. PATENT DOCUMENTS

| | | |
|---|---|---|
| 8,942,028 B1 | 1/2015 | Hu |
| 9,710,324 B2 | 7/2017 | Trombley |
| 2004/0010637 A1 | 1/2004 | Johnson |
| 2009/0049365 A1* | 2/2009 | Kim .................. G06F 11/1012 714/767 |
| 2009/0063731 A1 | 3/2009 | Gower et al. |
| 2009/0177944 A1 | 7/2009 | Kanno |
| 2009/0183052 A1 | 7/2009 | Kanno et al. |
| 2014/0122974 A1 | 5/2014 | Yun |
| 2015/0213859 A1 | 7/2015 | Jang |
| 2015/0254181 A1 | 9/2015 | Andre et al. |
| 2016/0092306 A1* | 3/2016 | Benedict ............ G06F 11/1076 714/764 |
| 2016/0147598 A1 | 5/2016 | Muralimanohar et al. |
| 2016/0155515 A1 | 6/2016 | Son et al. |
| 2016/0224414 A1 | 8/2016 | Trombley |
| 2016/0357632 A1 | 12/2016 | D'Abreu et al. |
| 2018/0046541 A1 | 2/2018 | Niu et al. |
| 2018/0137067 A1 | 5/2018 | Ware et al. |
| 2018/0210787 A1 | 7/2018 | Bains et al. |
| 2019/0188074 A1 | 6/2019 | Coteus et al. |
| 2019/0227886 A1* | 7/2019 | Glancy .................. G11C 29/44 |

FOREIGN PATENT DOCUMENTS

| | | |
|---|---|---|
| CN | 105659332 A | 6/2016 |
| CN | 107209703 A | 9/2017 |
| CN | 107766172 A | 3/2018 |
| CN | 109074851 A | 12/2018 |
| EP | 2203819 A1 | 7/2010 |
| EP | 3224723 A1 | 10/2017 |
| JP | 2010-238363 A | 10/2010 |
| KR | 10-2017-0002053 A | 1/2017 |
| KR | 20170002053 U | 6/2017 |
| WO | 2009028281 A1 | 3/2009 |
| WO | 2010/001502 A1 | 1/2010 |
| WO | 2015016879 A1 | 2/2015 |
| WO | 2017192626 A1 | 11/2017 |

OTHER PUBLICATIONS

ISA/KR, International Search Report and Written Opinion of the International Searching Authority, Int'l. Appl. No. PCT/US2019/054325, dated Jan. 17, 2020, Korean Intellectual Property Office, Seo-gu, Daejeon, Republic of Korea,11 pgs.

European Patent Office, "Partial European Search Report," issued in connection with European Patent Application No. 19873743.9, dated Feb. 11, 2022 (13 pages).

China Patent Office, "Office Action," issued in connection with China Patent Application No. 201980074219 dated Mar. 18, 2022 (7 pages).

International Search Report and Written Opinion received for PCT Patent Application No. PCT/US19/54325, dated Jan. 17, 2020, 9 pages.

European Patent Office, "Supplementary European search report and Search Opinion", issued in connection with European Patent Application No. 19873743.9, dated May 12, 2022 (14 pages).

\* cited by examiner 410-c

| | DQ0 | DQ1 | DQ2 | DQ3 | DQ4 | DQ5 | DQ6 | DQ7 | DQ8 | DQ9 | DQ10 | DQ11 | DQ12 | DQ13 | DQ14 | DQ15 |
|---|---|---|---|---|---|---|---|---|---|---|---|---|---|---|---|---|
| Ui 19 | | | | | | | | | | | | | | | | |
| Ui 18 | iECC 425-d | | | | iECC 425-e | | | | iECC 425-f | | | | iECC 425-g | | | |
| Ui 17 | ECC codeword 420-d | | | | ECC codeword 420-e | | | | ECC codeword 420-f | | | | ECC codeword 420-g | | | |
| Ui 16 | | | | | | | | | | | | | | | | |
| Ui 15 | Portion of data 415-d | | | | Portion of data 415-e | | | | Portion of data 415-f | | | | Portion of data 415-g | | | |
| Ui 14 | | | | | | | | | | | | | | | | |
| Ui 13 | | | | | | | | | | | | | | | | |
| Ui 12 | | | | | | | | | | | | | | | | |
| Ui 11 | | | | | | | | | | | | | | | | |
| Ui 10 | | | | | | | | | | | | | | | | |
| Ui 9 | | | | | | | | | | | | | | | | |
| Ui 8 | | | | | | | | | | | | | | | | |
| Ui 7 | | | | | | | | | | | | | | | | |
| Ui 6 | | | | | | | | | | | | | | | | |
| Ui 5 | | | | | | | | | | | | | | | | |
| Ui 4 | | | | | | | | | | | | | | | | |
| Ui 3 | | | | | | | | | | | | | | | | |
| Ui 2 | | | | | | | | | | | | | | | | |
| Ui 1 | | | | | | | | | | | | | | | | |
| Ui 0 | | | | | | | | | | | | | | | | |

METHODS AND DEVICES FOR ERROR CORRECTION

CROSS REFERENCE

The present application for patent is a continuation of U.S. patent application Ser. No. 16/579,219 by Schaefer et al., entitled "METHODS AND DEVICES FOR ERROR CORRECTION," filed Sep. 23, 2019, which claims priority to U.S. Provisional Patent Application No. 62/746,316 by Schaefer et al., entitled "METHODS AND DEVICES FOR ERROR CORRECTION," filed Oct. 16, 2018, each of which is assigned to the assignee hereof and each of which is expressly incorporated herein by reference in its entirety.

BACKGROUND

The following relates generally to a memory system, and more specifically to methods and devices for error correction.

Memory devices are widely used to store information in various electronic devices such as computers, wireless communication devices, cameras, digital displays, and the like. Information is stored by programing different states of a memory device. For example, binary devices most often store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state over time unless they are periodically refreshed by an external power source.

In some cases, a memory device (e.g., a DRAM device) may receive commands or data from an external controller (e.g., a host device). In some cases, errors may be introduced into data received from the external controller, either during transmission or while stored in the memory device (e.g., data may become corrupted over time, such as due to electromagnetic interference (EMI)). Improving memory devices, generally, may include increasing memory cell density, increasing read/write speeds, increasing reliability, increasing data retention, reducing power consumption, or reducing manufacturing costs, among other metrics.

BRIEF DESCRIPTION OF THE DRAWINGS

FIG. 4A through 4C illustrate examples of a set of data that support methods and devices for error correction as disclosed herein.

DETAILED DESCRIPTION

Figure 1:
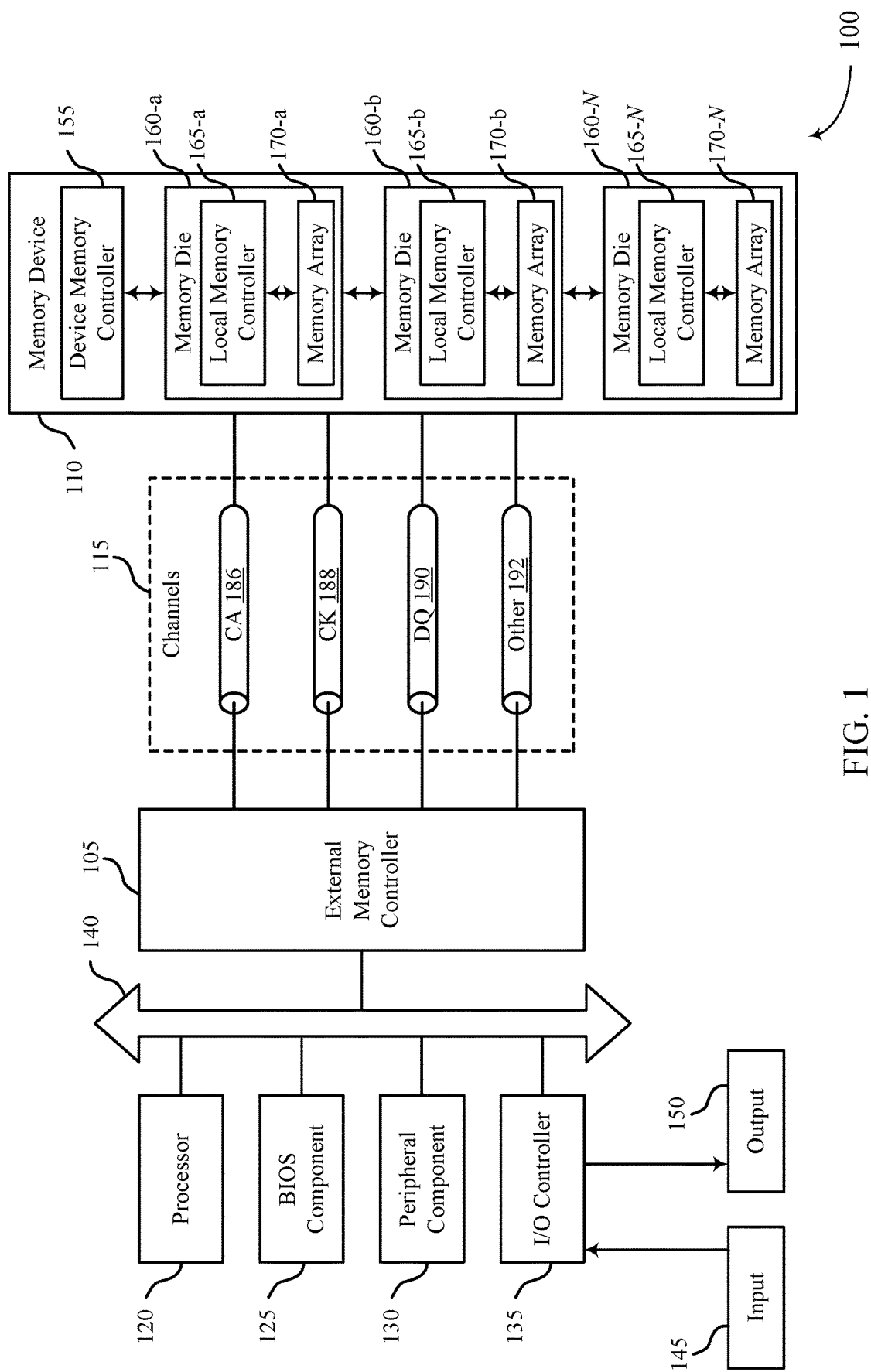
FIG. 1 illustrates an example of a system that utilizes one or more memory devices as disclosed herein.

Memory devices may operate under various conditions as part of electronic apparatuses such as personal computers, wireless communication devices, servers, internet-of-things (IoT) devices, electronic components of automotive vehicles, and the like. In some cases, memory devices supporting applications for certain implementations (e.g., automotive vehicles, in some cases with autonomous or semi-autonomous driving capabilities) may be subject to increased reliability constraints. As such, memory devices (e.g., DRAM) for some applications may be expected to operate with a reliability subject to relatively higher industry specifications (e.g., higher reliability constraints).

Some memory devices may receive commands from an external controller (e.g., a host device). The commands may indicate a transfer of data between the external controller and the memory device. For example, in a read operation, data may be transferred from the memory device to the external controller while in a write operation, data may be transferred from the external controller to the memory device. The bus between the external controller and the memory device may include a set of data channels coupled to data pins of the memory device.

Error correction coding (ECC) information associated with data for an access operation may be communicated using one or more of the set of data channels. The ECC information may include codewords for detecting or correcting errors in the associated data. In some examples, the ECC codewords may be communicated over the data channels. Such ECC information may be referred to in some cases as in-line or rank ECC information. In such cases, the host device and/or the memory device may adjust the burst length of a burst of data to include both the data associated with the access operation and the ECC codewords associated with the data. The ECC codewords may be stored in the memory device along with the associated data. In such examples, the ECC codewords may be configured to detect or correct errors that arise from storing the data in the memory device (e.g., errors that arise from data corruption).

In some examples, ECC codewords may be communicated over a sideband. And in some cases, such side-band ECC codewords may be used to detect or correct transmission errors and may be stored in the memory device to later detect or correct errors that arise from storing the data in the memory device (e.g., errors that arise from data corruption). Such ECC information may be referred to in some cases as link ECC information.

ECC information (e.g., ECC codewords stored at a memory device) may be transmitted back to the external controller or the host device as part of a read command where the associated data is retrieved. This may support the external controller or the host device detecting or correcting transmission errors or errors that arise from storing the data in the memory device (e.g., errors that arise from data corruption).

Features of the disclosure are initially described in the context of a memory system as described with reference to FIGS. 1 and 2. Features of the disclosure are described in the context of a sets of data and apparatus diagrams as described with reference to FIGS. 3 through 8B. These and other features of the disclosure are further illustrated by and described with reference to apparatus diagrams and flowcharts that relate to methods and devices for error correction as described with reference to FIGS. 9 through 14.

FIG. 1 illustrates an example of a system 100 that utilizes one or more memory devices in accordance with aspects disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is configured for bi-directional wireless communication with other systems or devices using a memory device or access point. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card. In some cases, the host device may include a graphics processing unit (GPU).

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots. The peripheral component(s) 130 may be other components understood by those skilled in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input device 145 may represent a device or signal external to the system 100 that provides information, signals, or data to the system 100 or its components. This may include a user interface or interface with or between other devices. In some cases, the input device 145 may be a peripheral that interfaces with system 100 via one or more peripheral components 130 or may be managed by the I/O controller 135.

The output device 150 may represent a device or signal external to the system 100 configured to receive an output from the system 100 or any of its components. Examples of the output device 150 may include a display, audio speakers, a printing device, or another processor on printed circuit board, and so forth. In some cases, the output device 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. While the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel.

In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170).

Channels 115 (and associated signal paths and terminals) may be dedicated to communicating specific types of information. In some cases, a channel 115 may be an aggregated channel and thus may include multiple individual channels. For example, a data channel 190 may be ×4 (e.g., including four signal paths), ×8 (e.g., including eight signal paths), ×16 (including sixteen signal paths), and so forth.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include eight or nine signal paths.

In some cases, the channels 115 may include one or more clock signal (CK) channels 188. The CK channels 188 may be configured to communicate one or more common clock signals between the external memory controller 105 and the memory device 110. Each clock signal may be configured to oscillate between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. In some cases, the clock signal may be a 1.5 GHz signal. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110. The data channels 190 may communicate signals that may be modulated using a variety of different modulation schemes (e.g., NRZ, PAM4).

In some cases, ECC associated with data of an access operation may be communicated using one or more of the channels 115. The ECC information may include codewords for detecting or correcting errors in the associated data. In some examples, the ECC codewords may be communicated over the data channels 190. In such cases, the host device and/or the memory device may adjust the burst length of a burst of data to include both the data associated with the access operation and the codewords associated with the data.

In some cases, the channels 115 may include one or more other channels 192 that may be dedicated to other purposes. These other channels 192 may include any quantity of signal paths. In some examples, at least one of the other channels 192 may be one or more ECC channels. The one or more ECC channels may be configured to communicate ECC codewords associated with data being communicated using the data channels 190. In such cases, the data may be communicated over a data channel 190 and the ECC codeword over the ECC channel (e.g., other channel 192) during the same burst period. In some cases, the ECC channel may be an example of link ECC channel.

In some cases, the other channels 192 may include one or more write clock signal (WCK) channels. While the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 192 may include one or more error detection code (EDC) channels or ECC channels. The EDC channels may be configured to communicate error detection signals, such as checksums, to improve system reliability. An EDC channel may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM4, PAM8, etc., quadrature amplitude modulation (QAM), quadrature phase shift keying (QPSK), and/or others. A multi-symbol signal or a PAM4 signal may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

Figure 2:
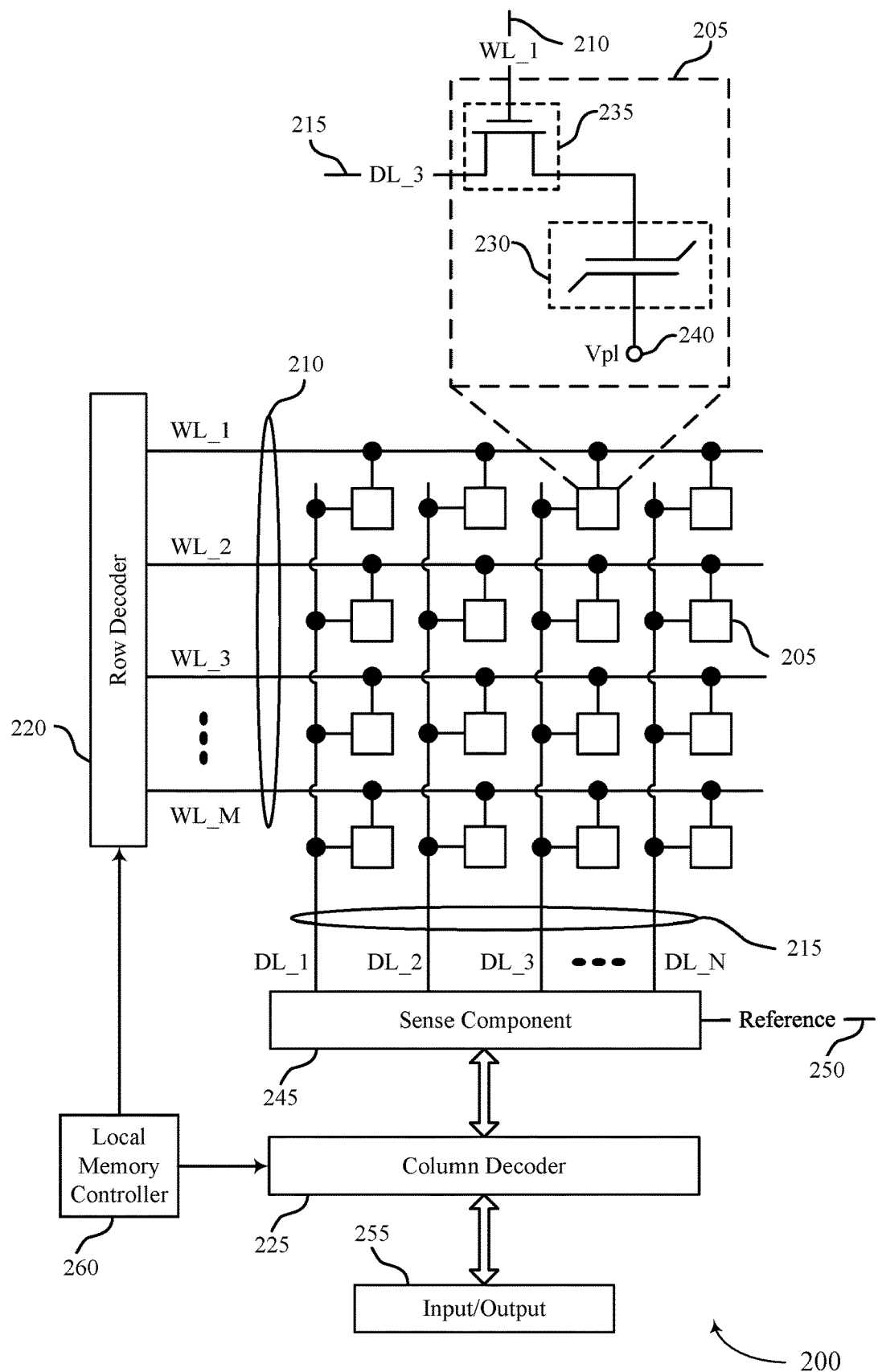
FIG. 2 illustrates an example of a memory die as disclosed herein.

FIG. 2 illustrates an example of a memory die 200 in accordance with various examples of the present disclosure. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 may be the cell plate reference voltage, such as Vpl, or may be ground, such as Vss. In some cases, the voltage source 240 may be an example of a plate line coupled with a plate line driver. The switching component 235 may be an example of a transistor or any other type of switch device that selectively establishes or de-establishes electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 is a transistor and its operation may be controlled by applying a voltage to the transistor gate, where the voltage differential between the transistor gate and transistor source may be greater or less than a threshold voltage of the transistor. In some cases, the switching component 235 may be a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that is used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be extremely small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals. The detected logic state of memory cell 205 may be output through column decoder 225 as output 255. In some cases, the sense component 245 may be part of another component (e.g., a column decoder 225, row decoder 220). In some cases, the sense component 245 may be in electronic communication with the row decoder 220 or the column decoder 225.

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a specific signal (e.g., voltage) to the digit line 215 during the write operation to store a specific state (e.g., charge) in the capacitor 230 of the memory cell 205, the specific state (e.g., charge) may be indicative of a desired logic state. In some cases, a host device may transmit ECC codewords with data to be stored in the memory die 200 as part of the write operation. The ECC codewords may be stored in the memory die 200. By storing the ECC codewords in the memory die, along with the data associated with the write operation, the ECC codewords may be configured to identify if the data stored in the memory die 200 was corrupted when being stored in the memory die or being accessed by the memory die.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may fire the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation. ECC codewords associated with data stored in the memory die 200 may also be stored in the memory die 200. In such cases, the memory die 200 may retrieve the associated ECC codewords when the data is retrieved as part of the read operation. The memory die 200 may transmit the ECC codewords to the host device as part of the read operation, where the host device may determine if errors in the data exist. In some cases, the memory die 200 may determine whether the data includes one or more errors before the data is transmitted to the host device. In such cases, the memory die 200 may correct errors before transmitting the data and the one or more ECC codewords to the host device.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

Figure 3A:
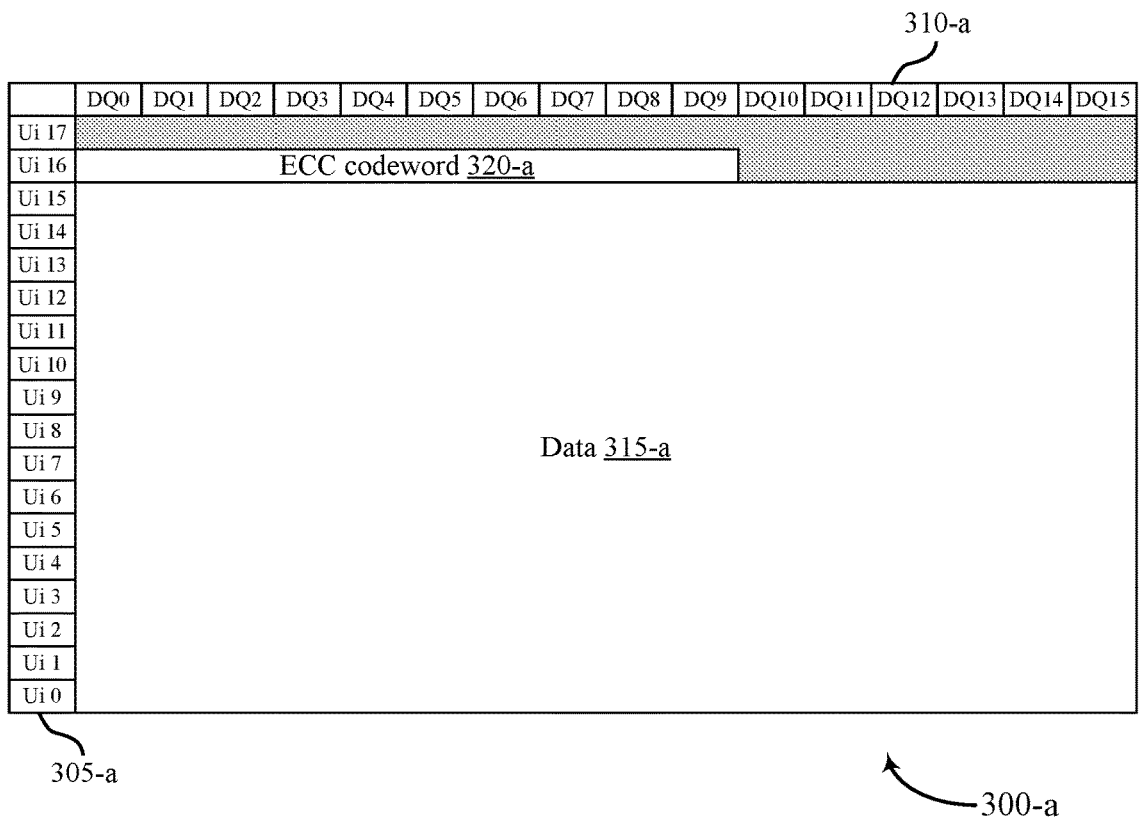
FIGS. 3A through 3C illustrate examples of a set of data that support methods and devices for error correction as disclosed herein.

FIG. 3A illustrates an example of a set of data 300-a that supports method and devices for error correction. The set of data 300-a may be generated and transmitted by a host device as described with reference to FIGS. 1 and 2, which may be an example of the external memory controller 105 as described with reference to FIG. 1. In some examples, the set of data 300-a may be received and stored at a memory device, which may be an example of the memory device 110, the memory dice 160, or the memory die 200 as described with reference to FIGS. 1 and 2. In some examples, the memory device may retrieve and transmit the set of data 300-a to the host device.

The set of data 300-a may be an example of a burst of data communicated over a channel (e.g., data channel 190). The channel may have a quantity of pins 310-a that define the width of the channel. For example, the channel may be sixteen (16) pins wide. In other examples, the channel may be less than sixteen pins wide or more than sixteen pins wide. The burst of data may also have a plurality of unit intervals 305-a, or time resources for communicating at least one symbol (e.g., bit) of data. In systems that use double-data rates, a unit interval may occur at every clock edge. In other systems, a unit interval may occur every clock cycle. In some cases, the set of data 300-a may include data 315-a associated with an access operation and one or more ECC codewords 320-a associated with at least a portion of the data 315-a.

As data is communicated between a host device and a memory device or when data is stored in the memory device, the data may be corrupted. Errors introduced into the data may cause processes being performed by the host device to fail or to have problems. Error correcting codes may be used in some circumstances to detect and/or correct some of these errors. For example, link ECC may be used to detect or correct errors that occur during transmission of data over channels. It may be desirable to use error correcting codes or ECC codewords to detect or correct errors that may occur.

Methods, systems, and devices are described herein for using ECC codewords to detect or correct errors in data stored in a memory device. A host device may generate one or more ECC codewords associated with data to be stored in the memory device. In some cases, the host device may generate one or more codewords for an entire burst of data transmitted to the memory device. In other cases, the host device may generate one or more codewords for portions of a burst of data transmitted to the memory device. The ECC codewords generated by the host device may be transmitted to the memory device in a variety of different ways. In some cases, the ECC codewords for a plurality of data bursts may be aggregated and transmitted using their own burst of data over a data channel. In other cases, the burst length of the data may be extended so that the burst data transmitted over the data channels may include the data and the one or more ECC codewords. In other cases, the ECC codewords may be transmitted over one or more other channels (e.g., not a data channel). In some of these other cases, the ECC codewords may be transmitted over the one or more other channels during the same burst interval that the data is transmitted over one or more data channels.

The set of data 300-a illustrates an example of transmitting data 315-a and at least one ECC codeword 320-a over a channel (e.g., a data channel) in a single burst. In such examples, the burst length may be adjusted so that the ECC codeword 320-a may be included in the burst. In some cases, the host device may identify the set of data 300-a to communicate over a channel with a width corresponding to a quantity of the pins 310-a. The set of data 300-a may also include a burst length equivalent to a quantity of unit intervals 305-a. In some examples, the burst length may be associated with the width of the DQ channel and a size of the set of data 300-a.

The host device or the memory device may transmit data 315-a over the channel as part of access operations (e.g., read operation or write operation). The host device or the memory device may also transmit the ECC codeword 320-a over the same channel that the host device or the memory device transmitted data 315-a. Prior to transmitting the ECC codeword 320-a, the host device may generate the ECC codeword 320-a based on data 315-a. In such cases, the host device or the memory device may transmit the set of data 300-a which includes the data 315-a and the corresponding ECC codeword 320-a. The host device may also determine that the data transmission includes the ECC codeword 320-a. In some cases, the set of data 300-a may be transmitted as a single burst (e.g., including the data 315-a and the ECC codeword 320-a). The single burst may be associated with an access command. In some examples, the set of data 300-a may be stored in the memory device as part of a write operation.

The ECC codeword 320-a may be used for error detection or correction of data stored in the memory device. In some cases, the ECC codeword 320-a may include a single-bit error correction (SEC) ECC or a single-bit error correction, a double-bit error detection (SECDED) ECC, or both. In such cases, the ECC codeword 320-a may be stored in the memory device and detect or correct errors associated with the set of data 300-a being stored in the memory device.

In some cases, a plurality of ECC codewords 320-a may be generated for error correction or detection based on the data 315-a. For example, the data 315-a may be divided into a plurality of portions, each portion of data 315-a may have an ECC codeword 320-a associated therewith. By generating ECC codewords for more smaller portions of data, more errors may be detected and/or correct. In some cases, the ECC codeword 320-*a* may be associated with all of the data 315-*a*. For example, the data 315-*a* may include 256-bits of data and the ECC codeword 320-*a* may be a 10-bit codeword associated with the 256-bits of data (e.g., data 315-*a*). In other examples, the data 315-*a* and the ECC codeword 320-*a* may be any bit size.

In some cases, the burst length (e.g., the quantity of unit intervals 305-*a* associated with a single burst over a channel) of the set of data 300-*a* may be extended to include the ECC codeword 320-*a* and the data 315-*a* in the same set of data 300-*a*. In such cases, the unit interval 305-*a* of the set of data 300-*a* may be extended by two unit intervals 305-*a* to include the ECC codeword 320-*a* in the same set of data 300-*a* as the data 315-*a*. In some cases, the set of data 300-*a* may include unused data bits. Extending the burst length may improve the accuracy of the data stored and communicated in the system and may improve a bandwidth capability of channels of a system that includes the host device and the memory device, in some cases.

The burst length may be configured according to a signaling scheme between the host device and the memory device. For example, the host device may transmit a message to the memory device which may indicate a burst length associated with the set of data 300-*a*. In such cases, the host device may generate the ECC codeword 320-*a* based on the burst length. The host device or the memory device may also configure a receiver or a driver or both based on the burst length indicated in the message. In such cases, the memory device may receive the set of data 300-*a* after configuring the receiver. In other examples, the host device may transmit a message to the memory device indicating that one or more of the ECC codewords 320-*a* may be present in a burst of data transmitted over the data channel. In such examples, the host device or the memory device may identify a new burst length based at least in part on the indication that ECC codeword 320-*a* may be present in the set of data 300-*a*. In some cases, the host device may transmit a write command associated with the set of data 300-*a* to the memory device. In such cases, transmitting the set of data 300-*a* to the memory device may be based on the write command.

The memory device may receive the set of data 300-*a* and identify the ECC codeword 320-*a* included in the set of data 300-*a*. The ECC codeword 320-*a* may be utilized for error correction in a second set of data. In such cases, the second set of data may be stored in a first portion of the memory device, and the ECC codeword 320-*a* may be stored in a second portion of the memory device different than the first portion. In some cases, the data 315-*a* may be retrieved from the memory device, and the ECC codeword 320-*a* may be retrieved from the memory device. In some cases, retrieving the data 315-*a* and the ECC codeword 320-*a* may be based on receiving a read command at the memory device. The host device may use the one or more ECC codewords received from the memory device to detect or correct errors in the data received from the memory device. The memory device may be configured to receive data and codewords and store data and codewords in any order as part of its operation. The memory device may be configured to retrieve data and codewords and transmit data and codewords in any order as part of its operation.

In some cases, the host device may receive a different set of data that has the same burst length as the set of data 300-*a*. The host device may identify an ECC codeword in the different set of data based on the same burst length as the set of data 300-*a*. In some examples, the host device may determine whether the different set of data includes an error based on the identified ECC codeword. In some cases, the host device may determine a lack of error in the different set of data. In other examples, the host device may identify an error in the different set of data and correct the error. In such cases, the host device may generate another set of data based on the set of data with the corrected error.

Figure 3B:
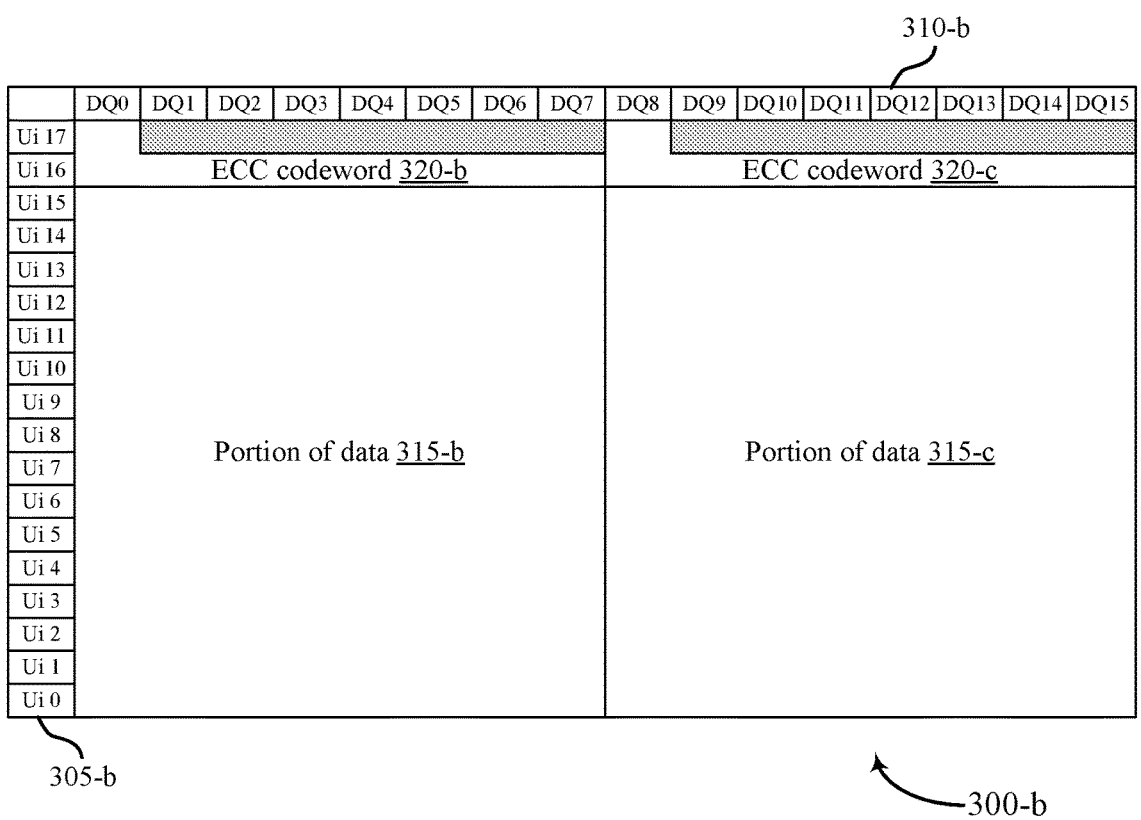

FIG. 3B illustrates an example of a set of data 300-*b* that supports methods and devices for error correction. The set of data 300-*b* may be generated and transmitted by a host device as described with reference to FIGS. 1 and 2, which may be an example of the external memory controller 105 as described with reference to FIG. 1. In some examples, the set of data 300-*b* may be received and stored at a memory device, which may be an example of the memory device 110, the memory dice 160, or the memory die 200 as described with reference to FIGS. 1 and 2. In some examples, the memory device may retrieve and transmit the set of data 300-*b* to the host device.

The set of data 300-*b* may be an example of a burst of data communicated over a channel (e.g., data channel 190). The channel may have a quantity of pins 310-*b* that define the width of the channel. For example, the channel may be sixteen (16) pins wide. In other examples, the channel may be less than sixteen pins wide or more than sixteen pins wide. The burst of data may also have a plurality of unit intervals 305-*b*, or time resources for communicating at least one symbol (e.g., bit) of data. In systems that use double-data rates, a unit interval may occur at every clock edge. In other systems, a unit interval may occur every clock cycle. In some cases, the set of data 300-*b* may include portions of data 315-*b* and 315-*c* associated with an access operation and one or more ECC codewords 320-*b* and 320-*c* associated with at least a portion of the data 315-*b* and 315-*c*, respectively.

The set of data 300-*b* illustrates an example of using ECC codewords (e.g., codewords 320-*b* and 320-*c*) that are associated with two or more portions (e.g., data 315-*b* or 315-*c*) of the data included in a burst. In such examples, the burst length may be adjusted so that the codeword 320-*b* and 320-*c* may be included in the burst. In some cases, the host device may identify the set of data 300-*b* to communicate over a channel with a width corresponding to a quantity of the pins 310-*b*. The set of data 300-*b* may also include a burst length equivalent to a quantity of unit intervals 305-*b*. In some examples, the burst length may be associated with the width of the DQ channel and a size of the set of data 300-*b*.

The host device or memory device may transmit portions of data 315-*b* and 315-*c* over the channel. The host device or memory device may also transmit the ECC codewords 320-*b* and 320-*c* over the same channel that the host device or memory device transmitted portions of data 315-*b* and 315-*c*. Prior to transmitting the ECC codewords 320-*b* and 320-*c*, the host device may generate the ECC codewords 320-*b* and 320-*c* based on the portions of data 315-*b* and 315-*c*. For example, the ECC codeword 320-*b* may be associated with the portion of data 315-*b*, and the ECC codeword 320-*c* may be associated with the portion of data 315-*c*. In such cases, the host device or memory device may transmit the set of data 300-*b* which includes the portions of data 315-*b* and 315-*c* and the corresponding ECC codewords 320-*b* and 320-*c*.

The host device may also determine that the data transmission includes the ECC codewords 320-*b* and 320-*c*. In some cases, determining whether an error is included in the set of data 300-*b* is based on identifying the ECC codewords 320-*b* and 320-*c*. In some examples, the set of data 300-*b* may be transmitted as a single burst. For example, the single burst may include the ECC codeword 320-*b* and the portion of data 315-*b* and the ECC codeword 320-*c* and the portion of data 315-*c*. The burst may be associated with an access command. In some examples, the set of data 300-*b* may then be stored in the memory device as part of a write operation.

The ECC codewords 320-*b* and 320-*c* may be used for error detection or correction of data stored in the memory device. In some cases, the ECC codewords 320-*b* and 320-*c* may include a SEC ECC, a SECDED ECC, or both. In such cases, the ECC codewords 320-*b* and 320-*c* may be stored in the memory device and detect or correct errors associated with the set of data 300-*b* being stored in the memory device.

In some cases, the burst length (e.g., the quantity of unit intervals 305-*b* associated with a single burst over a channel) of the set of data 300-*b* may be extended to include the ECC codewords 320-*b* and 320-*c* and the portions of data 315-*b* and 315-*c* in the same set of data 300-*b*. For example, the set of data 300-*b* may be divided up into two portions of data (e.g., portions of data 315-*b* and 315-*c*). In some cases, the two portions of data may be equally sized (e.g., two 128-bit portions of data). In other cases, the two portions of data may be different sizes. The set of data 300-*b* may also include two codewords (e.g., ECC codewords 320-*b* and 320-*c*), one codeword being generated for each portion of data. In some cases, the codewords may be 9-bit codewords. In some specific cases, one 9-bit codeword may be associated with one 128-bit portion of data. In some cases, the unit interval 305-*b* of the set of data 300-*b* may be extended by two unit intervals 305-*b* to include the ECC codewords 320-*b* and 320-*c* in the same set of data 300-*b* as the portions of data 315-*b* and 315-*c*. In some cases, the set of data 300-*b* may include unused data bits.

The burst length may be configured according to a signaling scheme between the host device and the memory device. For example, the host device may transmit a message to the memory device which may indicate a burst length associated with the set of data 300-*b*. In such cases, the host device may generate the ECC codewords 320-*b* and 320-*c* based on the burst length. The host device or the memory device may also configure a receiver or a driver or both based on the burst length indicated in the message. In such cases, the memory device may receive the set of data 300-*b* after configuring the receiver. In other examples, the host device may transmit a message to the memory device indicating that one or more of the ECC codewords 320-*b* and 320-*c* may be present in a burst of data transmitted over the data channel. In such examples, the host device or the memory device may identify a new burst length based at least in part on the indication that the ECC codewords 320-*b* and 320-*c* may be present in the set of data 300-*b*. In some cases, the host device may transmit a write command associated with the set of data 300-*b* to the memory device. In such cases, transmitting the set of data 300-*b* to the memory device may be based on the write command.

The memory device may receive the set of data 300-*b* and identify the ECC codewords 320-*b* and 320-*c* included in the set of data 300-*b*. The ECC codewords 320-*b* and 320-*c* may be utilized for error correction in a second set of data. In such cases, the second set of data may be stored in a first portion of the memory device, and the ECC codewords 320-*b* and 320-*c* may be stored in a second portion of the memory device different than the first portion. In some cases, the portions of data 315-*b* and 315-*c* may be retrieved from the memory device, and the ECC codewords 320-*b* and 320-*c* may be retrieved from the memory device. In some cases, retrieving the portions of data 315-*b* and 315-*c* and the ECC codewords 320-*b* and 320-*c* may be based on receiving a read command at the memory device. The host device may use the one or more ECC codewords received from the memory device to detect or correct errors in the data received from the memory device. The memory device may be configured to receive data and codewords and store data and codewords in any order as part of its operation. The memory device may be configured to retrieve data and codewords and transmit data and codewords in any order as part of its operation.

Figure 3C:
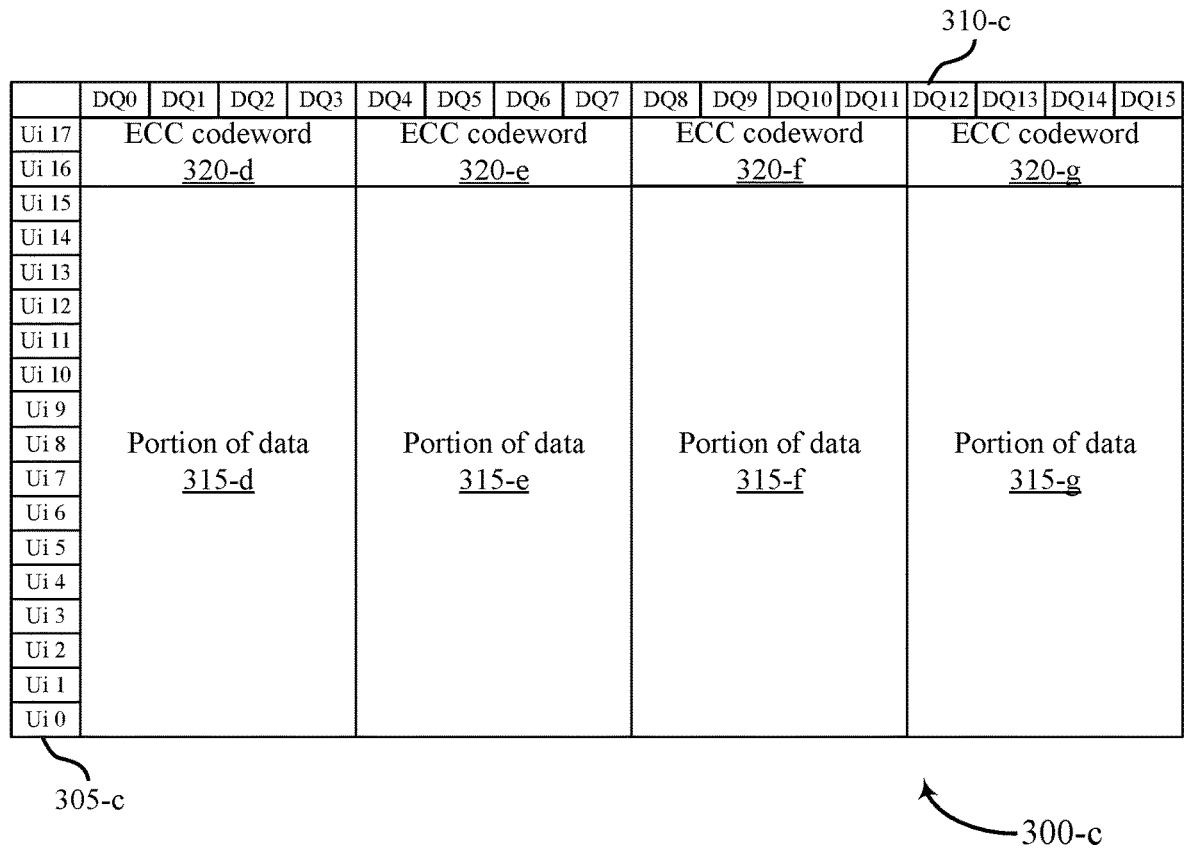

FIG. 3C illustrates an example of a set of data 300-*c* that supports method and devices for error correction. The set of data 300-*c* may be generated and transmitted by a host device as described with reference to FIGS. 1 and 2, which may be an example of the external memory controller 105 as described with reference to FIG. 1. In some examples, the set of data 300-*c* may be received and stored at a memory device, which may be an example of the memory device 110, the memory dice 160, or the memory die 200 as described with reference to FIGS. 1 and 2. In some examples, the memory device may retrieve and transmit the set of data 300-*c* to the host device.

The set of data 300-*c* illustrates an example of using ECC codewords (e.g., codewords 320-*d*, 320-*e*, 320-*f*, and 320-*g*) that are associated with four or more portions (e.g., data 315-*d*, 315-*e*, 315-*f*, and 315-*g*) of the data included in a burst. In such examples, the burst length may be adjusted so that the codeword 320-*d*, 320-*e*, 320-*f*, and 320-*g* may be included in the burst. In some cases, the host device may identify the set of data 300-*c* to communicate over a channel with a width corresponding to a quantity of the pins 310-*c*. The set of data 300-*c* may also include a burst length equivalent to a quantity of unit intervals 305-*c*. In some examples, the burst length may be associated with the width of the DQ channel and a size of the set of data 300-*c*.

The host device or memory device may transmit portions of data 315-*d*, 315-*e*, 315-*f*, and 315-*g* over the channel. The host device or memory device may also transmit the ECC codewords 320-*d*, 320-*e*, 320-*f*, and 320-*g* over the same channel that the host device or memory device transmitted portions of data 315-*d*, 315-*e*, 315-*f*, and 315-*g*. Prior to transmitting the ECC codewords 320-*d*, 320-*e*, 320-*f*, and 320-*g*, the host device may generate the ECC codewords 320-*d*, 320-*e*, 320-*f*, and 320-*g* based on the portions of data 315-*d*, 315-*e*, 315-*f*, and 315-*g*. For example, the ECC codeword 320-*d* may be associated with the portion of data 315-*d*, and the ECC codeword 320-*e* may be associated with the portion of data 315-*e*. The ECC codeword 320-*f* may be associated with the portion of data 315-*f*, and the ECC codeword 320-*g* may be associated with the portion of data 315-*g*. In such cases, the host device or memory device may transmit the set of data 300-*c* which includes the portions of data 315-*d*, 315-*e*, 315-*f*, and 315-*g* and the corresponding ECC codewords 320-*d*, 320-*e*, 320-*f*, and 320-*g*.

The host device may also determine that the data transmission includes the ECC codewords 320-*d*, 320-*e*, 320-*f*, and 320-*g*. In some cases, the set of data 300-*c* may be transmitted as a single burst. For example, the burst may include the ECC codewords 320-*d*, 320-*e*, 320-*f*, and 320-*g* and the portions of data 315-*d*, 315-*e*, 315-*f*, and 315-*g*. The burst may be associated with an access command. In some examples, the set of data 300-*c* may then be stored in the memory device as part of a write operation.

The ECC codewords 320-*d*, 320-*e*, 320-*f*, and 320-*g* may be used for error detection or correction of data stored in the memory device. In some cases, the ECC codewords 320-*d*, 320-*e*, 320-*f*, and 320-*g* may include a SEC ECC, a SECDED ECC, or both. In such cases, the ECC codewords 320-*d*, 320-*e*, 320-*f*, and 320-*g* may be stored in the memory device and detect or correct errors associated with the set of data 300-*c* being stored in the memory device.

In some cases, the burst length (e.g., the quantity of unit intervals 305-*c* associated with a single burst over a channel) of the set of data 300-*c* may be extended to include the ECC codewords 320-*d*, 320-*e*, 320-*f*, and 320-*g* and the portions of data 315-*d*, 315-*e*, 315-*f*, and 315-*g* in the same set of data 300-*c*. For example, the set of data 300-*c* may be divided up into four or more portions of data (e.g., portions of data 315-*d*, 315-*e*, 315-*f*, and 315-*g*). In some cases, the four portions of data may be equally sized (e.g., four 64-bit portions of data). In other cases, the four portions of data may be different sizes. The set of data 300-*c* may also include four or more codewords (e.g., ECC codewords 320-*d*, 320-*e*, 320-*f*, and 320-*g*), one codeword being generated for each portion of data. In some cases, the codewords may be 8-bit codewords. In some specific cases, one 8-bit codeword may be associated with one 64-bit portion of data. In some cases, the unit interval 305-*c* of the set of data 300-*c* may be extended by two unit intervals 305-*c* to include the ECC codewords 320-*d*, 320-*e*, 320-*f*, and 320-*g* in the same set of data 300-*c* as the portions of data 315-*d*, 315-*e*, 315-*f*, and 315-*g*.

The burst length may be configured according to a signaling scheme between the host device and the memory device. For example, the host device may transmit a message to the memory device which may indicate a burst length associated with the set of data 300-*c*. In such cases, the host device may generate the ECC codewords 320-*d*, 320-*e*, 320-*f*, and 320-*g* based on the burst length. The host device or the memory device may also configure a receiver or a driver or both based on the burst length indicated in the message. In such cases, the memory device may receive the set of data 300-*c* after configuring the receiver. In other examples, the host device may transmit a message to the memory device indicating that one or more of the ECC codewords 320-*d*, 320-*e*, 320-*f*, and 320-*g* may be present in a burst of data transmitted over the data channel. In such examples, the host device or the memory device may identify a new burst length based at least in part on the indication that the ECC codewords 320-*d*, 320-*e*, 320-*f*, and 320-*g* may be present in the set of data 300-*c*. In some cases, the host device may transmit a write command associated with the set of data 300-*c* to the memory device. In such cases, transmitting the set of data 300-*c* to the memory device may be based on the write command.

The memory device may receive the set of data 300-*c* and identify the ECC codewords 320-*d*, 320-*e*, 320-*f*, and 320-*g* included in the set of data 300-*c*. The ECC codewords 320-*d*, 320-*e*, 320-*f*, and 320-*g* may be utilized for error correction in a second set of data. In such cases, the second set of data may be stored in a first portion of the memory device, and the ECC codewords 320-*d*, 320-*e*, 320-*f*, and 320-*g* may be stored in a second portion of the memory device different than the first portion. In some cases, the portions of data 315-*d*, 315-*e*, 315-*f*, and 315-*g* may be retrieved from the memory device, and the ECC codewords 320-*d*, 320-*e*, 320-*f*, and 320-*g* may be retrieved from the memory device. In some cases, retrieving the portions of data 315-*d*, 315-*e*, 315-*f*, and 315-*g* and the ECC codewords 320-*d*, 320-*e*, 320-*f*, and 320-*g* may be based on receiving a read command at the memory device. The host device may use the one or more ECC codewords received from the memory device to detect or correct errors in the data received from the memory device. The memory device may be configured to receive data and codewords and store data and codewords in any order as part of its operation. The memory device may be configured to retrieve data and codewords and transmit data and codewords in any order as part of its operation.

Figure 4A:
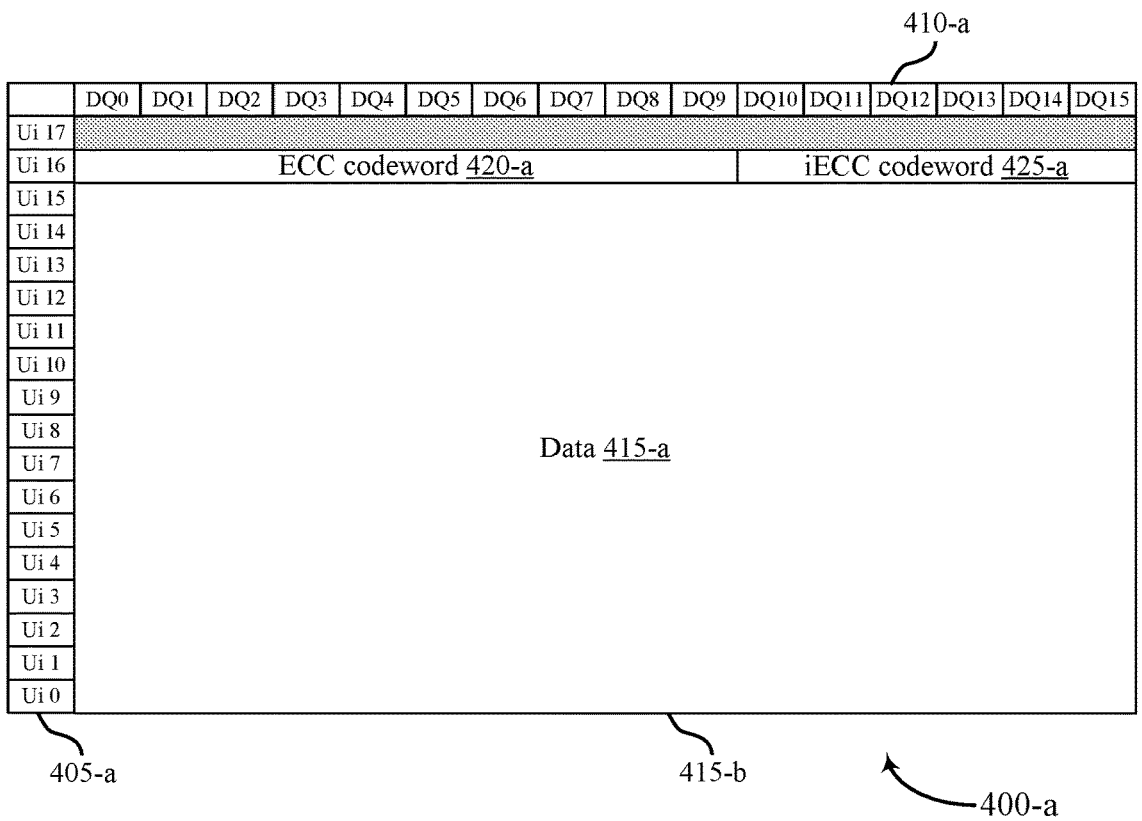

FIG. 4A illustrates an example of a set of data 400-*a* that supports methods and devices for error correction. The set of data 400-*a* may be generated and transmitted by a host device as described with reference to FIGS. 1 and 2, which may be an example of the external memory controller 105 as described with reference to FIG. 1. In some examples, the set of data 400-*a* may be received and stored at a memory device, which may be an example of the memory device 110, the memory dice 160, or the memory die 200 as described with reference to FIGS. 1 and 2. In some examples, the memory device may retrieve and transmit the set of data 400-*a* to the host device.

The set of data 400-*a* may be an example of a burst of data communicated over a channel (e.g., data channel 190). The channel may have a quantity of pins 410-*a* that define the width of the channel. For example, the channel may be sixteen (16) pins wide. In other examples, the channel may be less than sixteen pins wide or more than sixteen pins wide. The burst of data may also have a plurality of unit intervals 405-*a*, or time resources for communicating at least one symbol (e.g., bit) of data. In systems that use double-data rates, a unit interval may occur at every clock edge. In other systems, a unit interval may occur every clock cycle. In some cases, the set of data 400-*a* may include data 415-*a* associated with an access operation, which may be an example of data 315 as described with reference to FIG. 3. The set of data 400-*a* may also include one or more ECC codewords 420-*a*, which may be an example of ECC codeword 320 as described with reference to FIG. 3. The one or more ECC codewords 420-*a* may be associated with at least a portion of the data 415-*a*. The set of data 400-*a* may also include one or more internal ECC codewords 425-*a*. Internal ECC codewords 425-*a* may include any ECC codeword that is generated by a host device or a memory device using both the data 415-*a* and at least one codeword 420-*a*. In some cases, the internal ECC codewords 420-*a* may be referred to as in-line ECC codewords.

The set of data 400-*a* illustrates an example of transmitting data 415-*a* and at least one ECC codeword 420-*a* and at least one internal ECC codeword 425-*a* over a channel (e.g., a data channel) in a single burst. In such examples, the burst length may be adjusted so that the ECC codeword 420-*a* and internal ECC codeword 425-*a* may be included in the burst. In some cases, the host device may identify the set of data 400-*a* to communicate over a channel with a width corresponding to a quantity of the pins 410-*a*. The set of data 400-*a* may also include a burst length equivalent to a quantity of unit intervals 405-*a*. In some examples, the burst length may be associated with the width of the DQ channel and a size of the set of data 400-*a*.

The host device or memory device may transmit data 415-*a* over the channel. The host device or memory device may also transmit the ECC codeword 420-*a* over the same channel that the host device transmitted the data 415-*a*. Prior to transmitting the ECC codeword 420-*a*, the host device may generate the ECC codeword 420-*a* based on data 415-*a*. In some cases, the internal ECC codeword 425-*a* may be generated for error correction in the set of data, for error correction in the ECC codeword 420-*a*, or both. In such cases, the internal ECC codeword 425-*a* may be generated based on data 415-*a* and the ECC codeword 420-*a*.

In such cases, the host device or memory device may transmit the set of data 400-*a* which includes the data 415-*a*, the ECC codeword 420-*a*, and the internal ECC codeword 425-a. The host device may also determine that the data transmission includes the ECC codeword 420-a and internal ECC codeword 425-a. In some cases, the set of data 400-a may be transmitted as a single burst (e.g., including the data 415-a, the ECC codeword 420-a, and the internal ECC codeword 425-a). The single burst may be associated with an access command. In some examples, the set of data 400-a may be stored in the memory device as part of a write operation.

The ECC codeword 420-a may be used for error detection or correction of data stored in the memory device. In some cases, the ECC codeword 420-a may include a SEC ECC or a SECDED ECC. In such cases, the ECC codeword 420-a may be stored in the memory device and detect or correct errors associated with the set of data 400-a being stored in the memory device. In some cases, the internal ECC codeword 425-a may be used for error detection or correction of data stored in a set of data or the ECC codeword 420-a. For example, the host device may identify the internal ECC codeword 425-a and determine whether the set of data or the ECC codeword 420-a includes an error based on the internal ECC codeword 425-a.

In some cases, a plurality of ECC codewords 420-a may be generated for error correction or detection based on the data 415-a. For example, the data 415-a may be divided into a plurality of portions, each portion of data 415-a may have an ECC codeword 420-a included therewith. By generating ECC codewords for more smaller portions of data, more errors may be detected and/or correct. In some cases, the ECC codeword 420-a may be associated with all of the data 415-a. In some examples, the internal ECC codeword 425-a may be generated for error correction or detection based on the ECC codeword 420-a. For example, each ECC codeword 420-a may have an internal ECC codeword 425-a included therewith. In such cases, the internal ECC codeword 425-a may be associated with the ECC codeword 420-a and the data 415-a. For example, the data 415-a may include 256-bits of data, the ECC codeword 420-a may be a 10-bit codeword associated with the 256 bits of data (e.g., data 415-a), and the internal ECC codeword 425-a may be a 6-bit codeword associated with the 10-bit codeword (e.g., ECC codeword 420-a). In other examples, the data 415-a, the ECC codeword 420-a, and the internal ECC codeword 425-a may be any bit size.

In some cases, the burst length (e.g., the quantity of unit intervals 405-a associated with a single burst over a channel) of the set of data 400-a may be extended to include the ECC codeword 420-a, the internal ECC codeword 425-a, and the data 415-a in the same set of data 400-a. In such cases, the unit interval 405-a of the set of data 400-a may be extended by two unit intervals 405-a to include the ECC codeword 420-a and the internal ECC codeword 425-a in the same set of data 400-a as the data 415-a. In some cases, the set of data 400-a may include unused data bits. Extending the burst length may improve the accuracy of the data stored and communicated in the system and may improve a bandwidth capability of channels of a system that includes the host device and the memory device, in some cases.

The memory device may receive the set of data 400-a and identify the ECC codeword 420-a and internal ECC codeword 425-a included in the set of data 400-a. The ECC codeword 420-a may be utilized for error correction in a second set of data. In such cases, the second set of data may be stored in a first portion of the memory device, and the ECC codeword 420-a may be stored in a second portion of the memory device different than the first portion. The internal ECC codeword 425-a may be stored in the memory device. For example, the internal ECC codeword 425-a may be stored in a third portion of the memory device different than the first portion and the second portion. In some cases, the memory device may generate the internal ECC codeword 425-a rather than the host device. In such cases, the memory device may store the internal ECC codeword 425-a. The host device may use the one or more internal ECC codewords received from the memory device to detect or correct errors in the data received from the memory device, the ECC codeword received from the memory device, or both. The memory device may be configured to receive data and codewords and store data and codewords in any order as part of its operation. The memory device may be configured to retrieve data and codewords and transmit data and codewords in any order as part of its operation.

In some cases, the data 415-a, the ECC codeword 420-a, and the internal ECC codeword 425-a may be retrieved from the memory device. In some examples, the memory device may determine whether the set of data includes an error based on the internal ECC codeword 425-a. In some cases, the memory device may determine a lack of error in the set of data. In other examples, the memory device may identify an error in the set of data and correct the error based on the internal ECC codeword 425-a.

Figure 4B:
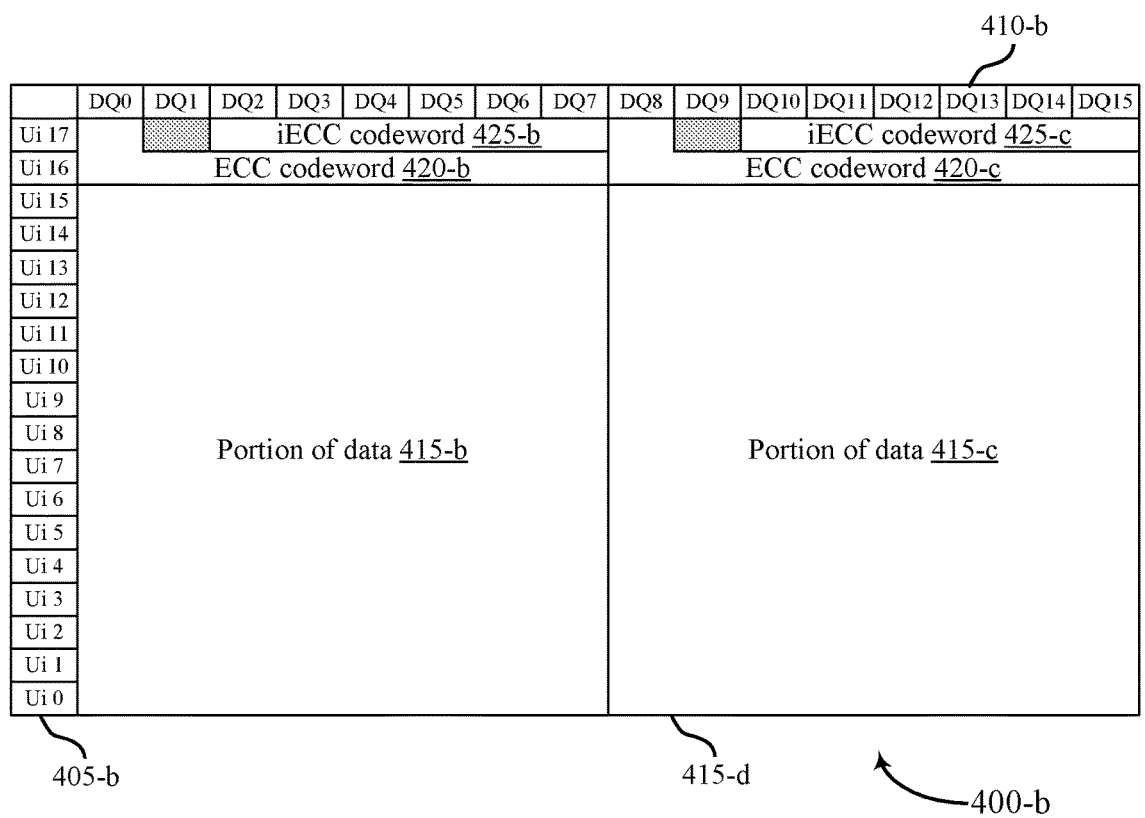

FIG. 4B illustrates an example of a set of data 400-b that supports methods and devices for error correction. The set of data 400-b may be generated and transmitted by a host device as described with reference to FIGS. 1 and 2, which may be an example of the external memory controller 105 as described with reference to FIG. 1. In some examples, the set of data 400-b may be received and stored at a memory device, which may be an example of the memory device 110, the memory dice 160, or the memory die 200 as described with reference to FIGS. 1 and 2. In some examples, the memory device may retrieve and transmit the set of data 400-b to the host device.

The set of data 400-b may be an example of a burst of data communicated over a channel (e.g., data channel 190). The channel may have a quantity of pins 410-b that define the width of the channel. The burst of data may also have a plurality of unit intervals 405-b, or time resources for communicating at least one symbol (e.g., bit) of data. In some cases, the set of data 400-b may include a portion of data 415-b and 415-c associated with an access operation, which may be an example of data 315 as described with reference to FIG. 3. The set of data 400-b may also include one or more ECC codewords 420-b and 420-c, which may be an example of ECC codeword 320 as described with reference to FIG. 3. The one or more ECC codewords 420-b and 415-c may be associated with at least a portion of the data 415-b and 415-c. The set of data 400-b may also include one or more internal ECC codewords 425-b and 425-c.

The set of data 400-b illustrates an example of using ECC codewords (e.g., codewords 420-b and 420-c) that are associated with two or more portions (e.g., data 415-b or 415-c) of the data included in a burst. In such examples, the burst length may be adjusted so that the ECC codewords 420-b and 420-c and internal ECC codewords 425-b and 425-c may be included in the burst. In some cases, the host device may identify the set of data 400-b to communicate over a channel with a width corresponding to a quantity of the pins 410-b. The set of data 400-b may also include a burst length equivalent to a quantity of unit intervals 405-b. In some examples, the burst length may be associated with the width of the DQ channel and a size of the set of data 400-b.

The host device or memory device may transmit the portions of data 415-b and 415-c over the channel. The host device or memory device may also transmit the ECC codewords 420-*b* and 420-*c* over the same channel that the host device transmitted the portions of data 415-*b* and 415-*c*. Prior to transmitting the ECC codewords 420-*b* and 420-*c*, the host device may generate the ECC codewords 420-*b* and 420-*c* based on portions of data 415-*b* and 415-*c*. For example, the ECC codeword 420-*b* may be associated with the portion of data 415-*b*, and the ECC codeword 420-*c* may be associated with the portion of data 415-*c*. In some cases, the internal ECC codewords 425-*b* and 425-*c* may be generated for error correction in the set of data 400-*b*, for error correction in the ECC codewords 420-*b* and 420-*c*, or both. In such cases, the internal ECC codeword 425-*b* may be generated based on the portion of data 415-*b* and the ECC codeword 420-*b*. In other examples, the internal ECC codeword 425-*c* may be generated based on the portion of data 415-*c* and the ECC codeword 420-*c*.

In such cases, the host device or memory device may transmit the set of data 400-*b* which includes the portions of data 415-*b* and 415-*c*, the ECC codewords 420-*b* and 420-*c*, and the internal ECC codewords 425-*b* and 425-*c*. The host device may also determine that the data transmission includes the ECC codewords 420-*b* and 420-*c* and internal ECC codewords 425-*b* and 425-*c*. In some cases, the set of data 400-*b* may be transmitted as a single burst (e.g., including the portions of data 415-*b* and 415-*c*, the ECC codewords 420-*b* and 420-*c*, and the internal ECC codewords 425-*b* and 425-*c*). The single burst may be associated with an access command. In some examples, the set of data 400-*b* may be stored in the memory device as part of a write operation.

The ECC codewords 420-*b* and 420-*c* may be used for error detection or correction of data stored in the memory device. In some cases, the ECC codewords 420-*b* and 420-*c* may include a SEC ECC or a SECDED ECC. In such cases, the ECC codewords 420-*b* and 420-*c* may be stored in the memory device and detect or correct errors associated with the set of data 400-*a* being stored in the memory device. In some cases, the internal ECC codewords 425-*b* and 425-*c* may be used for error detection or correction of data stored in a set of data 400-*b* or the ECC codewords 420-*b* and 420-*c*. For example, the host device may identify the internal ECC codewords 425-*b* and 425-*c* and determine whether the set of data 400-*b* or the ECC codewords 420-*b* and 420-*c* include an error based on the internal ECC codewords 425-*b* and 425-*c*.

In some cases, a plurality of ECC codewords 420-*b* and 420-*c* may be generated for error correction or detection based on the portions of data 415-*b* and 415-*c*. For example, the portion of data 415-*b* may have an ECC codeword 420-*b* included therewith, and the portion of data 415-*c* may have an ECC codeword 420-*c* included therewith. By generating ECC codewords for more smaller portions of data, more errors may be detected and/or correct.

In some examples, the internal ECC codewords 425-*b* and 425-*c* may be generated for error correction or detection based on the ECC codewords 420-*b* and 420-*c*. For example, ECC codeword 420-*b* may have an internal ECC codeword 425-*b* included therewith, and ECC codeword 420-*c* may have an internal ECC codeword 425-*c* included therewith. In such cases, the internal ECC codeword 425-*b* and 425-*c* may be associated with the ECC codeword 420-*b* and 425-*c*, respectively. For example, the set of data 400-*b* may be divided up into two portions of data (e.g., portions of data 415-*b* and 415-*c*). In some cases, the two portions of data may be equally sized (e.g., two 128-bit portions of data). In other cases, the two portions of data may be different sizes.

The set of data 400-*b* may also include two codewords (e.g., ECC codeword 420-*b* and 420-*c*), one codeword being generated for each portion of data. In some cases, the codewords may be 9-bit codewords. The set of data 400-*b* may also include two internal codewords (e.g., internal ECC codewords 425-*b* and 425-*c*), one codeword being generated for each portion of data and its associated ECC codeword 420. In some cases, the internal ECC codewords may be 6-bit codewords. In some cases, the set of data 400-*b* may include unused data bits.

In some cases, the burst length (e.g., the quantity of unit intervals 405-*b* associated with a single burst over a channel) of the set of data 400-*b* may be extended to include the ECC codewords 420-*b* and 420-*c*, the internal ECC codewords 425-*b* and 425-*c*, and the portions of data 415-*b* and 415-*c* in the same set of data 400-*b*. In such cases, the unit interval 405-*b* of the set of data 400-*b* may be extended by two unit intervals 405-*b* to include the ECC codewords 420-*b* and 420-*c*, the internal ECC codewords 425-*b* and 425-*c* in the same set of data 400-*b*. In some cases, the set of data 400-*b* may include unused data bits. Extending the burst length may improve the accuracy of the data stored and communicated in the system and may improve a bandwidth capability of channels of a system that includes the host device and the memory device, in some cases.

The memory device may receive the set of data 400-*b* and identify the ECC codewords 420-*b* and 420-*c* and internal ECC codewords 425-*b* and 425-*c* included in the set of data 400-*b*. The ECC codewords 420-*b* and 420-*c* may be utilized for error correction in a second set of data. In such cases, the second set of data may be stored in a first portion of the memory device, and the ECC codewords 420-*b* and 420-*c* may be stored in a second portion of the memory device different than the first portion. The internal ECC codewords 425-*b* and 425-*c* may be stored in the memory device. For example, the internal ECC codeword 425-*b* and 425-*c* may be stored in a third portion of the memory device different than the first portion and the second portion. In some cases, the memory device may generate the internal ECC codewords 425-*b* and 425-*c* rather than the host device. In such cases, the memory device may store the internal ECC codeword 425-*b* and 425-*c*. The host device may use the one or more internal ECC codewords received from the memory device to detect or correct errors in the data received from the memory device, the ECC codeword received from the memory device, or both.

In some cases, the portions of data 415-*b* and 415-*c*, the ECC codewords 420-*b* and 420-*c*, and the internal ECC codewords 425-*b* and 425-*c* may be retrieved from the memory device. In some examples, the memory device may determine whether the set of data includes an error based on the internal ECC codewords 425-*b* and 425-*c*. In some cases, the memory device may determine a lack of error in the set of data. In other examples, the memory device may identify an error in the set of data and correct the error based on the internal ECC codeword 425-*b* and 425-*c*. The memory device may be configured to receive data and codewords and store data and codewords in any order as part of its operation. The memory device may be configured to retrieve data and codewords and transmit data and codewords in any order as part of its operation.

FIG. 4C illustrates an example of a set of data 400-*c* that supports methods and devices for error correction. The set of data 400-*c* may be generated and transmitted by a host device as described with reference to FIGS. 1 and 2, which may be an example of the external memory controller 105 as described with reference to FIG. 1. In some examples, the set of data 400-c may be received and stored at a memory device, which may be an example of the memory device 110, the memory dice 160, or the memory die 200 as described with reference to FIGS. 1 and 2. In some examples, the memory device may retrieve and transmit the set of data 400-c to the host device.

The set of data 400-c may be an example of a burst of data communicated over a channel (e.g., data channel 190). The channel may have a quantity of pins 410-c that define the width of the channel. The burst of data may also have a plurality of unit intervals 405-c, or time resources for communicating at least one symbol (e.g., bit) of data. In some cases, the set of data 400-c may include a portion of data 415-d, 415-e, 415-f, and 415-g associated with an access operation, which may be an example of data 315 as described with reference to FIG. 3. The set of data 400-c may also include one or more ECC codewords 420-d, 420-e, 420-f, and 420-g, which may be an example of ECC codeword 320 as described with reference to FIG. 3. The one or more ECC codewords 420-b and 415-c may be associated with at least a portion of the data 415-d, 415-e, 415-f, and 415-g. The set of data 400-c may also include one or more internal ECC codewords 425-d, 425-e, 425-f, and 425-g.

The set of data 400-c illustrates an example of using ECC codewords (e.g., codewords 420-d, 420-e, 420-f, and 420-g) that are associated with four or more portions (e.g., data 415-d, 415-e, 415-f, and 415-g) of the data included in a burst. In such examples, the burst length may be adjusted so that the ECC codewords 420-d, 420-e, 420-f, and 420-g and internal ECC codewords 425-d, 425-e, 425-f, and 425-g may be included in the burst. In some cases, the host device may identify the set of data 400-c to communicate over a channel with a width corresponding to a quantity of the pins 410-c. The set of data 400-c may also include a burst length equivalent to a quantity of unit intervals 405-c. In some examples, the burst length may be associated with the width of the DQ channel and a size of the set of data 400-c.

The host device or memory device may transmit the portions of data 415-d, 415-e, 415-f, and 415-g over the channel. The host device or memory device may also transmit the ECC codewords 420-d, 420-e, 420-f, and 420-g over the same channel that the host device transmitted the portions of data 415-d, 415-e, 415-f, and 415-g. Prior to transmitting the ECC codewords 420-d, 420-e, 420-f, and 420-g, the host device may generate the ECC codewords 420-d, 420-e, 420-f, and 420-g based on portions of data 415-d, 415-e, 415-f, and 415-g. For example, the ECC codeword 420-d may be associated with the portion of data 415-d, and the ECC codeword 420-e may be associated with the portion of data 415-e. In some cases, the internal ECC codewords 425-d, 425-e, 425-f, and 425-g may be generated for error correction in the set of data 400-c, for error correction in the ECC codewords 420-d, 420-e, 420-f, and 420-g, or both. In such cases, the internal ECC codeword 425-d may be generated based on the portion of data 415-d and the ECC codeword 420-d. In other examples, the internal ECC codeword 425-e may be generated based on the portion of data 415-e and the ECC codeword 420-e.

In such cases, the host device or memory device may transmit the set of data 400-c which includes the portions of data 415-d, 415-e, 415-f, and 415-g, the ECC codewords 420-d, 420-e, 420-f, and 420-g, and the internal ECC codewords 425-d, 425-e, 425-f, and 425-g. The host device may also determine that the data transmission includes the ECC codewords 420-d, 420-e, 420-f, and 420-g and internal ECC codewords 425-d, 425-e, 425-f, and 425-g. In some cases, the set of data 400-c may be transmitted as a single burst (e.g., including the portions of data 415-d, 415-e, 415-f, and 415-g, the ECC codewords 420-d, 420-e, 420-f, and 420-g, and the internal ECC codewords 425-d, 425-e, 425-f, and 425-g). The single burst may be associated with an access command. In some examples, the set of data 400-c may be stored in the memory device as part of a write operation.

The ECC codewords 420-d, 420-e, 420-f, and 420-g may be used for error detection or correction of data stored in the memory device. In some cases, the ECC codewords 420-d, 420-e, 420-f, and 420-g may include a SEC ECC or a SECDED ECC. In such cases, the ECC codewords 420-d, 420-e, 420-f, and 420-g may be stored in the memory device and detect or correct errors associated with the set of data 400-a being stored in the memory device. In some cases, the internal ECC codewords 425-d, 425-e, 425-f, and 425-g may be used for error detection or correction of data stored in a set of data 400-c or the ECC codewords 420-d, 420-e, 420-f, and 420-g. For example, the host device may identify the internal ECC codewords 425-d, 425-e, 425-f, and 425-g and determine whether the set of data 400-c or the ECC codewords 420-d, 420-e, 420-f, and 420-g include an error based on the internal ECC codewords 425-d, 425-e, 425-f, and 425-g.

In some cases, a plurality of ECC codewords 420-d, 420-e, 420-f, and 420-g may be generated for error correction or detection based on the portions of data 415-d, 415-e, 415-f, and 415-g. For example, the portion of data 415-d may have an ECC codeword 420-d included therewith, and the portion of data 415-e may have an ECC codeword 420-e included therewith. By generating ECC codewords for more smaller portions of data, more errors may be detected and/or correct.

In some examples, the internal ECC codewords 425-d, 425-e, 425-f, and 425-g may be generated for error correction or detection based on the ECC codewords 420-d, 420-e, 420-f, and 420-g. For example, ECC codeword 420-d may have an internal ECC codeword 425-d included therewith, and ECC codeword 420-e may have an internal ECC codeword 425-e included therewith. In such cases, the internal ECC codeword 425-d, 425-e, 425-f, and 425-g may be associated with the ECC codeword 420-b and 425-c, respectively. For example, the set of data 400-c may be divided up into four or more portions of data (e.g., portions of data 415-d, 415-e, 415-f, and 415-g). In some cases, the four portions of data may be equally sized (e.g., four 64-bit portions of data). In other cases, the four portions of data may be different sizes. The set of data 400-c may also include four or more codewords (e.g., ECC codeword 420-d, 420-e, 420-f, and 420-g), one codeword being generated for each portion of data. In some cases, the codewords may be 8-bit codewords. The set of data 400-c may also include four or more internal codewords (e.g., internal ECC codewords 425-d, 425-e, 425-f, and 425-g), one codeword being generated for each portion of data and its associated codeword 420. In some cases, the internal ECC codewords 425 may be 5-bit codewords. In some cases, the set of data 400-c may include unused data bits.

In some cases, the burst length (e.g., the quantity of unit intervals 405-c associated with a single burst over a channel) of the set of data 400-c may be extended to include the ECC codewords 420-d, 420-e, 420-f, and 420-g, the internal ECC codewords 425-d, 425-e, 425-f, and 425-g, and the portions of data 415-d, 415-e, 415-f, and 415-g in the same set of data 400-c. In such cases, the unit interval 405-c of the set of data 400-c may be extended by four unit intervals 405-c to include the ECC codewords 420-d, 420-e, 420-f, and 420-g, the internal ECC codewords 425-d, 425-e, 425-f, and 425-g in the same set of data 400-*c*. In some cases, the set of data 400-*c* may include unused data bits. Extending the burst length may improve the accuracy of the data stored and communicated in the system and may improve a bandwidth capability of channels of a system that includes the host device and the memory device, in some cases.

The memory device may receive the set of data 400-*c* and identify the ECC codewords 420-*d*, 420-*e*, 420-*f*, and 420-*g* and internal ECC codewords 425-*d*, 425-*e*, 425-*f*, and 425-*g* included in the set of data 400-*c*. The ECC codewords 420-*d*, 420-*e*, 420-*f*, and 420-*g* may be utilized for error correction in a second set of data. In such cases, the second set of data may be stored in a first portion of the memory device, and the ECC codewords 420-*d*, 420-*e*, 420-*f*, and 420-*g* may be stored in a second portion of the memory device different than the first portion. The internal ECC codewords 425-*d*, 425-*e*, 425-*f*, and 425-*g* may be stored in the memory device. For example, the internal ECC codeword 425-*d*, 425-*e*, 425-*f*, and 425-*g* may be stored in a third portion of the memory device different than the first portion and the second portion. In some cases, the memory device may generate the internal ECC codewords 425-*d*, 425-*e*, 425-*f*, and 425-*g* rather than the host device. In such cases, the memory device may store the internal ECC codeword 425-*d*, 425-*e*, 425-*f*, and 425-*g*. The host device may use the one or more internal ECC codewords received from the memory device to detect or correct errors in the data received from the memory device, the ECC codeword received from the memory device, or both.

In some cases, the portions of data 415-*d*, 415-*e*, 415-*f*, and 415-*g*, the ECC codewords 420-*d*, 420-*e*, 420-*f*, and 420-*g*, and the internal ECC codewords 425-*d*, 425-*e*, 425-*f*, and 425-*g* may be retrieved from the memory device. In some examples, the memory device may determine whether the set of data includes an error based on the internal ECC codewords 425-*d*, 425-*e*, 425-*f*, and 425-*g*. In some cases, the memory device may determine a lack of error in the set of data. In other examples, the memory device may identify an error in the set of data and correct the error based on the internal ECC codeword 425-*d*, 425-*e*, 425-*f*, and 425-*g*. The memory device may be configured to receive data and codewords and store data and codewords in any order as part of its operation. The memory device may be configured to retrieve data and codewords and transmit data and codewords in any order as part of its operation.

Figure 5A:
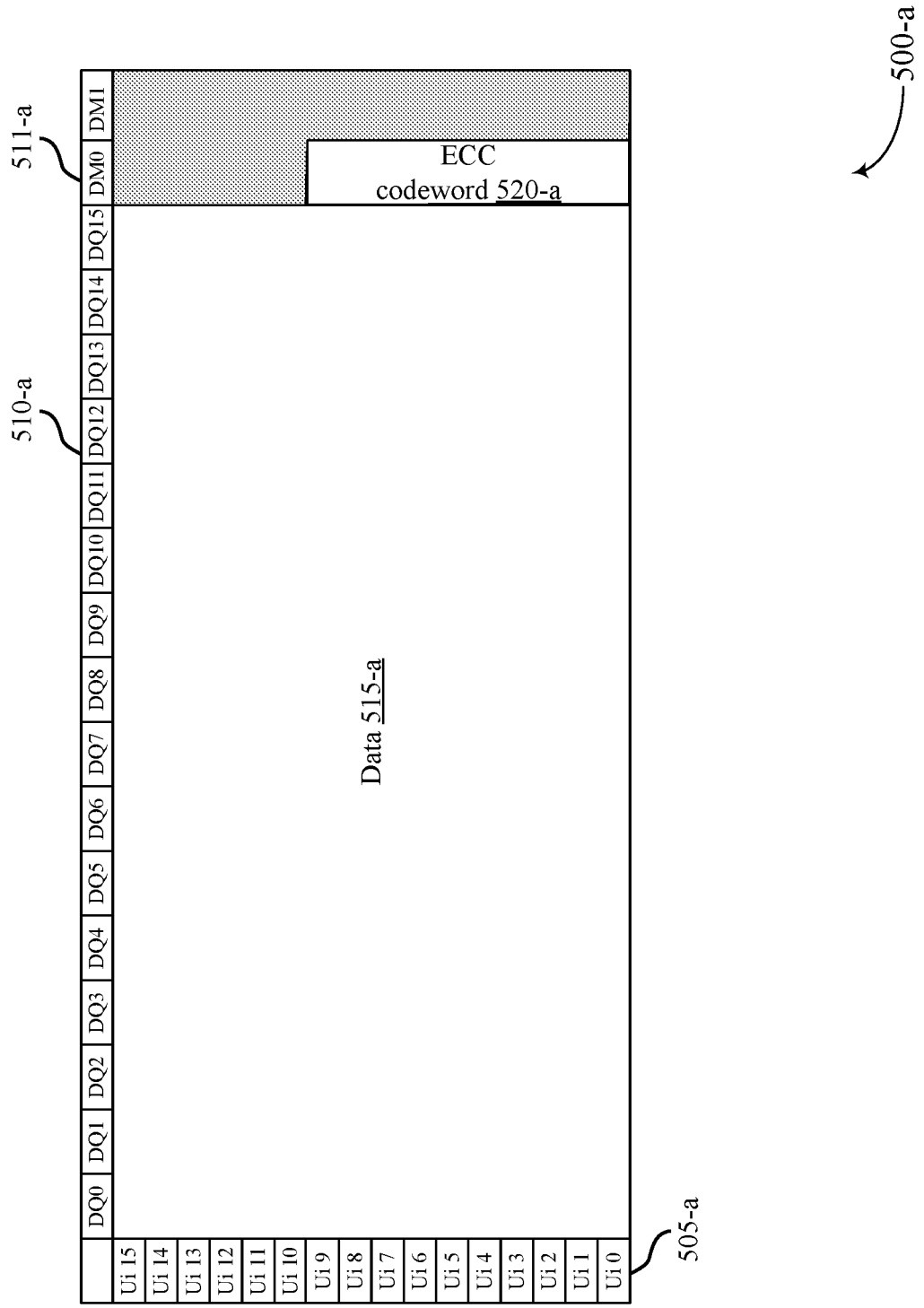
FIG. 5A through 5C illustrate examples of a set of data that support methods and devices for error correction as disclosed herein.

FIG. 5A illustrates an example of a set of data 500-*a* that supports methods and devices for error correction. The set of data 500-*a* may be generated and transmitted by a host device as described with reference to FIGS. 1 and 2, which may be an example of the external memory controller 105 as described with reference to FIG. 1. In some examples, the set of data 500-*a* may be received and stored at a memory device, which may be an example of the memory device 110, the memory dice 160, or the memory die 200 as described with reference to FIGS. 1 and 2. In some examples, the memory device may retrieve and transmit the set of data 500-*a* to the host device.

The set of data 500-*a* may be an example of a burst of data communicated over a two or more different channels (e.g., a data channel 190 and/or another channel 192 such as an ECC channel). The first channel may have a first quantity of pins 510-*a* that defines the width of the first channel. The second channel may have a second quantity of pins 511-*a* that defines a width of the second channel. For example, the first channel may be sixteen (16) pins wide and the second channel may be two (2) pins wide. In other examples, the first channel may be less than sixteen pins wide or more than sixteen pins wide and the second channel may be less than two pins wide or more than two pins wide. The burst of data may also have a plurality of unit intervals 505-*a*, or time resources for communicating at least one symbol (e.g., bit) of data. In systems that use double-data rates, a unit interval may occur at every clock edge. In other systems, a unit interval may occur every clock cycle. In some cases, the set of data 500-*a* may include data 515-*a* associated with an access operation and one or more ECC codewords 520-*a* associated with at least a portion of the data 515-*a*.

The set of data 500-*a* illustrates an example of transmitting data 515-*a* over a first channel (e.g., a data channel) and at least one ECC codeword 520-*a* over a second channel. In some cases, the data 515-*a* and the ECC codewords 520-*a* may be transmitted during the same burst interval. In some cases, the host device may identify data 515-*a* to communicate over a first channel with a width corresponding to a quantity of the pins 510-*a*. The host device may also identify one or more ECC codewords 520-*a* associated with the data 515-*a* to communicate over the second channel with a width corresponding to the quantity of the pins 511-*a*.

The host device or the memory device may transmit data 515-*a* over the first channel and/or the second channel as part of access operations (e.g., read operation or write operation). The host device or the memory device may transmit the ECC codeword 520-*a* over a different channel that the host device or the memory device transmits data 515-*a*. Prior to transmitting the ECC codeword 520-*a*, the host device may generate the ECC codeword 520-*a* based on data 515-*a*. In such cases, the host device or the memory device may transmit the data 515-*a* and the corresponding ECC codeword 520-*a* on different channels. For example, the channel for transmitting the ECC codeword 520-*a* may be used for communicating error correction information associated with the access operation of the memory device. In such cases, the channel for transmitting the ECC codeword 520-*a* may be a link ECC channel.

The ECC codeword 520-*a* may be used for error detection or correction of data stored in the memory device. In some cases, the ECC codeword 520-*a* may include a SEC ECC or a SECDED ECC. In such cases, the ECC codeword 520-*a* may be stored in the memory device and detect or correct errors associated with the set of data 500-*a* being stored in the memory device.

In some cases, a plurality of ECC codewords 520-*a* may be generated for error correction or detection based on the data 515-*a*. For example, the data 515-*a* may be divided into a plurality of portions, each portion of data 515-*a* may have an ECC codeword 520-*a* associated therewith. By generating ECC codewords for more smaller portions of data, more errors may be detected and/or correct. In some cases, the ECC codeword 520-*a* may be associated with all of the data 515-*a*. For example, the data 515-*a* may include 256-bits of data and the ECC codeword 520-*a* may be a 10-bit codeword associated with the 256-bits of data (e.g., data 515-*a*). In other examples, the data 515-*a* and the ECC codeword 520-*a* may be any bit size.

In some cases, the channel width (e.g., the quantity of the pins 510-*a*) associated with a first channel may be extended to include the ECC codeword 520-*a* and the data 515-*a* in the same set of data 500-*a*. In such cases, the quantity of pins 510-*a* may be extended by one or more pins to include the ECC codeword 520-*a* in the same set of data 500-*a* as the data 515-*a*. In some cases, the set of data 500-*a* may include unused data bits. Extending the channel width may improve the accuracy of the data stored and communicated in the system and may improve a bandwidth capability of channels of a system that includes the host device and the memory device, in some cases.

In some cases, the channel width (e.g., the quantity of the pins 511-*a*) associated with a second channel may be extended based on the ECC codeword 520-*a*. In such cases, the quantity of pins 511-*a* may be extended by one or more.

The channel width may be configured according to a signaling scheme between the host device and the memory device. In some cases, the host device may transmit a message to the memory device indicating that transmission may have one or more ECC codewords 520-*a*. The host device or the memory device may also configure a receiver or a driver or both based the message. In such cases, the memory device may receive the data 515-*a* over the first channel and receive the one or more ECC codewords 520-*a* over the second channel after configuring the receiver. In some examples, the host device may transmit a read command. In some cases, the host device may transmit a write command associated with the set of data 500-*a* to the memory device. In such cases, transmitting the data 515-*a* over the first channel and transmitting the one or more ECC codewords 520-*a* over the second channel to the memory device may be based on the write command. The write command may be transmitted over a channel for communicating command and addresses associated with the access operation. In some cases, the data 515-*a* may be stored in the memory device as part of a write operation.

The ECC codeword 520-*a* may be utilized for error correction in a second set of data. In such cases, the second set of data may be stored in a first portion of the memory device, and the ECC codeword 520-*a* may be stored in a second portion of the memory device different than the first portion. In some cases, the data 515-*a* may be retrieved from the memory device, and the ECC codeword 520-*a* may be retrieved from the memory device. In some cases, retrieving the data 515-*a* and the ECC codeword 520-*a* may be based on receiving a read command at the memory device. The host device may use the one or more ECC codewords received from the memory device to detect or correct errors in the data received from the memory device. The memory device may be configured to receive data and codewords and store data and codewords in any order as part of its operation. The memory device may be configured to retrieve data and codewords and transmit data and codewords in any order as part of its operation.

In some cases, the host device may receive a different set of data. For example, the host device may receive the different set of data on a first channel and different codeword on a second channel different than the first channel. In some examples, the host device may determine whether the different set of data includes an error based on the different ECC codeword on the second channel. In some cases, the host device may determine a lack of error in the different set of data. In other examples, the host device may identify an error in the different set of data and correct the error. In such cases, the host device may generate another set of data based on the set of data with the corrected error.

Figure 5B:
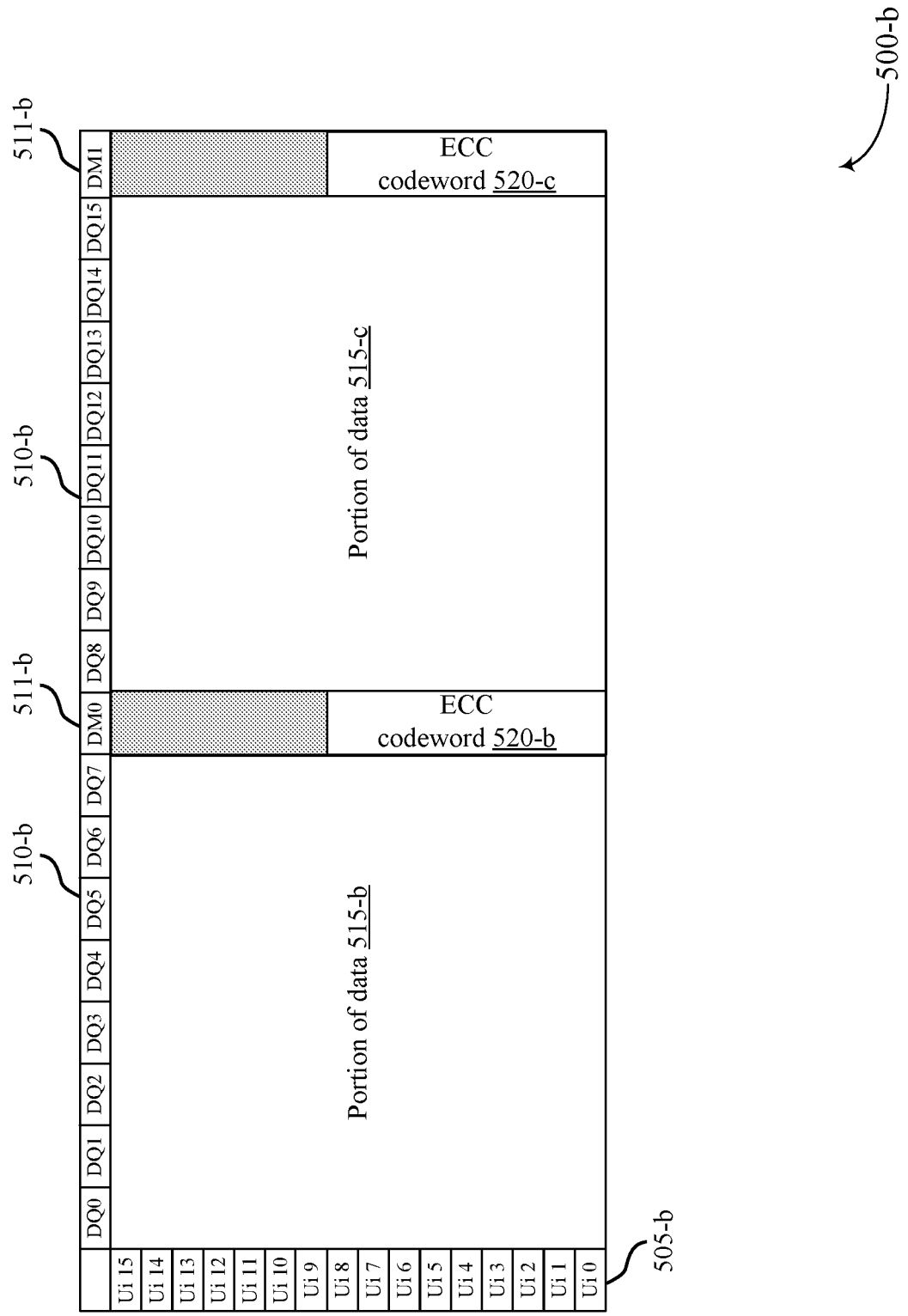

FIG. 5B illustrates an example of a set of data 500-*b* that supports method and devices for error correction. The set of data 500-*b* may be generated and transmitted by a host device as described with reference to FIGS. 1 and 2, which may be an example of the external memory controller 105 as described with reference to FIG. 1. In some examples, the set of data 500-*b* may be received and stored at a memory device, which may be an example of the memory device 110, the memory dice 160, or the memory die 200 as described with reference to FIGS. 1 and 2. In some examples, the memory device may retrieve and transmit the set of data 500-*b* to the host device.

The set of data 500-*b* may be an example of a burst of data communicated over a two or more different channels (e.g., a data channel 190 and/or another channel 192 such as an ECC channel). The first channel may have a first quantity of pins 510-*b* that defines the width of the first channel. The second channel may have a second quantity of pins 511-*b* that defines a width of the second channel. For example, the first channel may be sixteen (16) pins wide and the second channel may be two (2) pins wide. In other examples, the first channel may be less than sixteen pins wide or more than sixteen pins wide and the second channel may be less than two pins wide or more than two pins wide. The burst of data may also have a plurality of unit intervals 505-*b*, or time resources for communicating at least one symbol (e.g., bit) of data. In systems that use double-data rates, a unit interval may occur at every clock edge. In other systems, a unit interval may occur every clock cycle. In some cases, the set of data 500-*b* may include portions of data 515-*b* and 515-*c* associated with an access operation and one or more ECC codewords 520-*b* and 520-*c* associated with at least a portion of the data 515-*b* and 515-*c*.

The set of data 500-*b* illustrates an example of transmitting portions of data 515-*b* and 515-*c* over a channel (e.g., a data channel) and at least one ECC codewords 520-*b* and 520-*c* over a second channel. In some cases, the portions of data 515-*b* and 515-*c* and the ECC codewords 520-*b* and 520-*c* may be transmitted during the same burst interval. In some cases, the host device may identify data 515-*b* to communicate over a first channel with a width corresponding to a quantity of the pins 510-*b*. The host device may also identify one or more ECC codewords 520-*b* associated with the data 515-*b* to communicate over the second channel with a width corresponding to the quantity of the pins 511-*b*.

The host device or the memory device may transmit data 500-*b* over the first channel and/or the second channel as part of access operations (e.g., read operation or write operation). The host device or the memory device may transmit each of the ECC codewords 520-*b* and 520-*c* over a different channel that the host device or the memory device transmitted portions of data 515-*b* and 515-*c*. Prior to transmitting the ECC codewords 520-*b* and 520-*c*, the host device may generate the ECC codewords 520-*b* and 520-*c* based on portions of data 515-*b* and 515-*c*. For example, the ECC codeword 520-*b* may be generated based on portion of data 515-*b*, and the ECC codeword 520-*c* may be generated based on portion of data 515-*c*. In such cases, the host device or the memory device may transmit the portions of data 515-*b* and 515-*c* and the corresponding ECC codewords 520-*b* and 520-*c* on different channels. For example, the channel for transmitting the ECC codewords 520-*b* and 520-*c* may be used for communicating error correction information associated with the access operation of the memory device. In such cases, the channel for transmitting the ECC codewords 520-*b* and 520-*c* may be a link ECC channel.

The ECC codewords 520-*b* and 520-*c* may be used for error detection or correction of data stored in the memory device. In some cases, the ECC codewords 520-*b* and 520-*c* may include a SEC ECC or a SECDED ECC. In such cases, the ECC codewords 520-*b* and 520-*c* may be stored in the memory device and detect or correct errors associated with the set of data 500-*b* being stored in the memory device.

In some cases, a plurality of ECC codewords 520-*b* and 520-*c* may be generated for error correction or detection based on the portions of data 515-*b* and 515-*c*. For example, the data may be divided into a plurality of portions, each portion of portions of data 515-*b* and 515-*c* may have one or more ECC codewords 520-*b* and 520-*c* associated therewith. For example, ECC codeword 520-*b* may be associated with portion of data 515-*b*, and ECC codeword 520-*c* may be associated with portion of data 515-*c*. By generating ECC codewords for more smaller portions of data, more errors may be detected and/or correct. In some cases, the data may include two portions of data and two codewords associated with each portion of data (e.g., portions of data 515-*b* and 515-*c*). In some cases, the two portions of data may be equally sized (e.g., two 128-bit portions of data). In other cases, the two portions of data may be different sizes. The set of data 500-*b* may also include two codewords (e.g., ECC codewords 520-*b* and 520-*c*), one codeword being generated for each portion of data. In some cases, the codewords may be 9-bit codewords.

In some cases, the channel width (e.g., the quantity of the pins 510-*b*) associated with a first channel may be extended to include the ECC codewords 520-*b*, 520-*c* and the data 515-*b*, 515-*c* in the same set of data 500-*b*. In such cases, the quantity of pins 510-*b* may be extended by one or more pins to include the ECC codewords 520-*b*, 520-*c* in the same set of data 500-*b* as the data 515-*b*, 515-*c*. In some cases, the set of data 500-*b* may include unused data bits. Extending the channel width may improve the accuracy of the data stored and communicated in the system and may improve a bandwidth capability of channels of a system that includes the host device and the memory device, in some cases.

In some cases, the channel width (e.g., the quantity of the pins 511-*b*) associated with a second channel may be extended based on the ECC codewords 520-*b* and 520-*c*. In such cases, the quantity of pins 511-*b* may be extended by one or more.

The channel width may be configured according to a signaling scheme between the host device and the memory device. In some cases, the host device may transmit a message to the memory device indicating that transmission may have one or more ECC codewords 520-*b* and 520-*c*. The host device or the memory device may also configure a receiver or a driver or both based on the message. In such cases, the memory device may receive the data 515-*b* and 515-*c* over the first channel and receive the one or more ECC codewords 520-*b* and 520-*c* over the second channel after configuring the receiver. In some examples, the host device may transmit a read command. In some cases, the host device may transmit a write command associated with the set of data 500-*b* to the memory device. In such cases, transmitting the data 515-*b* and 515-*c* over the first channel and transmitting the one or more ECC codewords 520-*b* and 520-*c* over the second channel to the memory device may be based on the write command. The write command may be transmitted over a channel for communicating command and addresses associated with the access operation. In some cases, the portions of data 515-*b* and 515-*c* may be stored in the memory device as part of a write operation.

The ECC codewords 520-*b* and 520-*c* may be utilized for error correction in a second set of data. In such cases, the second set of data may be stored in a first portion of the memory device, and the ECC codewords 520-*b* and 520-*c* may be stored in a second portion of the memory device different than the first portion. In some cases, the portions of data 515-*b* and 515-*c* may be retrieved from the memory device, and the ECC codewords 520-*b* and 520-*c* may be retrieved from the memory device. In some cases, retrieving the portions of data 515-*b* and 515-*c* and the ECC codewords 520-*b* and 520-*c* may be based on receiving a read command at the memory device. The host device may use the one or more ECC codewords received from the memory device to detect or correct errors in the data received from the memory device. The memory device may be configured to receive data and codewords and store data and codewords in any order as part of its operation. The memory device may be configured to retrieve data and codewords and transmit data and codewords in any order as part of its operation.

In some cases, the host device may receive a different set of data. For example, the host device may receive the different set of data on a first channel and different codeword on a second channel different than the first channel. In some examples, the host device may determine whether the different set of data includes an error based on the different ECC codeword on the second channel. In some cases, the host device may determine a lack of error in the different set of data. In other examples, the host device may identify an error in the different set of data and correct the error. In such cases, the host device may generate another set of data based on the set of data with the corrected error.

Figure 5C:
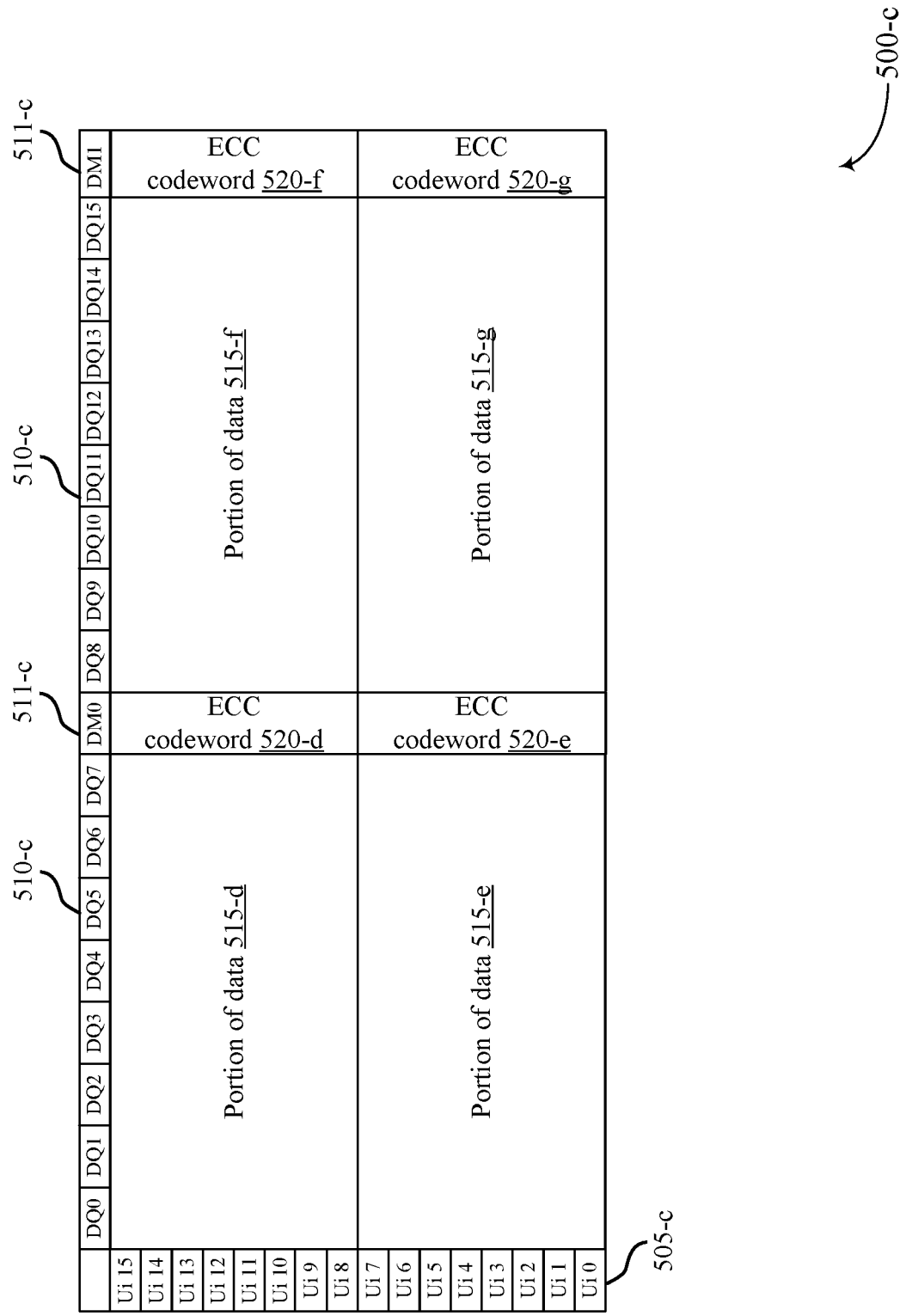

FIG. 5C illustrates an example of a set of data 500-*c* that supports method and devices for error correction. The set of data 500-*c* may be generated and transmitted by a host device as described with reference to FIGS. 1 and 2, which may be an example of the external memory controller 105 as described with reference to FIG. 1. In some examples, the set of data 500-*c* may be received and stored at a memory device, which may be an example of the memory device 110, the memory dice 160, or the memory die 200 as described with reference to FIGS. 1 and 2. In some examples, the memory device may retrieve and transmit the set of data 500-*c* to the host device.

The set of data 500-*c* may be an example of a burst of data communicated over a two or more different channels (e.g., a data channel 190 and/or another channel 192 such as an ECC channel). The first channel may have a first quantity of pins 510-*c* that defines the width of the first channel. The second channel may have a second quantity of pins 511-*c* that defines a width of the second channel. For example, the first channel may be sixteen (16) pins wide and the second channel may be two (2) pins wide. In other examples, the first channel may be less than sixteen pins wide or more than sixteen pins wide and the second channel may be less than two pins wide or more than two pins wide. The burst of data may also have a plurality of unit intervals 505-*c*, or time resources for communicating at least one symbol (e.g., bit) of data. In systems that use double-data rates, a unit interval may occur at every clock edge. In other systems, a unit interval may occur every clock cycle. In some cases, the set of data 500-*c* may include portions of data 515-*d*, 515-*e*, 515-*f*, and 515-*g* associated with an access operation and one or more ECC codewords 520-*d*, 520-*e*, 520-*f*, and 520-*g* associated with at least a portion of the data 515-*d*, 515-*e*, 515-*f*, and 515-*g*.

The set of data 500-*c* illustrates an example of transmitting portions of data 515-*d*, 515-*e*, 515-*f*, and 515-*g* over a channel (e.g., a data channel and at least one ECC codewords 520-*d*, 520-*e*, 520-*f*, and 520-*g* over a second channel. In some cases, the portions of data 515-*d*, 515-*e*, 515-*f*, and 515-*g* and the ECC codewords 520-*d*, 520-*e*, 520-*f*, and 520-*g* may be transmitted during the same burst interval. In some cases, the host device may identify data 515-*c* to communicate over a first channel with a width corresponding to a quantity of the pins 510-*c*. The host device may also identify one or more ECC codewords 520-*c* associated with the data 515-c to communicate over the second channel with a width corresponding to the quantity of the pins 511-c.

The host device or the memory device may transmit data 500-c over the first channel and/or the second channel as part of access operations (e.g., read operation or write operation). The host device or the memory device may transmit each of the ECC codewords 520-d, 520-e, 520-f, and 520-g over a different channel that the host device or the memory device transmitted portions of data 515-d, 515-e, 515-f, and 515-g. Prior to transmitting the ECC codewords 520-d, 520-e, 520-f, and 520-g, the host device may generate the ECC codewords 520-d, 520-e, 520-f, and 520-g based on portions of data 515-d, 515-e, 515-f, and 515-g. For example, the ECC codeword 520-d may be generated based on portion of data 515-d, and the ECC codeword 520-e may be generated based on portion of data 515-e. In such cases, the host device or the memory device may transmit the portions of data 515-d, 515-e, 515-f, and 515-g and the corresponding ECC codewords 520-d, 520-e, 520-f, and 520-g on different channels. For example, the channel for transmitting the ECC codewords 520-d, 520-e, 520-f, and 520-g may be used for communicating error correction information associated with the access operation of the memory device. In such cases, the channel for transmitting the ECC codewords 520-d, 520-e, 520-f, and 520-g may be a link ECC channel.

The ECC codewords 520-d, 520-e, 520-f, and 520-g may be used for error detection or correction of data stored in the memory device. In some cases, the ECC codewords 520-d, 520-e, 520-f, and 520-g may include a SEC ECC or a SECDED ECC. In such cases, the ECC codewords 520-d, 520-e, 520-f, and 520-g may be stored in the memory device and detect or correct errors associated with the set of data 500-c being stored in the memory device.

In some cases, a plurality of ECC codewords 520-d, 520-e, 520-f, and 520-g may be generated for error correction or detection based on a plurality of portions of data 515-d, 515-e, 515-f, and 515-g. For example, the data may be divided into a plurality of portions, each portion of portions of data 515-d, 515-e, 515-f, and 515-g may have one or more ECC codewords 520-d, 520-e, 520-f, and 520-g associated therewith. For example, ECC codeword 520-d may be associated with portion of data 515-d, and ECC codeword 520-e may be associated with portion of data 515-e. By generating ECC codewords for more smaller portions of data, more errors may be detected and/or correct. In some cases, the portion of data may include four portions of data and four codeword associated with each of the portions of data (e.g., portions of data 515-d, 515-e, 515-f, and 515-g). In some cases, the four or more portions of data may be equally sized (e.g., four 64-bit portions of data). In other cases, the four or more portions of data may be different sizes. The set of data 500-c may also include four or more codewords (e.g., ECC codewords 520-d, 520-e, 520-f, and 520-g), one codeword being generated for each portion of data. In some cases, the codewords may be 8-bit codewords.

In some cases, the channel width (e.g., the quantity of the pins 510-c) associated with a first channel may be extended to include the ECC codewords 520-d, 520-e, 520-f, 520-g and the data 515-d, 515-e, 515-f, 515-g in the same set of data 500-c. In such cases, the quantity of pins 510-c may be extended by one or more pins to include the ECC codewords 520-d, 520-e, 520-f, 520-g in the same set of data 500-b as the data 515-b. Extending the channel width may improve the accuracy of the data stored and communicated in the system and may improve a bandwidth capability of channels of a system that includes the host device and the memory device, in some cases.

In some cases, the channel width (e.g., the quantity of the pins 511-c) associated with a second channel may be extended based on the ECC codewords 520-d, 520-e, 520-f, and 520-g. In such cases, the quantity of pins 511-b may be extended by one or more.

The channel width may be configured according to a signaling scheme between the host device and the memory device. In some cases, the host device may transmit a message to the memory device indicating that transmission may have one or more ECC codewords 520-d, 520-e, 520-f, and 520-g. The host device or the memory device may also configure a receiver or a driver or both based on the message. In such cases, the memory device may receive the data 515-d, 515-e, 515-f, and 515-g over the first channel and receive the one or more ECC codewords 520-d, 520-e, 520-f, and 520-g over the second channel after configuring the receiver. In some examples, the host device may transmit a read command. In some cases, the host device may transmit a write command associated with the set of data 500-c to the memory device. In such cases, transmitting the data 515-d, 515-e, 515-f, and 515-g over the first channel and transmitting the one or more ECC codewords 520-d, 520-e, 520-f, and 520-g over the second channel to the memory device may be based on the write command. The write command may be transmitted over a channel for communicating command and addresses associated with the access operation. In some cases, the portions of data 515-d, 515-e, 515-f, and 515-g may be stored in the memory device as part of a write operation.

The ECC codewords 520-d, 520-e, 520-f, and 520-g may be utilized for error correction in a second set of data. In such cases, the second set of data may be stored in a first portion of the memory device, and the ECC codewords 520-d, 520-e, 520-f, and 520-g may be stored in a second portion of the memory device different than the first portion. In some cases, the portions of data 515-d, 515-e, 515-f, and 515-g may be retrieved from the memory device, and the ECC codewords 520-d, 520-e, 520-f, and 520-g may be retrieved from the memory device. In some cases, retrieving the portions of data 515-d, 515-e, 515-f, and 515-g and the ECC codewords 520-d, 520-e, 520-f, and 520-g may be based on receiving a read command at the memory device. The host device may use the one or more ECC codewords received from the memory device to detect or correct errors in the data received from the memory device. The memory device may be configured to receive data and codewords and store data and codewords in any order as part of its operation. The memory device may be configured to retrieve data and codewords and transmit data and codewords in any order as part of its operation.

In some cases, the host device may receive a different set of data. For example, the host device may receive the different set of data on a first channel and different codeword on a second channel different than the first channel. In some examples, the host device may determine whether the different set of data includes an error based on the different ECC codeword on the second channel. In some cases, the host device may determine a lack of error in the different set of data. In other examples, the host device may identify an error in the different set of data and correct the error. In such cases, the host device may generate another set of data based on the set of data with the corrected error.

Figure 6A:
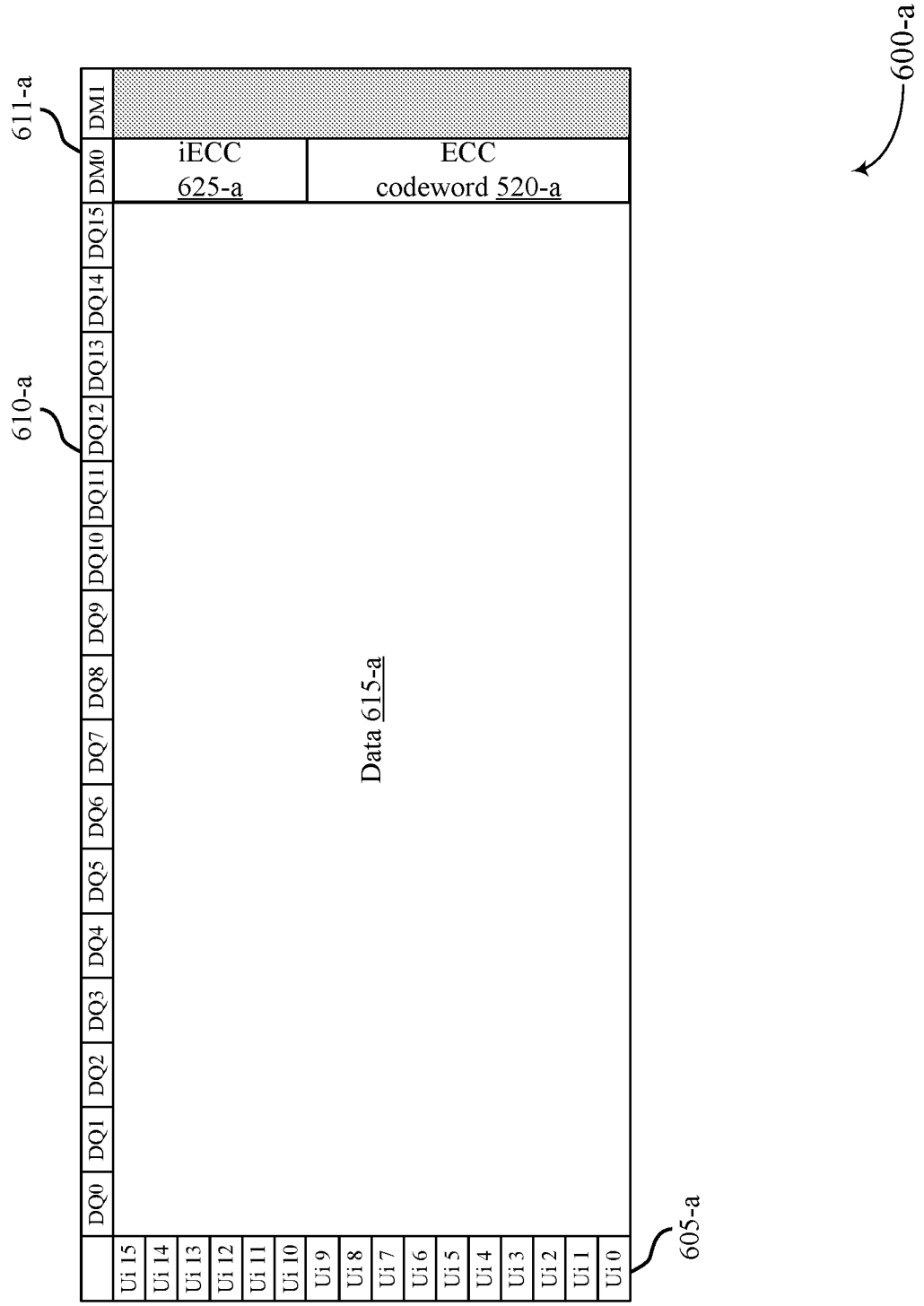
FIG. 6A through 6C illustrate examples of a set of data that support methods and devices for error correction as disclosed herein.

FIG. 6A illustrates an example of a set of data 600-a that supports method and devices for error correction. The set of data 600-*a* may be generated and transmitted by a host device as described with reference to FIGS. 1 and 2, which may be an example of the external memory controller 105 as described with reference to FIG. 1. In some examples, the set of data 600-*a* may be received and stored at a memory device, which may be an example of the memory device 110, the memory dice 160, or the memory die 200 as described with reference to FIGS. 1 and 2. In some examples, the memory device may retrieve and transmit the set of data 600-*a* to the host device.

The set of data 600-*a* may be an example of a burst of data communicated over a two or more different channels (e.g., a data channel 190 and/or another channel 192 such as an ECC channel). The first channel may have a first quantity of pins 610-*a* that defines the width of the first channel. The second channel may have a second quantity of pins 611-*a* that defines a width of the second channel. For example, the first channel may be sixteen (16) pins wide and the second channel may be two (2) pins wide. In other examples, the first channel may be less than sixteen pins wide or more than sixteen pins wide and the second channel may be less than two pins wide or more than two pins wide. The burst of data may also have a plurality of unit intervals 605-*a*, or time resources for communicating at least one symbol (e.g., bit) of data. In systems that use double-data rates, a unit interval may occur at every clock edge. In other systems, a unit interval may occur every clock cycle. In some cases, the set of data 600-*a* may include data 615-*a* associated with an access operation. The set of data 600-*a* may also include one or more ECC codewords 620-*a*. The one or more ECC codewords 620-*a* may be associated with at least a portion of the data 615-*a*. The set of data 600-*a* may also include one or more internal ECC codewords 625-*a*.

The set of data 600-*a* illustrates an example of transmitting data 615-*a* over a first channel (e.g., a data channel) and at least one ECC codeword 620-*a* and/or at least one internal ECC codeword 625-*a* over one or more other channels. In some cases, the data 615-*a*, the ECC codewords 620-*a*, and the internal ECC codewords 625-*a* may be transmitted during the same burst interval. In some cases, the host device may identify data 615-*a* to communicate over a first channel with a width corresponding to a quantity of the pins 610-*a*. The host device may also identify one or more ECC codewords 620-*a* and/or internal ECC codewords 625-*a* associated with the data 615-*a* to communicate over the one or more other channels with a width corresponding to the quantity of the pins 511-*a*.

The host device or memory device may transmit data 615-*a* over the first channel and/or the second channel as part of access operations (e.g., read operation or write operation). The host device or the memory device may transmit the ECC codeword 620-*a* and the internal ECC codeword 625-*a* over a different channel that the host device or the memory device transmitted the data 615-*a*. Prior to transmitting the ECC codeword 620-*a*, the host device may generate the ECC codeword 620-*a* based on data 615-*a*. The channel for transmitting the ECC codeword 620-*a* may be used for communicating error correction information associated with the access operation of the memory device. In such cases, the channel for transmitting the ECC codeword 620-*a* may be a link ECC channel. In some cases, the internal ECC codeword 625-*a* may be generated for error correction in the set of data, for error correction in the ECC codeword 620-*a*, or both. In such cases, the internal ECC codeword 625-*a* may be generated based on data 615-*a* and the ECC codeword 620-*a*.

In such cases, the host device or memory device may transmit the set of data 600-*a* which includes the data 615-*a*, the ECC codeword 620-*a*, and the internal ECC codeword 625-*a*. The host device may also determine that the data transmission includes the ECC codeword 620-*a* and internal ECC codeword 625-*a*. In some cases, the set of data 600-*a* may be transmitted as a single burst (e.g., including the data 615-*a*, the ECC codeword 620-*a*, and the internal ECC codeword 625-*a*). The single burst may be associated with an access command. In some examples, the set of data 600-*a* may be stored in the memory device as part of a write operation.

The ECC codeword 620-*a* may be used for error detection or correction of data stored in the memory device. In some cases, the ECC codeword 620-*a* may include a SEC ECC or a SECDED ECC. In such cases, the ECC codeword 620-*a* may be stored in the memory device and detect or correct errors associated with the set of data 600-*a* being stored in the memory device. In some cases, the internal ECC codeword 625-*a* may be used for error detection or correction of data stored in a set of data or the ECC codeword 620-*a*. For example, the host device may identify the internal ECC codeword 625-*a* and determine whether the set of data or the ECC codeword 620-*a* includes an error based on the internal ECC codeword 625-*a*.

In some cases, a plurality of ECC codewords 620-*a* may be generated for error correction or detection based on the portions of data 615-*b* and 615-*c*. For example, the portions of data 615-*b* and 615-*c* may be divided into a plurality of portions, each portion of portions of data 615-*b* and 615-*c* may have an ECC codeword 620-*a* included therewith. By generating ECC codewords for more smaller portions of data, more errors may be detected and/or correct. In some cases, the ECC codeword 620-*a* may be associated with all of the portions of data 615-*b* and 615-*c*. In some examples, the internal ECC codeword 625-*a* may be generated for error correction or detection based on the ECC codeword 620-*a* and/or the data 615-*a*. For example, each ECC codeword 620-*a* may have an internal ECC codeword 625-*a* included therewith. In such cases, the internal ECC codeword 625-*a* may be associated with the ECC codeword 620-*a* and the data 615-*a*. For example, the data 615-*a* may include 256-bits of data, the ECC codeword 620-*a* may be a 10-bit codeword associated with the 256-bits of data (and the internal ECC codeword 625-*a* may be a 6-bit codeword associated with the 10-bit codeword (e.g., ECC codeword 620-*a*) and/or the 256-bits of data (e.g., data 615-*a*). In other examples, the data 615-*a*, the ECC codeword 620-*a*, and internal ECC codeword 625-*a* and may be any bit size.

In some cases, the channel width (e.g., the quantity of pins 610-*a*) associated with a first channel may be extended to include the ECC codeword 620-*a*, and/or the internal ECC codeword 625-*a* in the same set of data 600-*a* as the data 615-*a*. In such cases, the quantity of pins 610-*a* of the set of data 600-*a* may be extended by two pins 610-*a* to include the ECC codeword 620-*a* and the internal ECC codeword 625-*a* in the same set of data 600-*a* as the portions of data 615-*b* and 615-*c*. In some cases, the set of data 600-*a* may include unused data bits. Extending the channel width may improve the accuracy of the data stored and communicated in the system and may improve a bandwidth capability of channels of a system that includes the host device and the memory device, in some cases.

In some cases, the channel width (e.g., the quantity of the pins 611-*a*) associated with a second channel may be extended based on the ECC codeword 620-*a*. In such cases, the quantity of pins 611-*a* may be extended by one or more.

The channel width may be configured according to a signaling scheme between the host device and the memory device. In some cases, the host device may transmit a message to the memory device indicating that transmission may have one or more ECC codewords 620-*a* and internal ECC codewords 625-*a*. The host device or the memory device may also configure a receiver or a driver or both based the message. In such cases, the memory device may receive the data 615-*a* over the first channel and receive the one or more ECC codewords 620-*a* and the one or more internal ECC codewords 625-*a* over the one or more other channels after configuring the receiver. In some examples, the host device may transmit a read command. In some cases, the host device may transmit a write command associated with the set of data 600-*a* to the memory device. In such cases, transmitting the set of data 600-*a* to the memory device may be based on the write command. The write command may be transmitted over a channel for communicating command and addresses associated with the access operation. In some cases, the portions of data 615-*b* and 615-*c* may be stored in the memory device as part of a write operation.

The ECC codeword 620-*a* may be utilized for error correction in a second set of data. In such cases, the second set of data may be stored in a first portion of the memory device, and the ECC codeword 620-*a* may be stored in a second portion of the memory device different than the first portion. The internal ECC codeword 625-*a* may be stored in the memory device. For example, the internal ECC codeword 625-*a* may be stored in a third portion of the memory device different than the first portion and the second portion. In some cases, the memory device may generate the internal ECC codeword 625-*a* rather than the host device. In such cases, the memory device may store the internal ECC codeword 625-*a*. The host device may use the one or more internal ECC codewords received from the memory device to detect or correct errors in the data received from the memory device, the ECC codeword received from the memory device, or both. The memory device may be configured to receive data and codewords and store data and codewords in any order as part of its operation. The memory device may be configured to retrieve data and codewords and transmit data and codewords in any order as part of its operation.

In some cases, the portions of data 615-*b* and 615-*c*, the ECC codeword 620-*a*, and the internal ECC codeword 625-*a* may be retrieved from the memory device. In some examples, the memory device may determine whether the set of data includes an error based on the internal ECC codeword 625-*a*. In some cases, the memory device may determine a lack of error in the set of data. In other examples, the memory device may identify an error in the set of data and correct the error based on the internal ECC codeword 625-*a*.

Figure 6B:
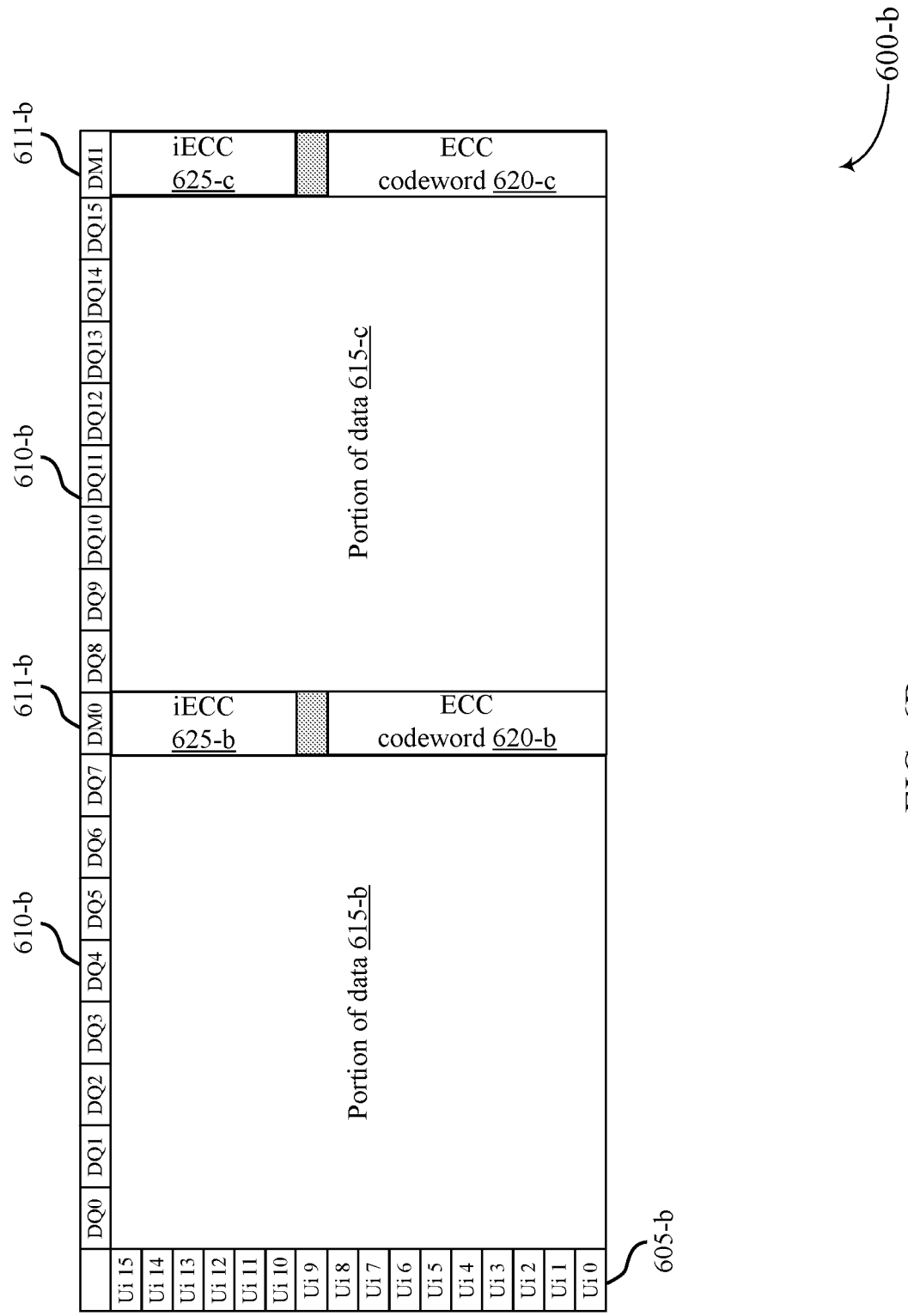

FIG. 6B illustrates an example of a set of data 600-*b* that supports method and devices for error correction. The set of data 600-*b* may be generated and transmitted by a host device as described with reference to FIGS. 1 and 2, which may be an example of the external memory controller 105 as described with reference to FIG. 1. In some examples, the set of data 600-*b* may be received and stored at a memory device, which may be an example of the memory device 110, the memory dice 160, or the memory die 200 as described with reference to FIGS. 1 and 2. In some examples, the memory device may retrieve and transmit the set of data 600-*b* to the host device.

The set of data 600-*b* may be an example of a burst of data communicated over a two or more different channels (e.g., a data channel 190 and/or another channel 192 such as an ECC channel). The first channel may have a first quantity of pins 610-*b* that defines the width of the first channel. The second channel may have a second quantity of pins 611-*b* that defines a width of the second channel. For example, the first channel may be sixteen (16) pins wide and the second channel may be two (2) pins wide. In other examples, the first channel may be less than sixteen pins wide or more than sixteen pins wide and the second channel may be less than two pins wide or more than two pins wide. The burst of data may also have a plurality of unit intervals 605-*b*, or time resources for communicating at least one symbol (e.g., bit) of data. In systems that use double-data rates, a unit interval may occur at every clock edge. In other systems, a unit interval may occur every clock cycle. In some cases, the set of data 600-*b* may include portions of data 615-*b* and 615-*c* associated with an access operation. The set of data 600-*b* may also include one or more ECC codewords 620-*b* and 620-*c*. The one or more ECC codewords 620-*b* and 620-*c* may be associated with at least a portion of the 615-*b* and 615-*c*, respectively. The set of data 600-*a* may also include one or more internal ECC codewords 625-*b* and 625-*c*.

The set of data 600-*b* illustrates an example of transmitting data 615-*b* and 615-*c* over a first channel (e.g., a data channel) and at least one ECC codeword 620-*b*, 620-*c* and/or at least one internal ECC codeword 625-*b*, 625-*c* over one or more other channels. In some cases, the data 615-*b*, 615-*c*, the ECC codewords 620-*b*, 620-*c*, and the internal ECC codewords 625-*b*, 625-*c* may be transmitted during the same burst interval. In some cases, the host device may identify data 615-*b*, 615-*c* to communicate over a first channel with a width corresponding to a quantity of the pins 610-*b*. The host device may also identify one or more ECC codewords 620-*b*, 620-*c* and/or internal ECC codewords 625-*b*, 625-*c* associated with the data 615-*b*, 615-*c* to communicate over the one or more other channels with a width corresponding to the quantity of the pins 611-*b*.

The host device or memory device may transmit portions of data 615-*b* and 615-*c* over the first channel and/or the one or more other channels as part of access operations (e.g., read operation or write operation). The host device or the memory device may transmit the ECC codeword 620-*b* and 620-*c* and the internal ECC codeword 625-*b* and 625-*c* over a different channel that the host device or the memory device transmitted portions of data 615-*b* and 615-*c*. Prior to transmitting the ECC codeword 620-*b* and 620-*c*, the host device may generate the ECC codeword 620-*b* and 620-*c* based on portions of data 615-*b* and 615-*c*. For example, the ECC codeword 620-*b* may be generated based on the portion of data 615-*b*, and the ECC codeword 620-*c* may be generated based on the portion of data 615-*c*.

The channel for transmitting the ECC codeword 620-*b* and 620-*c* may be used for communicating error correction information associated with the access operation of the memory device. In such cases, the channel for transmitting the ECC codeword 620-*b* and 620-*c* may be a link ECC channel. In some cases, the internal ECC codeword 625-*b* and 625-*c* may be generated for error correction in the set of data, for error correction in the ECC codeword 620-*b* and 620-*c*, or both. In such cases, the internal ECC codeword 625-*b* and 625-*c* may be generated based on portions of data 615-*b* and 615-*c* and the ECC codeword 620-*b* and 620-*c*. For example, the internal ECC codeword 625-*b* may be generated based on the ECC codeword 620-*b*, and the internal ECC codeword 625-*c* may be generated based on the ECC codeword 620-*c*.

In such cases, the host device or memory device may transmit the set of data 600-*b* which includes the portions of data 615-*b* and 615-*c*, the ECC codeword 620-*b* and 620-*c*, and the internal ECC codeword 625-*b* and 625-*c*. The host device may also determine that the data transmission includes the ECC codeword 620-*b* and 620-*c* and internal ECC codeword 625-*b* and 625-*c*. In some cases, the set of data 600-*b* may be transmitted as a single burst (e.g., including the portions of data 615-*b* and 615-*c*, the ECC codeword 620-*b* and 620-*c*, and the internal ECC codeword 625-*b* and 625-*c*). The single burst may be associated with an access command. In some examples, the set of data 600-*b* may be stored in the memory device as part of a write operation.

The ECC codeword 620-*b* and 620-*c* may be used for error detection or correction of data stored in the memory device. In some cases, the ECC codeword 620-*b* and 620-*c* may include a SEC ECC or a SECDED ECC. In such cases, the ECC codeword 620-*b* and 620-*c* may be stored in the memory device and detect or correct errors associated with the set of data 600-*b* being stored in the memory device. In some cases, the internal ECC codeword 625-*b* and 625-*c* may be used for error detection or correction of data stored in a set of data or the ECC codeword 620-*b* and 620-*c*. For example, the host device may identify the internal ECC codeword 625-*b* and 625-*c* and determine whether the set of data or the ECC codeword 620-*b* and 620-*c* includes an error based on the internal ECC codeword 625-*b* and 625-*c*, respectively.

In some cases, a plurality of ECC codewords 620-*b* and 620-*c* may be generated for error correction or detection based on the portions of data 615-*b* and 615-*c*. For example, the portions of data 615-*b* may have an ECC codeword 620-*b* and an internal ECC codeword 625-*b* included therewith. By generating ECC codewords for more smaller portions of data, more errors may be detected and/or correct. In some examples, the internal ECC codeword 625-*b* and 625-*c* may be generated for error correction or detection based on the ECC codeword 620-*b* and 620-*c* and/or the data 615-*b*, 615-*c*. For example, ECC codeword 620-*b* may have an internal ECC codeword 625-*b* included therewith. In such cases, the internal ECC codewords 625-*b* and 625-*c* may be associated with the ECC codeword 620-*b* and 620-*c* and the portions of data 615-*b* and 615-*c*, respectively. For example, the data may include two portions of data. In some cases, the two portions of data may be equally sized (e.g., two 128-bit portions of data). In other cases, the two portions of data may be different sizes. The ECC codewords may be a two codewords associated with each of the two portions data (e.g., portions of data 615-*b* and 615-*c*), one codeword being generated for each portion of data. In some cases, the codewords may be 9-bit codewords. The internal ECC codewords may be two codewords associated with the two codewords (e.g., ECC codeword 620-*b* and 620-*c*) and/or the two portions of data (e.g., data 615-*b*, 615-*c*). In some cases, the internal ECC codewords may be 6-bit codewords. In other examples, the data 615-*b*, 615-*c*, the ECC codewords 620-*b*, 620-*c*, and internal ECC codewords 625-*b*, 625-*c* and may be any bit size.

In some cases, the channel width (e.g., the quantity of pins 610-*b*) associated with a first channel may be extended to include the ECC codewords 620-*b* and 620-*c*, and/or the internal ECC codewords 625-*b* and 625-*c*, and the portions of data 615-*b* and 615-*c* in the same set of data 600-*b*. In such cases, the quantity of pins 610-*b* of the set of data 600-*b* may be extended by two pins 610-*b* to include the ECC codeword 620-*b* and 620-*c* and the internal ECC codeword 625-*b* and 625-*c* in the same set of data 600-*b* as the portions of data 615-*b* and 615-*c*. In some cases, the set of data 600-*b* may include unused data bits. Extending the channel width may improve the accuracy of the data stored and communicated in the system and may improve a bandwidth capability of channels of a system that includes the host device and the memory device, in some cases.

In some cases, the channel width (e.g., the quantity of the pins 611-*b*) associated with the one or more other channels may be extended based on the ECC codewords 620-*b*, 620-*c* and/or the internal ECC codewords 625-*b*, 625-*c*. In such cases, the quantity of pins 611-*b* may be extended by one or more.

The channel width may be configured according to a signaling scheme between the host device and the memory device. In some cases, the host device may transmit a message to the memory device indicating that transmission may have one or more ECC codewords 620-*b* and 620-*c* and internal ECC codewords 625-*b* and 625-*c*. The host device or the memory device may also configure a receiver or a driver or both based the message. In such cases, the memory device may receive the data 615-*b*, 615-*c* over the first channel and receive the one or more ECC codewords 620-*b*, 620-*c* and the one or more internal ECC codewords 625-*b*, 625-*c* over the one or more other channels after configuring the receiver. In some examples, the host device may transmit a read command. In some cases, the host device may transmit a write command associated with the set of data 600-*b* to the memory device. In such cases, transmitting the set of data 600-*b* to the memory device may be based on the write command. The write command may be transmitted over a channel for communicating command and addresses associated with the access operation. In some cases, the portions of data 615-*b* and 615-*c* may be stored in the memory device as part of a write operation.

The ECC codeword 620-*b* and 620-*c* may be utilized for error correction in a second set of data. In such cases, the second set of data may be stored in a first portion of the memory device, and the ECC codeword 620-*b* and 620-*c* may be stored in a second portion of the memory device different than the first portion. The internal ECC codeword 625-*b* and 625-*c* may be stored in the memory device. For example, the internal ECC codeword 625-*b* and 625-*c* may be stored in a third portion of the memory device different than the first portion and the second portion. In some cases, the memory device may generate the internal ECC codeword 625-*b* and 625-*c* rather than the host device. In such cases, the memory device may store the internal ECC codeword 625-*b* and 625-*c*. The host device may use the one or more internal ECC codewords received from the memory device to detect or correct errors in the data received from the memory device, the ECC codeword received from the memory device, or both. The memory device may be configured to receive data and codewords and store data and codewords in any order as part of its operation. The memory device may be configured to retrieve data and codewords and transmit data and codewords in any order as part of its operation.

In some cases, the portions of data 615-*b* and 615-*c*, the ECC codeword 620-*b* and 620-*c*, and the internal ECC codeword 625-*b* and 625-*c* may be retrieved from the memory device. In some examples, the memory device may determine whether the set of data includes an error based on the internal ECC codeword 625-*b* and 625-*c*. In some cases, the memory device may determine a lack of error in the set of data. In other examples, the memory device may identify an error in the set of data and correct the error based on the internal ECC codeword 625-*b* and 625-*c*.

Figure 6C:
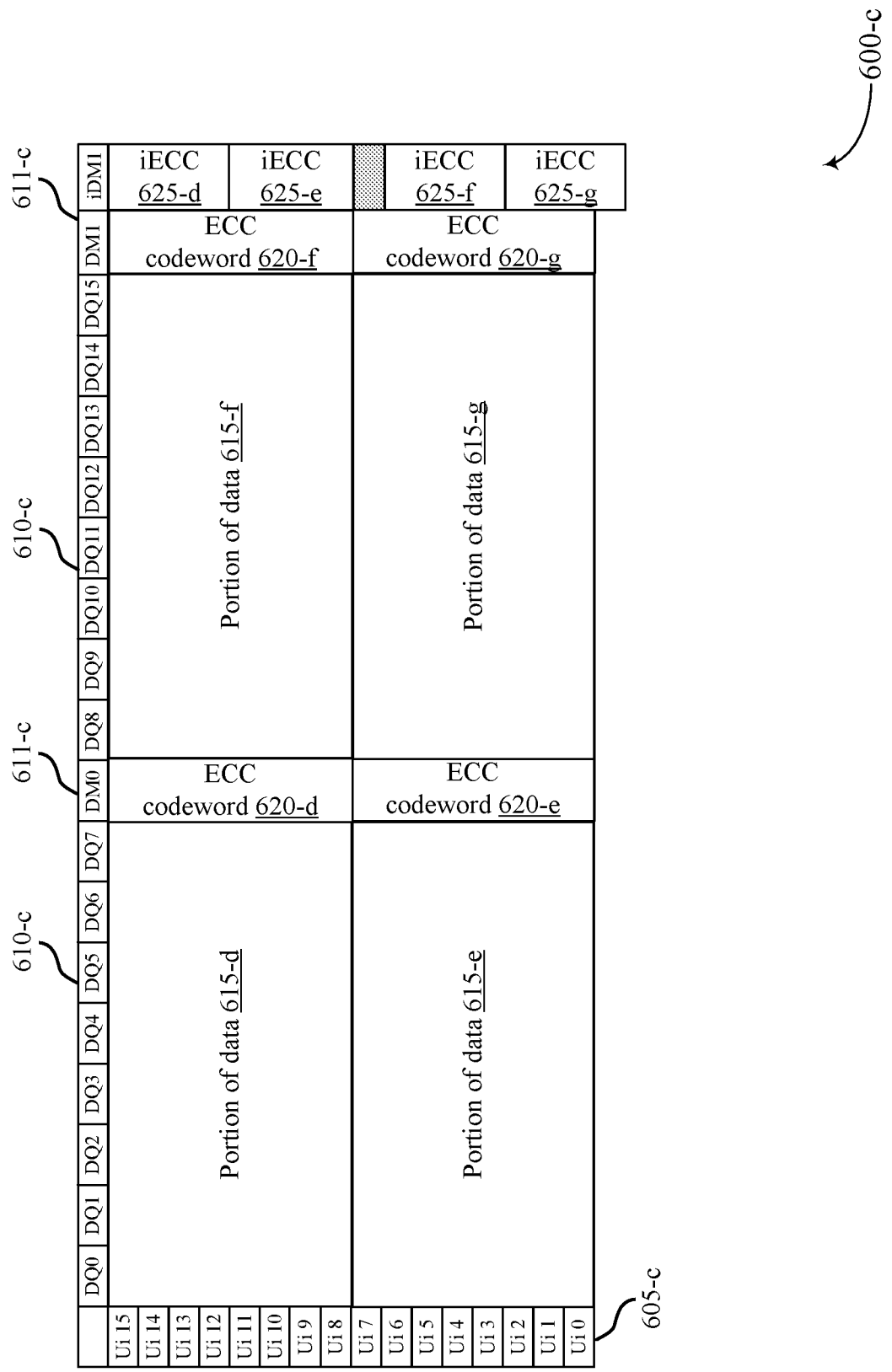

FIG. 6C illustrates an example of a set of data 600-*c* that supports method and devices for error correction. The set of data 600-*c* may be generated and transmitted by a host device as described with reference to FIGS. 1 and 2, which may be an example of the external memory controller 105 as described with reference to FIG. 1. In some examples, the set of data 600-*c* may be received and stored at a memory device, which may be an example of the memory device 110, the memory dice 160, or the memory die 200 as described with reference to FIGS. 1 and 2. In some examples, the memory device may retrieve and transmit the set of data 600-*c* to the host device.

The set of data 600-*c* may be an example of a burst of data communicated over a two or more different channels (e.g., a data channel 190 and/or another channel 192 such as an ECC channel). The first channel may have a first quantity of pins 610-*c* that defines the width of the first channel. The second channel may have a second quantity of pins 611-*c* that defines a width of the second channel. For example, the first channel may be sixteen (16) pins wide and the second channel may be two (2) pins wide. In other examples, the first channel may be less than sixteen pins wide or more than sixteen pins wide and the second channel may be less than two pins wide or more than two pins wide. The burst of data may also have a plurality of unit intervals 605-*c*, or time resources for communicating at least one symbol (e.g., bit) of data. In systems that use double-data rates, a unit interval may occur at every clock edge. In other systems, a unit interval may occur every clock cycle. In some cases, the set of data 600-*c* may include portions of data 615-*d*, 615-*e*, 615-*f*, and 615-*g* associated with an access operation. The set of data 600-*c* may also include one or more ECC codewords 620-*d*, 620-*e*, 620-*f*, and 620-*g*. The one or more ECC codewords 620-*d*, 620-*e*, 620-*f*, and 620-*g* may be associated with at least a portion of the 615-*d*, 615-*e*, 615-*f*, and 615-*g*, respectively. The set of data 600-*a* may also include one or more internal ECC codewords 625-*d*, 625-*e*, 625-*f*, and 625-*g*.

The set of data 600-*c* illustrates an example of transmitting data 615-*d*, 615-*e*, 615-*f*, and 615-*g* over a first channel (e.g., a data channel) and at least one ECC codeword 620-*d*, 620-*e*, 620-*f*, and 620-*g* and/or at least one internal ECC codeword 625-*d*, 625-*e*, 625-*f*, and 625-*g* over one or more other channels. In some cases, the data 615-*d*, 615-*e*, 615-*f*, and 615-*g*, the ECC codewords 620-*d*, 620-*e*, 620-*f*, and 620-*g*, and the internal ECC codewords 625-*d*, 625-*e*, 625-*f*, and 625-*g* may be transmitted during the same burst interval. In some cases, the host device may identify data 615-*d*, 615-*e*, 615-*f*, and 615-*g* to communicate over a first channel with a width corresponding to a quantity of the pins 610-*c*. The host device may also identify one or more ECC codewords 620-*d*, 620-*e*, 620-*f*, and 620-*g* and/or internal ECC codewords 625-*d*, 625-*e*, 625-*f*, and 625-*g* associated with the data 615-*d*, 615-*e*, 615-*f*, and 615-*g* to communicate over the one or more other channels with a width corresponding to the quantity of the pins 611-*c*.

The host device or memory device may transmit portions of data 615-*d*, 615-*e*, 615-*f*, and 615-*g* over the first channel and/or the one or more other channels as part of access operations (e.g., read operation or write operation). The host device or the memory device may transmit the ECC codeword 620-*d*, 620-*e*, 620-*f*, and 620-*g* and the internal ECC codeword 625-*d*, 625-*e*, 625-*f*, and 625-*g* over a different channel that the host device or the memory device transmitted portions of data 615-*d*, 615-*e*, 615-*f*, and 615-*g*. Prior to transmitting the ECC codeword 620-*d*, 620-*e*, 620-*f*, and 620-*g*, the host device may generate the ECC codeword 620-*d*, 620-*e*, 620-*f*, and 620-*g* based on portions of data 615-*d*, 615-*e*, 615-*f*, and 615-*g*. For example, the ECC codeword 620-*d* may be generated based on the portion of data 615-*d*, and the ECC codeword 620-*e* may be generated based on the portion of data 615-*e*.

The channel for transmitting the ECC codeword 620-*d*, 620-*e*, 620-*f*, and 620-*g* may be used for communicating error correction information associated with the access operation of the memory device. In such cases, the channel for transmitting the ECC codeword 620-*d*, 620-*e*, 620-*f*, and 620-*g* may be a link ECC channel. In some cases, the internal ECC codeword 625-*d*, 625-*e*, 625-*f*, and 625-*g* may be generated for error correction in the set of data, for error correction in the ECC codeword 620-*d*, 620-*e*, 620-*f*, and 620-*g*, or both. In such cases, the internal ECC codeword 625-*d*, 625-*e*, 625-*f*, and 625-*g* may be generated based on portions of data 615-*d*, 615-*e*, 615-*f*, and 615-*g* and the ECC codeword 620-*d*, 620-*e*, 620-*f*, and 620-*g*. For example, the internal ECC codeword 625-*d* may be generated based on the ECC codeword 620-*d*, and the internal ECC codeword 625-*e* may be generated based on the ECC codeword 620-*e*.

In such cases, the host device or memory device may transmit the set of data 600-*c* which includes the portions of data 615-*d*, 615-*e*, 615-*f*, and 615-*g*, the ECC codeword 620-*d*, 620-*e*, 620-*f*, and 620-*g*, and the internal ECC codeword 625-*d*, 625-*e*, 625-*f*, and 625-*g*. The host device may also determine that the data transmission includes the ECC codeword 620-*d*, 620-*e*, 620-*f*, and 620-*g* and internal ECC codeword 625-*d*, 625-*e*, 625-*f*, and 625-*g*. In some cases, the set of data 600-*c* may be transmitted as a single burst (e.g., including the portions of data 615-*d*, 615-*e*, 615-*f*, and 615-*g*, the ECC codeword 620-*d*, 620-*e*, 620-*f*, and 620-*g*, and the internal ECC codeword 625-*d*, 625-*e*, 625-*f*, and 625-*g*). The single burst may be associated with an access command. In some examples, the set of data 600-*c* may be stored in the memory device as part of a write operation.

The ECC codeword 620-*d*, 620-*e*, 620-*f*, and 620-*g* may be used for error detection or correction of data stored in the memory device. In some cases, the ECC codeword 620-*d*, 620-*e*, 620-*f*, and 620-*g* may include a SEC ECC or a SECDED ECC. In such cases, the ECC codeword 620-*d*, 620-*e*, 620-*f*, and 620-*g* may be stored in the memory device and detect or correct errors associated with the set of data 600-*c* being stored in the memory device. In some cases, the internal ECC codeword 625-*d*, 625-*e*, 625-*f*, and 625-*g* may be used for error detection or correction of data stored in a set of data or the ECC codeword 620-*d*, 620-*e*, 620-*f*, and 620-*g*. For example, the host device may identify the internal ECC codeword 625-*d*, 625-*e*, 625-*f*, and 625-*g* and determine whether the set of data or the ECC codeword 620-*d*, 620-*e*, 620-*f*, and 620-*g* includes an error based on the internal ECC codeword 625-*d*, 625-*e*, 625-*f*, and 625-*g*, respectively.

In some cases, a plurality of ECC codewords 620-*d*, 620-*e*, 620-*f*, and 620-*g* may be generated for error correction or detection based on the portions of data 615-*d*, 615-*e*, 615-*f*, and 615-*g*. For example, the portions of data 615-*d* may have an ECC codeword 620-*d* and an internal ECC codeword 625-*d* included therewith. By generating ECC codewords for more smaller portions of data, more errors may be detected and/or correct. In some examples, the internal ECC codeword 625-*d*, 625-*e*, 625-*f*, and 625-*g* may be generated for error correction or detection based on the ECC codeword 620-*d*, 620-*e*, 620-*f*, and 620-*g* and/or data 615-*d*, 615-*e*, 615-*f*, and 615-*g*. For example, ECC codeword 620-*d* may have an internal ECC codeword 625-*d* included therewith. In such cases, the internal ECC codewords 625-*d*, 625-*e*, 625-*f*, and 625-*g* may be associated with the ECC codewords 620-*d*, 620-*e*, 620-*f*, and 620-*g* and the portions of data 615-*d*, 615-*e*, 615-*f*, and 615-*g*, respectively. For example, the data may include four or more portions of data. In some cases, the four or more portions of data may be equally sized (e.g., four 64-bit portions of data). In other cases, the four or more portions of data may be different sizes. The ECC codewords may be four or more codewords associated with each of the four or more portions of data (e.g., portions of data 615-*d*, 615-*e*, 615-*f*, and 615-*g*), one codeword being generated for each portion of data. In some cases, the codewords may be 8-bit codewords. The internal ECC codewords may be four or more codewords associated with the four or more codewords (e.g., ECC codeword 620-*d*, 620-*e*, 620-*f*, and 620-*g*) and/or the four or more portions of data (e.g., data 615-*d*, 615-*e*, 615-*f*, and 615-*g*). In some cases, the internal ECC codewords may be 4-bit codewords. In other examples, the data 615-*d*, 615-*e*, 615-*f*, and 615-*g*, the ECC codewords 620-*d*, 620-*e*, 620-*f*, and 620-*g*, and internal ECC codewords 625-*d*, 625-*e*, 625-*f*, and 625-*g* and may be any bit size.

In some cases, the channel width (e.g., the quantity of pins 610-*c*) associated with a first channel may be extended to include the ECC codewords 620-*d*, 620-*e*, 620-*f*, and 620-*g*, and/or the internal ECC codewords 625-*d*, 625-*e*, 625-*f*, and 625-*g*, and the portions of data 615-*d*, 615-*e*, 615-*f*, and 615-*g* in the same set of data 600-*c*. In such cases, the quantity of pins 610-*c* of the set of data 600-*c* may be extended by three pins 610-*c* to include the ECC codeword 620-*d*, 620-*e*, 620-*f*, and 620-*g* and the internal ECC codeword 625-*d*, 625-*e*, 625-*f*, and 625-*g* in the same set of data 600-*c* as the portions of data 615-*d*, 615-*e*, 615-*f*, and 615-*g*. In some cases, the set of data 600-*c* may include unused data bits. Extending the channel width may improve the accuracy of the data stored and communicated in the system and may improve a bandwidth capability of channels of a system that includes the host device and the memory device, in some cases.

In some cases, the channel width (e.g., the quantity of the pins 611-*c*) associated with the one or more other channels may be extended based on the ECC codewords 620-*d*, 620-*e*, 620-*f*, and 620-*g* and/or the internal ECC codewords 625-*d*, 625-*e*, 625-*f*, and 625-*g*.

In such cases, the quantity of pins 611-*c* may be extended by one or more.

The channel width may be configured according to a signaling scheme between the host device and the memory device. In some cases, the host device may transmit a message to the memory device indicating that transmission may have one or more ECC codewords 620-*d*, 620-*e*, 620-*f*, and 620-*g* and internal ECC codewords 625-*d*, 625-*e*, 625-*f*, and 625-*g*. The host device or the memory device may also configure a receiver or a driver or both based the message. In such cases, the memory device may receive the data 615-*d*, 615-*e*, 615, f, and 615-*g* over the first channel and receive the one or more ECC codewords 620-*d*, 620-*e*, 620-*f*, and 620-*g* and the one or more internal ECC codewords 625-*d*, 625-*e*, 625-*f*, and 625-*g* over the one or more other channels after configuring the receiver. In some examples, the host device may transmit a read command. In some cases, the host device may transmit a write command associated with the set of data 600-*c* to the memory device. In such cases, transmitting the set of data 600-*c* to the memory device may be based on the write command. The write command may be transmitted over a channel for communicating command and addresses associated with the access operation. In some cases, the portions of data 615-*d*, 615-*e*, 615-*f*, and 615-*g* may be stored in the memory device as part of a write operation.

The ECC codeword 620-*d*, 620-*e*, 620-*f*, and 620-*g* may be utilized for error correction in a second set of data. In such cases, the second set of data may be stored in a first portion of the memory device, and the ECC codeword 620-*d*, 620-*e*, 620-*f*, and 620-*g* may be stored in a second portion of the memory device different than the first portion. The internal ECC codeword 625-*d*, 625-*e*, 625-*f*, and 625-*g* may be stored in the memory device. For example, the internal ECC codeword 625-*d*, 625-*e*, 625-*f*, and 625-*g* may be stored in a third portion of the memory device different than the first portion and the second portion. In some cases, the memory device may generate the internal ECC codeword 625-*d*, 625-*e*, 625-*f*, and 625-*g* rather than the host device. In such cases, the memory device may store the internal ECC codeword 625-*d*, 625-*e*, 625-*f*, and 625-*g*. The host device may use the one or more internal ECC codewords received from the memory device to detect or correct errors in the data received from the memory device, the ECC codeword received from the memory device, or both. The memory device may be configured to receive data and codewords and store data and codewords in any order as part of its operation. The memory device may be configured to retrieve data and codewords and transmit data and codewords in any order as part of its operation.

In some cases, the portions of data 615-*d*, 615-*e*, 615-*f*, and 615-*g*, the ECC codeword 620-*d*, 620-*e*, 620-*f*, and 620-*g*, and the internal ECC codeword 625-*d*, 625-*e*, 625-*f*, and 625-*g* may be retrieved from the memory device. In some examples, the memory device may determine whether the set of data includes an error based on the internal ECC codeword 625-*d*, 625-*e*, 625-*f*, and 625-*g*. In some cases, the memory device may determine a lack of error in the set of data. In other examples, the memory device may identify an error in the set of data and correct the error based on the internal ECC codeword 625-*d*, 625-*e*, 625-*f*, and 625-*g*.

Figure 7A:
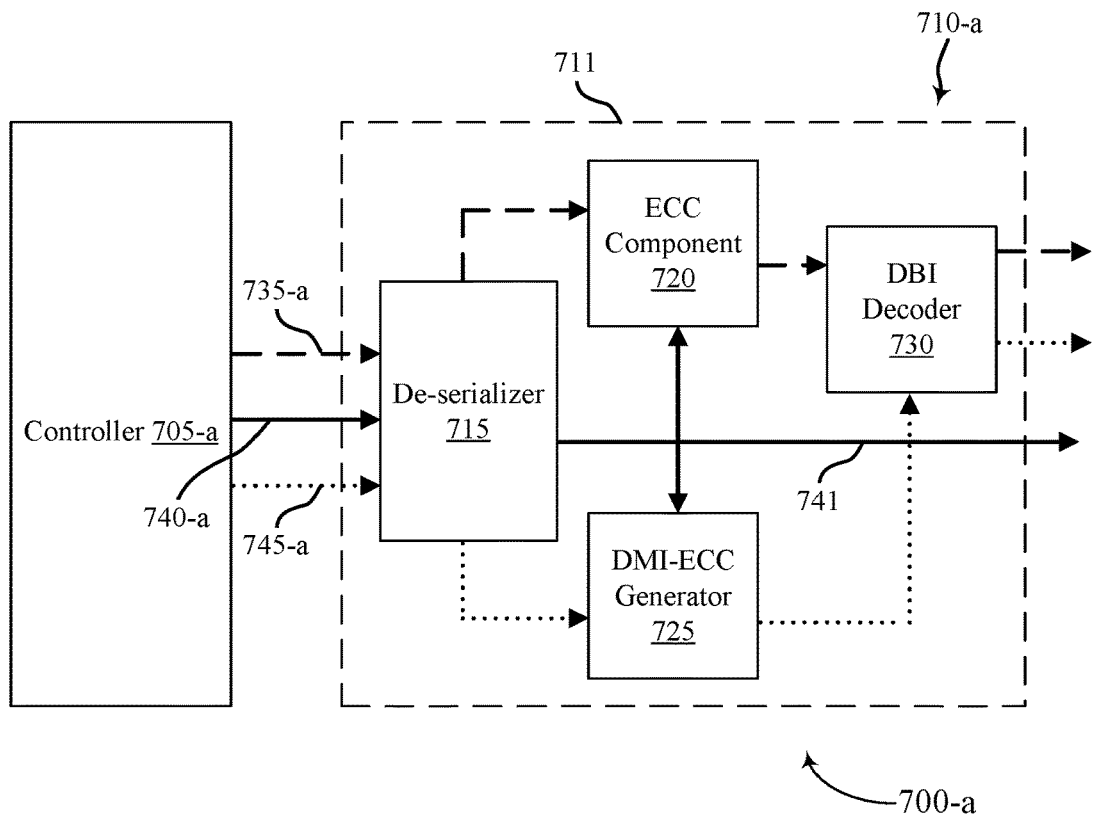
FIGS. 7A and 7B illustrate examples of a system that support methods and devices for error correction as disclosed herein.

FIG. 7A illustrates an example system 700-*a* that supports methods and devices for error correction. System 700-*a* may include controller 705-*a* (e.g., at least a portion of a host device) and a receiving component 711 of a memory device 710-*a*. Memory device 710-*a* may also include de-serializer 715, ECC component 720, DMI-ECC generator 725, and DBI decoder 730. Controller 705-*a* may include an ECC generator, a DBI/DMI encoder, a DMI-ECC generator, and a serializer.

The set of data, as described with reference to FIGS. 3-6, may be generated and transmitted by the controller 705-*a*. Controller 705-*a* may be an example of the external memory controller 105 as described with reference to FIG. 1 as well as the host device as described with reference to FIGS. 1-6. In some examples, the set of data, as described with reference to FIGS. 3-6, may be received and stored at the memory device 710-*a*, which may be an example of the memory device 110, the memory dice 160, or the memory die 200 as described with reference to FIGS. 1 and 2 as well as the memory device as described with reference to FIGS. 3-6.

The receiving component 711 may be coupled with one or more channels 735-*a*, 740-*a*, and 745-*a* that extend between the controller 705-*a* and the memory device 710-*a*. In some cases, the one or more channels 735-*a* may be example of data channels 190 as described with reference to FIG. 1. The one or more channels 735-*a* may be configured to communicate data and/or ECC codewords. The one or more channels 740-*a* may be examples of other channels 192, such as ECC channels, 192 described with reference to FIG. 1. The one or more channels 740-*a* may be configured to communicate ECC codewords. I some cases, the receiving component may not include the one or more channels 740. In some cases, at least one channel of the one or more channels 740-*a* may be an example of a link ECC channel. The one or more channels 745-*a* may be an example of differential memory interface (DMI) channels.

Information may be communicated over the one or more channels 735-*a*, 740-*a*, and 745-*a* using one or more bursts. The de-serializer 715 may be configured to de-serialize the information received over the one or more channels 735-*a*, 740-*a*, and 745-*a*. The ECC component 720 may be configured to use ECC codewords to detect and/or or correct errors found in the information communicated over the one or more channels 735-*a*, 740-*a*, and 745-*a*. The DMI-ECC generator 725 may be configured to generate ECC information and/or DMI information based on the information communicated over the one or more channels 735-*a*, 740-*a*, and 745-*a*. The data bus inversion (DBI) decoder 730 may be configured to perform operations related to data bus inversion.

In some cases, the receiving component 711 may include a conductive line 741 configured to communicate ECC codewords received over the channels 735-*a*, 710-*a*, and 745-*a* to an array of memory cells of the memory device 710-*a*. The conductive line 741 may be coupled with the de-serializer 715. In such cases, ECC codewords generated and transmitted by the host device or controller 705-*a* may be storable in the array of memory cells and therefore may be configured to detect or correct errors that arise in the context of the storing data communicated over the channels 735-*a*.

Figure 7B:
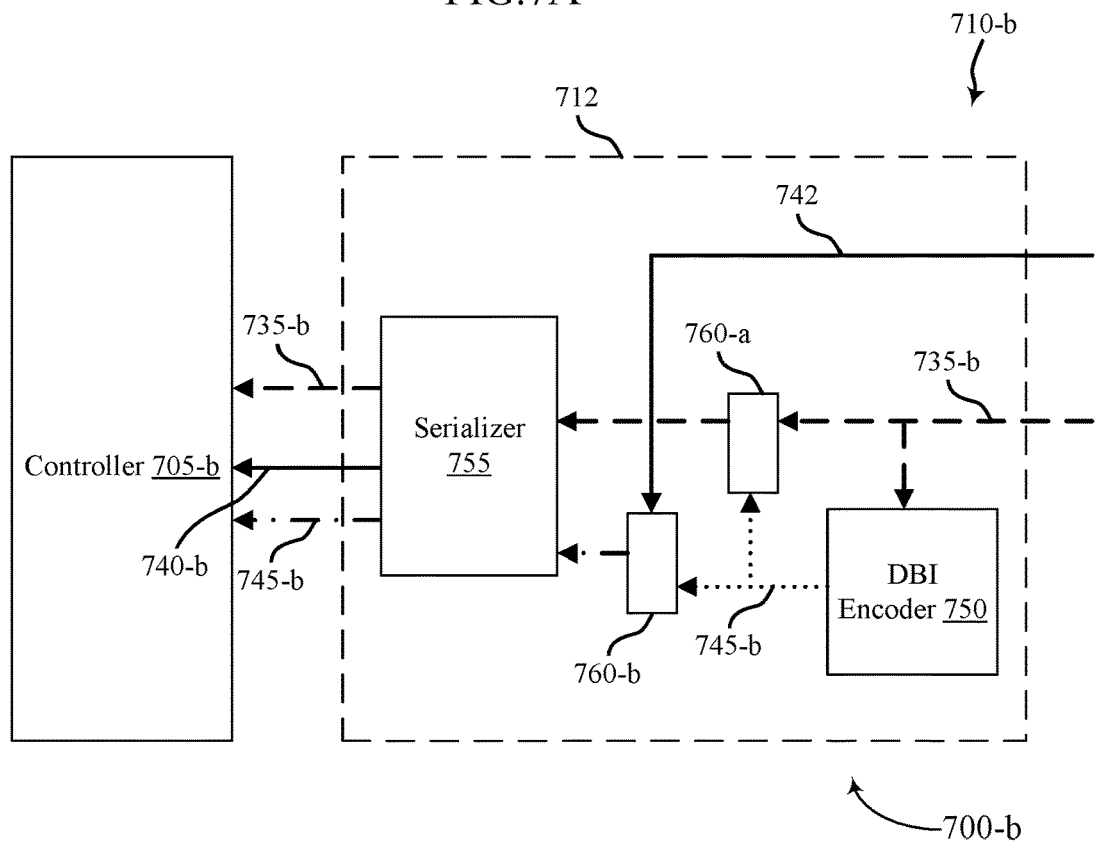

FIG. 7B illustrates an example system 700-*b* that supports method and devices for error correction. System 700-*b* may include controller 705-*b* (e.g., at least a portion of a host device) and a transmitting component 712 of a memory device 710-*b*. Memory device 710-*b* may also include DBI encoder 750 and serializer 755, multiplexers 760-*a* and 760-*b*. Controller 705-*b* may include a de-serializer, an ECC checking and correction component, a DBI decoder, and a serializer.

The set of data, as described with reference to FIGS. 3-6, may be generated and transmitted by the controller 705-*b*. Controller 705-*b* may be an example of the external memory controller 105 as described with reference to FIG. 1 as well as the host device as described with reference to FIGS. 1-6. In some examples, the set of data, as described with reference to FIGS. 3-6, may be received and stored at the memory device 710-*b*, which may be an example of the memory device 110, the memory dice 160, or the memory die 200 as described with reference to FIGS. 1 and 2 as well as the memory device as described with reference to FIGS. 3-6.

The transmitting component 712 may be coupled with one or more channels 735-*b*, 740-*b*, and 745-*b* that extend between the controller 705-*b* and the memory device 710-*b*. In some cases, the one or more channels 735-*b* may be example of data channels 190 as described with reference to FIG. 1. The one or more channels 735-*b* may be configured to communicate data and/or ECC codewords. The one or more channels 740-*b* may be examples of other channels 192, such as ECC channels, 192 described with reference to FIG. 1. The one or more channels 740-*b* may be configured to communicate ECC codewords. I some cases, the receiving component may not include the one or more channels 740. In some cases, at least one channel of the one or more channels 740-*b* may be an example of a link ECC channel. The one or more channels 745-*b* may be an example of DMI channels.

Information may be communicated over the one or more channels 735-*b*, 740-*b*, and 745-*b* using one or more bursts. The serializer 755 may be configured to serialize the information received from the array of memory cells and other components of the memory device 710-*b* for transmission over the one or more channels 735-*b*, 740-*b*, and 745-*b* to the controller 705-*b*. The data bus inversion DBI encoder 750 may be configured to perform operations related to data bus inversion.

In some cases, the transmitting component 712 may include a conductive line 742 configured to communicate ECC codewords retrieved from an array of memory cells of the memory device 710-*b* to be transmitted over the channels 735-*b*, 710-*b*, and 745-*b* to the controller 705-*b*. The conductive line 742 may be coupled with the serializer 755 and/or one of the multiplexers 760-*a* or 760-*b*. In such cases, ECC codewords received from the host device may be retrieved from their storage locations in the array of memory cells and transmitted back to the host device as part of a read operation. The codewords may be configured to detect or correct errors that arise in the context of the storing data communicated over the channels 735-*b*.

Figure 8A:
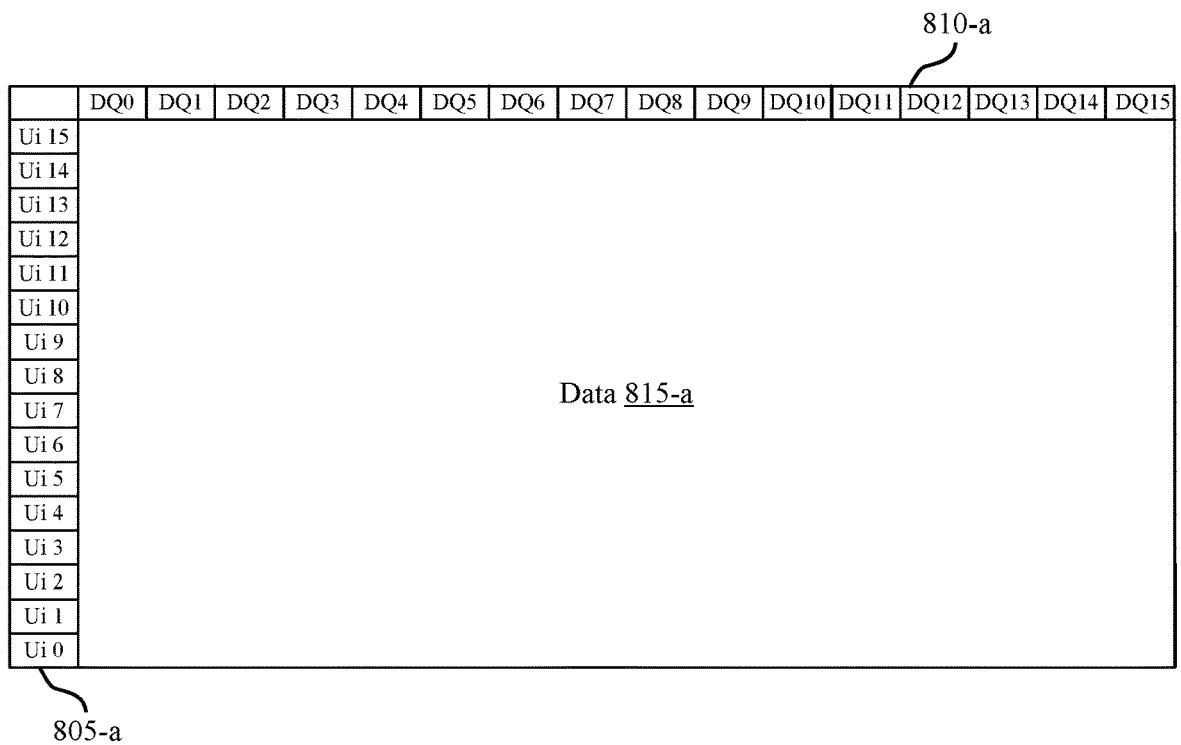
FIGS. 8A and 8B illustrate examples of a set of data that support methods and devices for error correction as disclosed herein.

FIG. 8A illustrates an example of a set of data 800-*a* that supports method and devices for error correction. The set of data 800-*a* may be generated and transmitted by a host device as described with reference to FIGS. 1 and 2, which may be an example of the external memory controller 105 as described with reference to FIG. 1. In some examples, the set of data 800-*a* may be received and stored at a memory device, which may be an example of the memory device 110, the memory dice 160, or the memory die 200 as described with reference to FIGS. 1 and 2. In some examples, the memory device may retrieve and transmit the set of data 800-*a* to the host device.

The set of data 800-*a* may be an example of a burst of data communicated over a channel (e.g., data channel 190). The channel may have a quantity of pins 810-*a* that define the width of the channel. For example, the channel may be sixteen (16) pins wide. In other examples, the channel may be less than sixteen pins wide or more than sixteen pins wide. The burst of data may also have a plurality of unit intervals 805-*a*, or time resources for communicating at least one symbol (e.g., bit) of data. In some cases, the set of data 800-*a* may include data 815-*a* associated with an access operation. In some examples, the data 815-*a* may include 256-bits of data. The set of data 800-*a* illustrates an example of transmitting data 815-*a* over a channel (e.g., a data channel) in a single burst. For example, the host device or memory array may transmit data 815-*a* in consecutive single bursts. In such examples, the host device or memory array may transmit data 815-*a* in twenty-four bursts.

In some cases, the host device may identify the set of data 800-*a* to communicate over a channel with a width corresponding to a quantity of the pins 810-*a*. The set of data 800-*a* may also include a burst length equivalent to a quantity of unit intervals 805-*a*. In some examples, the burst length may be associated with the width of the DQ channel and a size of the set of data 800-*a*. The single burst may be associated with an access command. In some examples, the set of data 800-*a* may be stored in the memory device as part of a write operation.

In some cases, the host device may generate one or more ECC codewords (e.g., ECC codewords 820) to detect and/or correct errors that may be introduced into the data 815-*a*. The burst, however, associated with the data 815-*a* may not be able to include the EEC codewords. In some implementations, the ECC codewords may be transmitted in other bursts over the data channel.

Figure 8B:
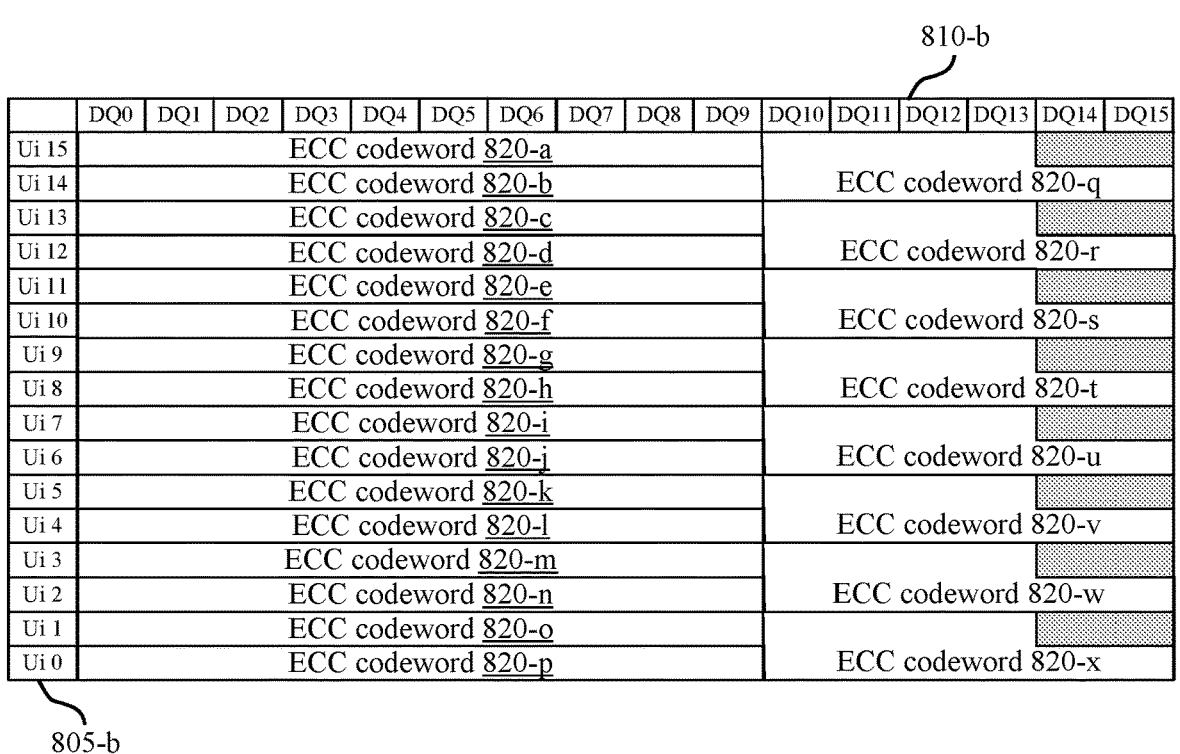

FIG. 8B illustrates an example of a set of data 800-*b* that supports method and devices for error correction. The set of data 800-*b* may be generated and transmitted by a host device as described with reference to FIGS. 1 and 2, which may be an example of the external memory controller 105 as described with reference to FIG. 1. In some examples, the set of data 800-*b* may be received and stored at a memory device, which may be an example of the memory device 110, the memory dice 160, or the memory die 200 as described with reference to FIGS. 1 and 2. In some examples, the memory device may retrieve and transmit the set of data 800-*b* to the host device.

The set of data 800-*b* may be an example of a burst of data communicated over a channel (e.g., data channel 190). The channel may have a quantity of pins 810-*b* that define the width of the channel. For example, the channel may be sixteen (16) pins wide. In other examples, the channel may be less than sixteen pins wide or more than sixteen pins wide. The burst of data may also have a plurality of unit intervals 805-*b*, or time resources for communicating at least one symbol (e.g., bit) of data. In some cases, the host device may identify the set of data 800-*b* to communicate over a channel with a width corresponding to a quantity of the pins 810-*b*. The set of data 800-*b* may also include a burst length equivalent to a quantity of unit intervals 805-*b*. In some examples, the burst length may be associated with the width of the data channel and a size of the set of data 800-*b*.

In some cases, the set of data 800-*b* may include one or more ECC codewords 820-*a* through 820-*x* associated with at least a portion of the data. Each ECC codeword 720 may be associated with a different burst of data 815-*a*. In such examples, the ECC codewords of multiple bursts of data 815-*a* may be aggregated and communicated in a single burst over the data channel. The set of data 800-*a* illustrates an example of transmitting data and at least one ECC codeword 820-*a* through 820-*x* over a channel (e.g., a data channel) in a single burst. In such examples, the data may be transmitted in consecutive bursts, and the ECC codewords may be transmitted in a single burst. The single burst may include the quantity of consecutive bursts that transmits the data.

The host device or the memory device may transmit data 815-*a* over the channel. The host device or the memory device may also transmit the set of data 800-*b* (e.g., including ECC codewords 820-*a* through 820-*x*) over the same channel that the host device or the memory device transmitted the data 815-*a*, but in a separate burst. Prior to transmitting the set of data 800-*b*, the host device may generate the ECC codewords 820-*a* through 820-*x* based on data. For example, the host device may generate an ECC codeword for each portion of data.

In such cases, the host device or the memory device may transmit the set of data 800-*b*. The host device may also determine that the data transmission includes the ECC codewords 820-*a* through 820-*x*. In some cases, the set of data 800-*b* may be transmitted as a single burst (e.g., including the ECC codewords 820-*a* through 820-*x*). The single burst may be associated with an access command.

The ECC codewords 820-*a* through 820-*x* may be used for error detection or correction of data stored in the memory device. In some cases, the ECC codewords 820-*a* through 820-*x* may include a SEC ECC or a SECDED ECC. In such cases, the ECC codeword 320-*a* may be stored in the memory device and detect or correct errors associated with the set of data 300-*a* being stored in the memory device. In some cases, a plurality of ECC codewords 820-*a* through 820-*x* may be generated for error correction or detection based on the data. In some cases, the set of data 800-*b* may include a twenty-four 10 bits of codewords (e.g., ECC codewords 820-*a* through 820-*x*).

Figure 9:
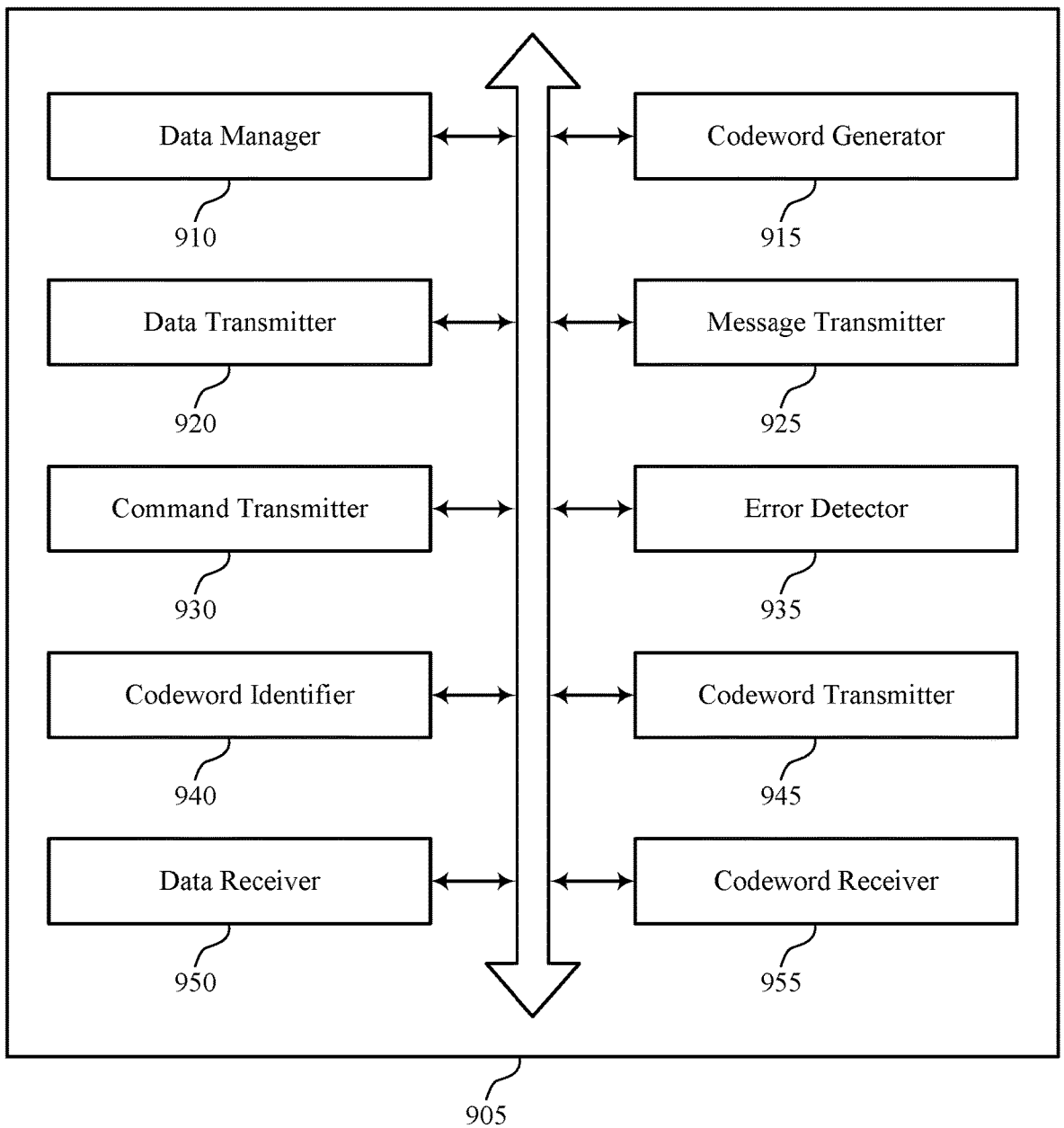
FIG. 9 shows a block diagram of a host device manager that supports methods and devices for error correction as disclosed herein.

FIG. 9 shows a block diagram 900 of a host device manager 905 that supports methods and devices for error correction as disclosed herein. The host device manager 905 may be an example of a host device or external memory controller 105 described with reference to FIG. 1. The host device manager 905 may include a data manager 910, a codeword generator 915, a data transmitter 920, a message transmitter 925, a command transmitter 930, an error detector 935, a codeword identifier 940, a codeword transmitter 945, a data receiver 950, a codeword receiver 955, a data storage component 960, and a codeword storage component 965. Each of these modules may communicate, directly or indirectly, with one another (e.g., via one or more buses).

The data manager 910 may identify a first set of data for communicating over a channel that has a width, the first set of data corresponding to a first burst length. In some examples, the data manager 910 may identify a first set of data associated with an access operation of a memory device. In some examples, the data manager 910 may divide the first set of data into a set of portions. In some examples, the data manager 910 may receive, over the channel and using the second burst length, a third set of data. In some examples, the data manager 910 may determine that the fourth set of data corresponds to the first set of data based on identifying the second codeword.

In some examples, the data manager 910 may generate the first set of data from the fourth set of data based on correcting the error. In some examples, the data manager 910 may transmit the second set of data as a single burst of data over the channel. In some examples, the data manager 910 may generate the second set of data based on the first set of data and the codeword, where transmitting the second set of data is based on generating the second set of data. In some examples, dividing the first set of data into a set of portions where transmitting the first set of data over the first channel includes transmitting the set of portions over the first channel.

In some examples, the data manager 910 may determine that the second set of data is the first set of data based on receiving the second codeword. In some examples, the data manager 910 may generate the first set of data from the second set of data based on correcting the error. In some cases, the first set of data includes a single burst of data associated with an access command. In some cases, the first burst length is associated with the width of the channel and a size of the first set of data. In some cases, the first set of data is configured to be stored in a memory device as part of a write operation. In some cases, the second channel is for communicating error correction information associated with the access operations of the memory device. In some cases, the second channel includes a link ECC channel. In some cases, the first set of data includes a single burst of data associated with the access operation. In some cases, the first set of data is configured to be stored in the memory device as part of a write operation.

The codeword generator 915 may generate a codeword for error correction based on at least a portion of the first set of data. In some examples, the codeword generator 915 may generate, based on at least a portion of the first set of data, a codeword for detecting or correcting errors associated with corruption of the first set of data when stored in the memory device. In some examples, the codeword generator 915 may generate a second codeword for error correction of the first set of data, or of the codeword, or of both based on at least the portion of the first set of data and the codeword, where the second set of data includes the second codeword. In some examples, the codeword generator 915 may generate a set of codewords for error correction based on the set of portions, where the second set of data includes the set of codewords. In some examples, the codeword generator 915 may identify a second codeword in the third set of data based on receiving the third set of data over the channel using the second burst length.

In some examples, the codeword generator 915 may identify a third codeword in the third set of data based on receiving the third set of data over the channel using the second burst length. In some examples, the codeword generator 915 may identify a set of codewords in the third set of data, each codeword of the set being associated with at least a portion of the fourth set of data, where determining whether the fourth set of data includes the error is based on identifying the set of codewords. In some examples, the codeword generator 915 may generate a second codeword for error correction of the first set of data, or of the codeword, or of both based on at least the portion of the first set of data and the codeword.

In some examples, generating a set of codewords for error correction based on the set of portions, where transmitting the codeword over the second channel includes transmitting the set of codewords over the second channel. In some cases, a single codeword of the set of codewords is generated for each portion of the set of portions. In some cases, the codeword is associated with all of the first set of data. In some cases, a single codeword of the set of codewords is generated for each portion of the set of portions.

The data transmitter 920 may transmit, over the channel and using a second burst length that is greater than the first burst length, a second set of data that includes the first set of data and the codeword. In some examples, the data transmitter 920 may transmit, over a first channel for communicating data associated with access operations of the memory device, the first set of data.

The message transmitter 925 may transmit a message to a memory device indicating a burst length associated with transmissions of data communicated over the channel, where the message indicates the second burst length and generating the codeword is based on transmitting the message. In some examples, the message transmitter 925 may transmit a message to a memory device indicating that transmissions communicated over the channel include one or more codewords for error correction, where generating the codeword is based on transmitting the message. In some examples, the message transmitter 925 may transmit a message to the memory device indicating that transmissions communicated over the first channel have one or more codewords for error correction communicated over the second channel, where generating the codeword is based on transmitting the message.

The command transmitter 930 may transmit, to a memory device, a write command associated with the second set of data, where transmitting the second set of data is based on transmitting the write command. In some examples, the command transmitter 930 may transmit a read command to a memory device, where receiving the third set of data is based on transmitting the read command. In some examples, the command transmitter 930 may transmit, to the memory device, a write command associated with the first set of data, where transmitting the first set of data and transmitting the codeword is based on transmitting the write command.

In some examples, the command transmitter 930 may transmit a read command to the memory device, where receiving the second set of data is based on transmitting the read command. In some cases, the write command is transmitted over a third channel for communicating commands or addresses associated with the access operations.

The error detector 935 may determine whether a fourth set of data included in the third set of data includes an error based on identifying the second codeword. In some examples, the error detector 935 may determine whether the fourth set of data or the second codeword includes a second error based on identifying the third codeword. In some examples, the error detector 935 may correct the error in the fourth set of data based on determining that the fourth set of data includes the error.

In some examples, the error detector 935 may determine whether the second set of data includes an error based on the second codeword. In some examples, the error detector 935 may determine whether the second set of data or the second codeword includes a second error based on receiving the third codeword. In some examples, the error detector 935 may correct the error in the second set of data based on determining that the second set of data includes the error.

The codeword identifier 940 may determine that transmissions over the channel include one or more codewords for error correction, where generating the codeword is based on determining that the transmissions over the channel include the one or more codewords. In some cases, the codeword includes a SEC ECC or a SECDED ECC. In some cases, the codeword is configured to be stored in a memory device. In some cases, the codeword is configured to detect or correct errors associated with corruption of the first set of data when stored in a memory device. In some cases, the codeword is associated with all of the first set of data.

The codeword transmitter 945 may transmit, over a second channel, the codeword associated with the first set of data. In some examples, the codeword transmitter 945 may transmit the second codeword over the second channel. In some cases, the codeword is configured for detecting or correcting errors associated with transmitting the first set of data over the first channel.

The data receiver 950 may receive a second set of data over the first channel.

The codeword receiver 955 may receive a second codeword over the second channel. In some examples, the codeword receiver 955 may receive a third codeword for error correction of the second set of data, or of the second codeword, or of both over the second channel. In some examples, the codeword receiver 955 may receive a set of codewords over the second channel, each codeword of the set being associated with at least a portion of the second set of data received over the first channel, where determining whether the second set of data includes the error is based on receiving the set of codewords. In some cases, the codeword is configured to be stored in the memory device.

Figure 10:
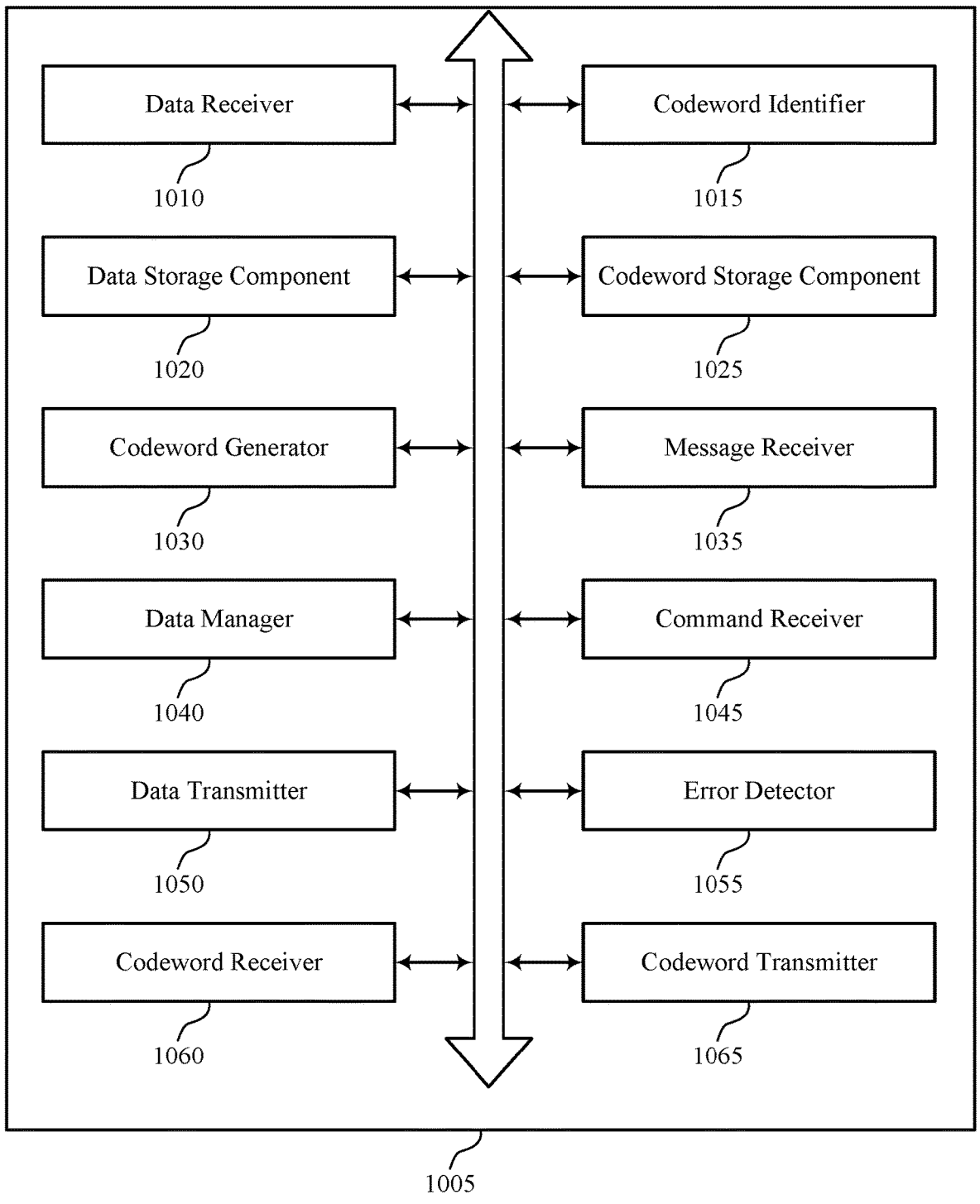
FIG. 10 shows a block diagram of a memory device manager that supports methods and devices for error correction as disclosed herein.

FIG. 10 shows a block diagram 1000 of a memory device manager 1005 that supports methods and devices for error correction as disclosed herein. The memory device manager 1005 may be an example of a memory device 110, memory die 160, 200, device memory controller 155, local memory controller 165, 260, or a combination thereof as described with reference to FIGS. 1 and 2. The memory device manager 1005 may include a data receiver 1010, a codeword identifier 1015, a data storage component 1020, a codeword storage component 1025, a codeword generator 1030, a message receiver 1035, a data manager 1040, a command receiver 1045, a data transmitter 1050, an error detector 1055, a codeword receiver 1060, and a codeword transmitter 1065. Each of these modules may communicate, directly or indirectly, with one another (e.g., via one or more buses).

The data receiver 1010 may receive a first set of data using a first burst length over a channel that has a width. In some examples, the data receiver 1010 may receive, over a first channel for communicating data associated with access operations of a memory device, a first set of data associated with an access operation of the memory device. In some examples, the data receiver 1010 may receive the first set of data as a single burst of data over the channel.

The codeword identifier 1015 may identify, in the first set of data, a codeword for error correction of a second set of data included in the first set of data, the second set of data corresponding to a second burst length over the channel. In some examples, the codeword identifier 1015 may identify, in the first set of data, a second codeword for error correction of the second set of data, or of the codeword, or of both.

In some examples, identifying a set of codewords in the first set of data, each codeword of the set being associated with at least a portion of the second set of data, where storing the codeword in the second portion of the memory device further includes storing the set of codewords in the second portion of the memory device. In some examples, the codeword identifier 1015 may retrieve the codeword from the second portion of the memory device.

In some examples, the codeword identifier 1015 may retrieve a second codeword from the memory device, where the third set of data includes the second codeword. In some examples, the codeword identifier 1015 may retrieve a second codeword from the memory device, the second codeword for error correction of the second set of data or the codeword.

In some examples, the codeword identifier 1015 may retrieve a set of codewords from the memory device, each codeword of the set being associated with at least a portion of the second set of data, where the third set of data includes the set of portions of the second set of data and the set of codewords. In some examples, identifying a set of codewords in the first set of data, each codeword of the set being associated with at least a portion a portion of the first set of data, where storing the codeword in the second portion of the memory device further includes storing the set of codewords in the second portion of the memory device.

In some examples, the codeword identifier 1015 may retrieve a second codeword for error correction of the second set of data from the second portion of the memory device. In some examples, the codeword identifier 1015 may retrieve a third codeword from the memory device for error correction of the second set of data, or of the second codeword, or of both. In some examples, retrieving a set of codewords from the memory device, each codeword of the set being associated with at least a portion of the second set of data, where transmitting the second codeword further includes transmitting the set of codewords over the second channel.

In some examples, the codeword identifier 1015 may receive the codeword as a single burst of data over the second channel. In some cases, the codeword is associated with all of the first set of data. In some cases, the codeword includes a SEC ECC or a SECDED ECC. In some cases, the codeword is configured to detect or correct errors associated with corruption of the second set of data when stored in the memory device. In some cases, the codeword is configured for detecting or correcting errors associated with receiving the first set of data over the first channel. In some cases, the codeword is associated with all of the first set of data.

The data storage component 1020 may store the second set of data in a first portion of a memory device. In some examples, the data storage component 1020 may store the first set of data in a first portion of the memory device. In some cases, the first set of data is configured to be stored in the memory device as part of a write operation.

The codeword storage component 1025 may store the codeword in a second portion of the memory device different than the first portion. In some examples, the codeword storage component 1025 may store the codeword in a second portion of the memory device different than the first portion. In some examples, the codeword storage component 1025 may store the second codeword in the memory device.

In some examples, the codeword storage component 1025 may store the second codeword in a third portion of the memory device different than the first portion or the second portion. In some examples, the codeword storage component 1025 may store the second codeword in the memory device. In some examples, the codeword storage component 1025 may store the second codeword in a third portion of the memory device different than the first portion or the second portion. In some cases, the codeword is configured to be stored in the memory device. In some cases, the codeword is configured to be stored in the memory device.

The codeword generator 1030 may generate a second codeword for error correction based on the first set of data and the codeword. In some examples, the codeword generator 1030 may generate a second codeword for error correction of the first set of data, or of the codeword, or of both based on the first set of data and the codeword.

The message receiver 1035 may receive a message from a host device indicating a burst length associated with transmissions of data over the channel, where the message indicates the first burst length and receiving the first set of data is based on receiving the message. In some examples, the message receiver 1035 may configure a receiver of the memory device coupled with the channel based on the burst length indicated in the message, where receiving the first set of data is based on configuring the receiver.

In some examples, the message receiver 1035 may receive a message from a host device indicating that transmissions over the channel include one or more codewords for error correction, where receiving the first set of data is based on receiving the message. In some examples, the message receiver 1035 may receive a message from a host device indicating that transmissions communicated over the first channel have one or more codewords for error correction communicated over the second channel, where receiving the first set of data is based on receiving the message.

In some examples, the message receiver 1035 may configure a receiver of the memory device based on receiving the message, where receiving the first set of data or receiving the codeword is based on configuring the receiver.

The data manager 1040 may determine the first burst length based on least in part on receiving the message, where identifying the codeword is based on determining the first burst length. In some examples, the data manager 1040 may retrieve the second set of data from the first portion of the memory device. In some examples, the data manager 1040 may retrieve a set of portions of the second set of data from the memory device.

In some examples, the data manager 1040 may generate the third set of data based on retrieving the second set of data and retrieving the codeword, where transmitting the third set of data is based on generating the third set of data. In some examples, the data manager 1040 may retrieve a second set of data from the first portion of the memory device.

In some examples, retrieving a set of portions of the second set of data from the memory device, where transmitting the second set of data further includes transmitting the set of portions over the first channel. In some examples, the data manager 1040 may receive the first set of data as a single burst of data over the first channel. In some cases, the second set of data includes a single burst of data associated with an access command. In some cases, the second burst length is less than the first burst length. In some cases, the first burst length is associated with the width of the channel and a size of the first set of data. In some cases, the second set of data is configured to be stored in the memory device as part of a write operation. In some cases, the second channel is for communicating error correction information associated with the access operations of the memory device. In some cases, the second channel includes a link ECC channel.

The command receiver 1045 may receive, from a host device, a write command associated with the first set of data, where receiving the first set of data is based on receiving the write command. In some examples, the command receiver 1045 may receive a read command from a host device, where retrieving the second set of data and retrieving the codeword are based on receiving the read command.

In some examples, the command receiver 1045 may receive, from a host device, a write command associated with the first set of data, where receiving the first set of data, or of receiving the codeword, or of both is based on receiving the write command. In some examples, the command receiver 1045 may receive a read command from the host device, where retrieving the second set of data and retrieving the second codeword are based on receiving the read command.

The data transmitter 1050 may transmit, over the channel and using the first burst length, a third set of data that includes the second set of data and the codeword. In some examples, the data transmitter 1050 may transmit, over the first channel, the second set of data to a host device.

The error detector 1055 may determine whether the second set of data or the codeword includes an error, where transmitting the third set of data is based on determining the second set of data or the codeword includes the error. In some examples, the error detector 1055 may correct the error in the second set of data or the codeword based on determining the second set of data or the codeword includes the error, where transmitting the third set of data is based on correcting the error.

In some examples, the error detector 1055 may determine whether the second set of data or the second codeword includes an error, where transmitting the second set of data is based on determining that the second set of data or the second codeword includes the error. In some examples, the error detector 1055 may correct the error in the second set of data or the second codeword based on determining the second set of data or the second codeword includes the error, where transmitting the second set of data is based on correcting the error.

The codeword receiver 1060 may receive, over a second channel, a codeword for detecting or correcting errors associated with corruption of the first set of data when stored in the memory device. In some examples, the codeword receiver 1060 may receive, over the second channel, a second codeword for error correction of the first set of data, or of the codeword, or of both.

The codeword transmitter 1065 may transmit, over the second channel, the second codeword to the host device. In some examples, the codeword transmitter 1065 may transmit, over the second channel, the third codeword to the host device.

Figure 11:
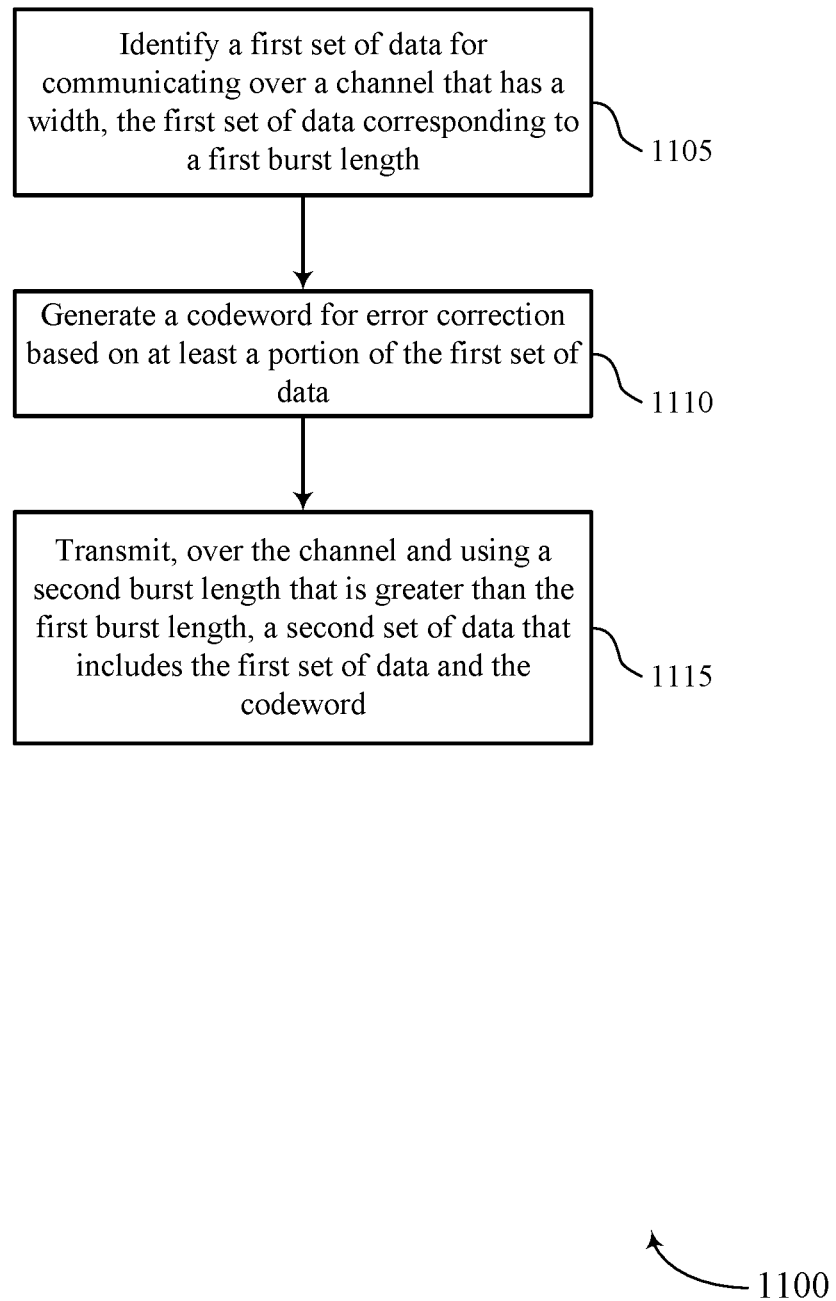
FIGS. 11 through 14 show flowcharts illustrating a method or methods that support methods and devices for error correction as disclosed herein.

FIG. 11 shows a flowchart illustrating a method 1100 that supports methods and devices for error correction as disclosed herein. The operations of method 1100 may be implemented by a host device or its components as described herein. For example, the operations of method 1100 may be performed by a host device manager as described with reference to FIG. 9. In some examples, a host device may execute a set of instructions to control the functional elements of the host device to perform the functions described below. Additionally or alternatively, a host device may perform aspects of the functions described below using special-purpose hardware.

At 1105, the host device may identify a first set of data for communicating over a channel that has a width, the first set of data corresponding to a first burst length. The operations of 1105 may be performed according to the methods with reference to FIGS. 3 and 4. In some examples, aspects of the operations of 1105 may be performed by a data manager as described with reference to FIG. 9.

At 1110, the host device may generate a codeword for error correction based on at least a portion of the first set of data. The operations of 1110 may be performed according to the methods described FIGS. 3 and 4. In some examples, aspects of the operations of 1110 may be performed by a codeword generator as described with reference to FIG. 9.

At 1115, the host device may transmit, over the channel and using a second burst length that is greater than the first burst length, a second set of data that includes the first set of data and the codeword. The operations of 1115 may be performed according to the methods described FIGS. 3 and 4. In some examples, aspects of the operations of 1115 may be performed by a data transmitter as described with reference to FIG. 9.

In some examples, the method may include identifying a first set of data for communicating over a channel that has a width, the first set of data corresponding to a first burst length, generating a codeword for error correction based on at least a portion of the first set of data, and transmitting, over the channel and using a second burst length that is greater than the first burst length, a second set of data that includes the first set of data and the codeword.

In some examples, the method may further include generating a second codeword for error correction of the first set of data, or of the codeword, or of both based on at least the portion of the first set of data and the codeword, where the second set of data includes the second codeword.

In some examples, the method may further include transmitting a message to a memory device indicating a burst length associated with transmissions of data communicated over the channel, where the message indicates the second burst length and generating the codeword may be based on transmitting the message.

In some examples, the method may further include transmitting a message to a memory device indicating that transmissions communicated over the channel include one or more codewords for error correction, where generating the codeword may be based on transmitting the message. In some examples, the method may further include transmitting, to a memory device, a write command associated with the first set of data, where transmitting the second set of data may be based on transmitting the write command.

In some examples, the method may further include dividing the first set of data into a set of portions, and generating a set of codewords for error correction based on the set of portions, where the second set of data includes the set of codewords. In some examples, a single codeword of the set of codewords may be generated for each portion of the set of portions. In some examples, the codeword may be associated with all of the first set of data.

In some examples, the method may further include receiving, over the channel and using the second burst length, a third set of data, identifying a second codeword in the third set of data based on receiving the third set of data over the channel using the second burst length, and determining whether a fourth set of data included in the third set of data includes an error based on identifying the second codeword.

In some examples, the method may further include identifying a third codeword in the third set of data based on receiving the third set of data over the channel using the second burst length, and determining whether the fourth set of data or the second codeword includes a second error based on identifying the third codeword.

In some examples, the method may further include determining that the fourth set of data corresponds to the first set of data based on identifying the second codeword. In some examples, the method may further include correcting the error in the fourth set of data based on determining that the fourth set of data includes the error, and generating the first set of data from the fourth set of data based on correcting the error.

In some examples, the method may further include identifying a set of codewords in the third set of data, each codeword of the set being associated with at least a portion of the fourth set of data, where determining whether the fourth set of data includes the error may be based on identifying the set of codewords.

In some examples, the method may further include transmitting a read command to a memory device, where receiving the third set of data may be based on transmitting the read command. In some examples of the method, transmitting the second set of data over the channel may include transmitting the second set of data as a single burst of data over the channel. In some examples, the first set of data includes a single burst of data associated with an access command.

In some examples, the method may further include generating the second set of data based on the first set of data and the codeword, where transmitting the second set of data may be based on generating the second set of data. In some examples, the method may further include determining that transmissions over the channel include one or more codewords for error correction, where generating the codeword may be based on determining that the transmissions over the channel include the one or more codewords.

In some examples, the first burst length may be associated with the width of the channel and a size of the first set of data. In some examples, the codeword includes a SEC ECC or SECDED ECC. In some examples, the first set of data may be configured to be stored in a memory device as part of a write operation. In some examples, the codeword may be configured to be stored in a memory device. In some examples, the codeword may be configured to detect or correct errors associated with corruption of the first set of data when stored in a memory device.

In some examples, an apparatus or apparatuses as described herein may perform a method or methods, such as the method 1100. The apparatus may include features, controllers, circuits, means, or instructions (e.g., a non-transitory computer-readable medium storing instructions executable by a processor) for identifying a first set of data for communicating over a channel that has a width, the first set of data corresponding to a first burst length, generating a codeword for error correction based on at least a portion of the first set of data, and transmitting, over the channel and using a second burst length that is greater than the first burst length, a second set of data that includes the first set of data and the codeword.

Some examples of the method, apparatuses, and non-transitory computer-readable medium described herein may further include operations, features, controllers, circuits, means, or instructions for generating a second codeword for error correction of the first set of data, or of the codeword, or of both based on at least the portion of the first set of data and the codeword, where the second set of data includes the second codeword.

Some examples of the method, apparatuses, and non-transitory computer-readable medium described herein may further include operations, features, controllers, circuits, means, or instructions for transmitting a message to a memory device indicating a burst length associated with transmissions of data communicated over the channel, where the message indicates the second burst length and generating the codeword may be based on transmitting the message.

Some examples of the method, apparatuses, and non-transitory computer-readable medium described herein may further include operations, features, controllers, circuits, means, or instructions for transmitting a message to a memory device indicating that transmissions communicated over the channel include one or more codewords for error correction, where generating the codeword may be based on transmitting the message.

Some examples of the method, apparatuses, and non-transitory computer-readable medium described herein may further include operations, features, controllers, circuits, means, or instructions for transmitting, to a memory device, a write command associated with the first set of data, where transmitting the second set of data may be based on transmitting the write command.

Some examples of the method, apparatuses, and non-transitory computer-readable medium described herein may further include operations, features, controllers, circuits, means, or instructions for dividing the first set of data into a set of portions, and generating a set of codewords for error correction based on the set of portions, where the second set of data includes the set of codewords.

In some examples of the method, apparatuses, and non-transitory computer-readable medium described herein, a single codeword of the set of codewords may be generated for each portion of the set of portions. In some examples of the method, apparatuses, and non-transitory computer-readable medium described herein, the codeword may be associated with all of the first set of data.

Some examples of the method, apparatuses, and non-transitory computer-readable medium described herein may further include operations, features, controllers, circuits, means, or instructions for receiving, over the channel and using the second burst length, a third set of data, identifying a second codeword in the third set of data based on receiving the third set of data over the channel using the second burst length, and determining whether a fourth set of data included in the third set of data includes an error based on identifying the second codeword.

Some examples of the method, apparatuses, and non-transitory computer-readable medium described herein may further include operations, features, controllers, circuits, means, or instructions for identifying a third codeword in the third set of data based on receiving the third set of data over the channel using the second burst length, and determining whether the fourth set of data or the second codeword includes a second error based on identifying the third codeword.

Some examples of the method, apparatuses, and non-transitory computer-readable medium described herein may further include operations, features, controllers, circuits, means, or instructions for determining that the fourth set of data corresponds to the first set of data based on identifying the second codeword.

Some examples of the method, apparatuses, and non-transitory computer-readable medium described herein may further include operations, features, controllers, circuits, means, or instructions for correcting the error in the fourth set of data based on determining that the fourth set of data includes the error, and generating the first set of data from the fourth set of data based on correcting the error.

Some examples of the method, apparatuses, and non-transitory computer-readable medium described herein may further include operations, features, controllers, circuits, means, or instructions for identifying a set of codewords in the third set of data, each codeword of the set being associated with at least a portion of the fourth set of data, where determining whether the fourth set of data includes the error may be based on identifying the set of codewords.

Some examples of the method, apparatuses, and non-transitory computer-readable medium described herein may further include operations, features, controllers, circuits, means, or instructions for transmitting a read command to a memory device, where receiving the third set of data may be based on transmitting the read command.

In some examples of the method, apparatuses, and non-transitory computer-readable medium described herein, transmitting the second set of data over the channel may include operations, features, controllers, circuits, means, or instructions for transmitting the second set of data as a single burst of data over the channel. In some examples of the method, apparatuses, and non-transitory computer-readable medium described herein, the first set of data includes a single burst of data associated with an access command.

Some examples of the method, apparatuses, and non-transitory computer-readable medium described herein may further include operations, features, controllers, circuits, means, or instructions for generating the second set of data based on the first set of data and the codeword, where transmitting the second set of data may be based on generating the second set of data.

Some examples of the method, apparatuses, and non-transitory computer-readable medium described herein may further include operations, features, controllers, circuits, means, or instructions for determining that transmissions over the channel include one or more codewords for error correction, where generating the codeword may be based on determining that the transmissions over the channel include the one or more codewords.

In some examples of the method, apparatuses, and non-transitory computer-readable medium described herein, the first burst length may be associated with the width of the channel and a size of the first set of data. In some examples of the method, apparatuses, and non-transitory computer-readable medium described herein, the codeword includes a SEC ECC or a SECDED ECC.

In some examples of the method, apparatuses, and non-transitory computer-readable medium described herein, the first set of data may be configured to be stored in a memory device as part of a write operation. In some examples of the method, apparatuses, and non-transitory computer-readable medium described herein, the codeword may be configured to be stored in a memory device. In some examples of the method, apparatuses, and non-transitory computer-readable medium described herein, the codeword may be configured to detect or correct errors associated with corruption of the first set of data when stored in a memory device.

Figure 12:
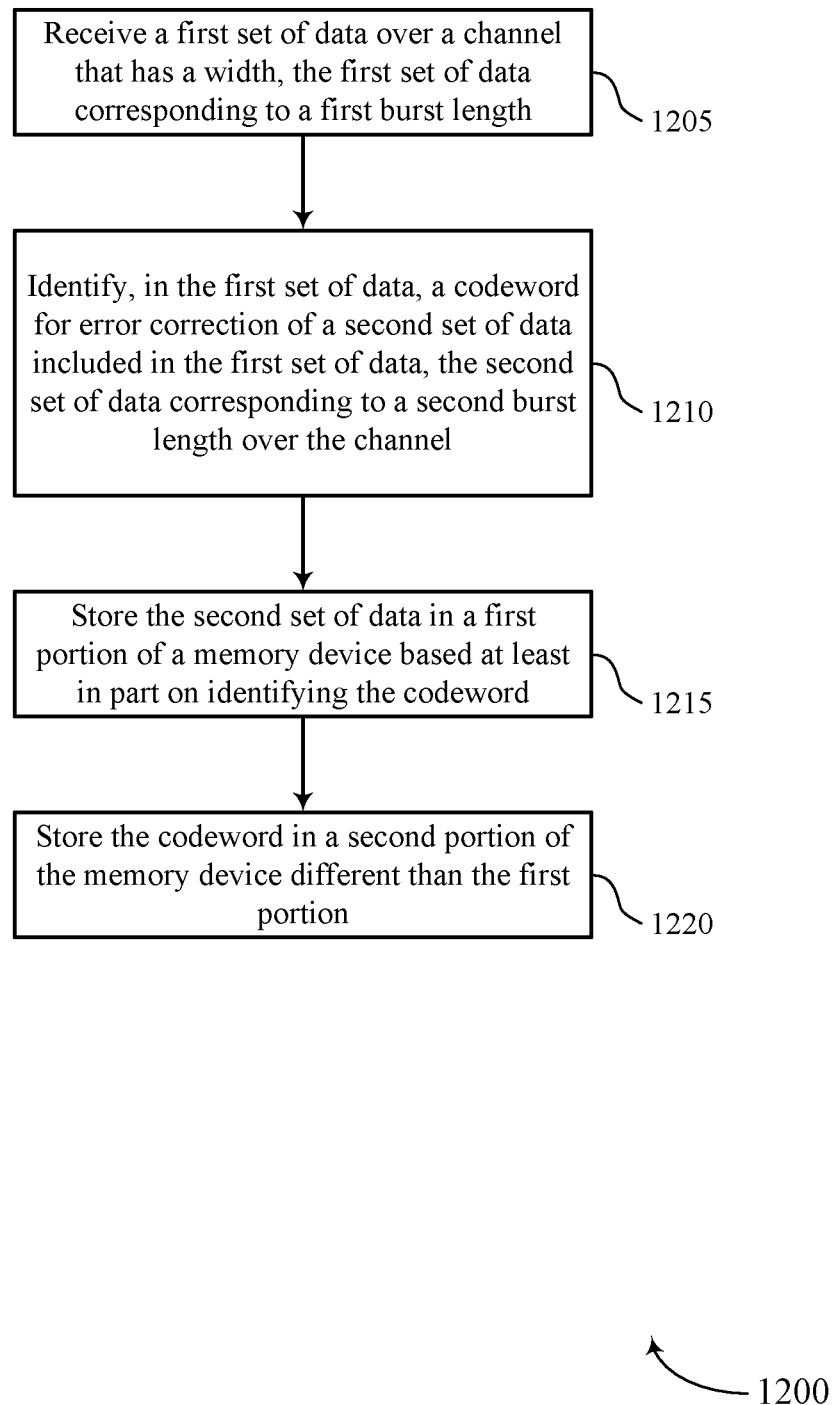

FIG. 12 shows a flowchart illustrating a method 1200 that supports methods and devices for error correction as disclosed herein. The operations of method 1200 may be implemented by a memory device or its components as described herein. For example, the operations of method 1200 may be performed by a memory device manager as described with reference to FIG. 10. In some examples, a memory device may execute a set of instructions to control the functional elements of the memory device to perform the functions described below. Additionally or alternatively, a memory device may perform aspects of the functions described below using special-purpose hardware.

At 1205, the memory device may receive a first set of data over a channel that has a width, the first set of data corresponding to a first burst length. The operations of 1205 may be performed according to the methods described FIGS. 3 and 4. In some examples, aspects of the operations of 1205 may be performed by a data receiver as described with reference to FIG. 10.

At 1210, the memory device may identify, in the first set of data, a codeword for error correction of a second set of data included in the first set of data, the second set of data corresponding to a second burst length over the channel. The operations of 1210 may be performed according to the methods described FIGS. 3 and 4. In some examples, aspects of the operations of 1210 may be performed by a codeword identifier as described with reference to FIG. 10.

At 1215, the memory device may store the second set of data in a first portion of a memory device based at least in part on identifying the codeword. The operations of 1215 may be performed according to the methods described 3 and 4. In some examples, aspects of the operations of 1215 may be performed by a data storage component as described with reference to FIG. 10.

At 1220, the memory device may store the codeword in a second portion of the memory device different than the first portion. The operations of 1220 may be performed according to the methods described 3 and 4. In some examples, aspects of the operations of 1220 may be performed by a codeword storage component as described with reference to FIG. 10.

In some examples, the method may include receiving a first set of data using a first burst length over a channel that has a width, identifying, in the first set of data, a codeword for error correction of a second set of data included in the first set of data, the second set of data corresponding to a second burst length over the channel, storing the second set of data in a first portion of a memory device, and storing the codeword in a second portion of the memory device different than the first portion.

In some examples, the method may further include identifying, in the first set of data, a second codeword for error correction of the second set of data, or of the codeword, or of both, and storing the second codeword in the memory device. In some examples, the method may further include storing the second codeword in a third portion of the memory device different than the first portion or the second portion.

In some examples, the method may further include generating a second codeword for error correction based on the first set of data and the codeword, and storing the second codeword in the memory device. In some examples, the method may further include receiving a message from a host device indicating a burst length associated with transmissions of data over the channel, where the message indicates the first burst length and receiving the first set of data may be based on receiving the message.

In some examples, the method may further include configuring a receiver of the memory device coupled with the channel based on the burst length indicated in the message, where receiving the first set of data may be based on configuring the receiver. In some examples, the method may further include receiving a message from a host device indicating that transmissions over the channel include one or more codewords for error correction, where receiving the first set of data may be based on receiving the message.

In some examples, the method may further include determining the first burst length based on least in part on receiving the message, where identifying the codeword may be based on determining the first burst length. In some examples, the method may further include receiving, from a host device, a write command associated with the first set of data, where receiving the first set of data may be based on receiving the write command.

In some examples, the method may further include identifying a set of codewords in the first set of data, each codeword of the set being associated with at least a portion of the second set of data, where storing the codeword in the second portion of the memory device further includes storing the set of codewords in the second portion of the memory device. In some examples, the codeword may be associated with all of the first set of data.

In some examples, the method may further include retrieving the second set of data from the first portion of the memory device, retrieving the codeword from the second portion of the memory device, and transmitting, over the channel and using the first burst length, a third set of data that includes the second set of data and the codeword. In some examples, the method may further include retrieving a second codeword from the memory device, where the third set of data includes the second codeword.

In some examples, the method may further include retrieving a second codeword from the memory device, the second codeword for error correction of the second set of data or the codeword, and determining whether the second set of data or the codeword includes an error, where transmitting the third set of data may be based on determining the second set of data or the codeword includes the error.

In some examples, the method may further include correcting the error in the second set of data or the codeword based on determining the second set of data or the codeword includes the error, where transmitting the third set of data may be based on correcting the error.

In some examples, the method may further include retrieving a set of portions of the second set of data from the memory device, and retrieving a set of codewords from the memory device, each codeword of the set being associated with at least a portion of the second set of data, where the third set of data includes the set of portions of the second set of data and the set of codewords. In some examples, the method may further include receiving a read command from a host device, where retrieving the second set of data and retrieving the codeword may be based on receiving the read command.

In some examples, the method may further include generating the third set of data based on retrieving the second set of data and retrieving the codeword, where transmitting the third set of data may be based on generating the third set of data. In some examples, receiving the first set of data over the channel may include receiving the first set of data as a single burst of data over the channel. In some examples, the second set of data includes a single burst of data associated with an access command. In some examples, the second burst length may be less than the first burst length. In some examples, the first burst length may be associated with the width of the channel and a size of the first set of data.

In some examples, the codeword includes a SEC ECC or a SECDED ECC. In some examples, the second set of data may be configured to be stored in the memory device as part of a write operation. In some examples, the codeword may be configured to be stored in the memory device. In some examples, the codeword may be configured to detect or correct errors associated with corruption of the second set of data when stored in the memory device.

In some examples, an apparatus or apparatuses as described herein may perform a method or methods, such as the method 1200. The apparatus may include features, controllers, circuits, means, or instructions (e.g., a non-transitory computer-readable medium storing instructions executable by a processor) for receiving a first set of data using a first burst length over a channel that has a width, identifying, in the first set of data, a codeword for error correction of a second set of data included in the first set of data, the second set of data corresponding to a second burst length over the channel, storing the second set of data in a first portion of a memory device, and storing the codeword in a second portion of the memory device different than the first portion.

Some examples of the method, apparatuses, and non-transitory computer-readable medium described herein may further include operations, features, controllers, circuits, means, or instructions for identifying, in the first set of data, a second codeword for error correction of the second set of data, or of the codeword, or of both, and storing the second codeword in the memory device.

In some examples of the method, apparatuses, and non-transitory computer-readable medium described herein, storing the second codeword may include operations, features, controllers, circuits, means, or instructions for storing the second codeword in a third portion of the memory device different than the first portion or the second portion.

Some examples of the method, apparatuses, and non-transitory computer-readable medium described herein may further include operations, features, controllers, circuits, means, or instructions for generating a second codeword for error correction based on the first set of data and the codeword, and storing the second codeword in the memory device.

Some examples of the method, apparatuses, and non-transitory computer-readable medium described herein may further include operations, features, controllers, circuits, means, or instructions for receiving a message from a host device indicating a burst length associated with transmissions of data over the channel, where the message indicates the first burst length and receiving the first set of data may be based on receiving the message.

Some examples of the method, apparatuses, and non-transitory computer-readable medium described herein may further include operations, features, controllers, circuits, means, or instructions for configuring a receiver of the memory device coupled with the channel based on the burst length indicated in the message, where receiving the first set of data may be based on configuring the receiver.

Some examples of the method, apparatuses, and non-transitory computer-readable medium described herein may further include operations, features, controllers, circuits, means, or instructions for receiving a message from a host device indicating that transmissions over the channel include one or more codewords for error correction, where receiving the first set of data may be based on receiving the message.

Some examples of the method, apparatuses, and non-transitory computer-readable medium described herein may further include operations, features, controllers, circuits, means, or instructions for determining the first burst length based on least in part on receiving the message, where identifying the codeword may be based on determining the first burst length.

Some examples of the method, apparatuses, and non-transitory computer-readable medium described herein may further include operations, features, controllers, circuits, means, or instructions for receiving, from a host device, a write command associated with the first set of data, where receiving the first set of data may be based on receiving the write command.

Some examples of the method, apparatuses, and non-transitory computer-readable medium described herein may further include operations, features, controllers, circuits, means, or instructions for identifying a set of codewords in the first set of data, each codeword of the set being associated with at least a portion of the second set of data, where storing the codeword in the second portion of the memory device further includes storing the set of codewords in the second portion of the memory device. In some examples of the method, apparatuses, and non-transitory computer-readable medium described herein, the codeword may be associated with all of the first set of data.

Some examples of the method, apparatuses, and non-transitory computer-readable medium described herein may further include operations, features, controllers, circuits, means, or instructions for retrieving the second set of data from the first portion of the memory device, retrieving the codeword from the second portion of the memory device, and transmitting, over the channel and using the first burst length, a third set of data that includes the second set of data and the codeword.

Some examples of the method, apparatuses, and non-transitory computer-readable medium described herein may further include operations, features, controllers, circuits, means, or instructions for retrieving a second codeword from the memory device, where the third set of data includes the second codeword.

Some examples of the method, apparatuses, and non-transitory computer-readable medium described herein may further include operations, features, controllers, circuits, means, or instructions for retrieving a second codeword from the memory device, the second codeword for error correction of the second set of data or the codeword, and determining whether the second set of data or the codeword includes an error, where transmitting the third set of data may be based on determining the second set of data or the codeword includes the error.

Some examples of the method, apparatuses, and non-transitory computer-readable medium described herein may further include operations, features, controllers, circuits, means, or instructions for correcting the error in the second set of data or the codeword based on determining the second set of data or the codeword includes the error, where transmitting the third set of data may be based on correcting the error.

Some examples of the method, apparatuses, and non-transitory computer-readable medium described herein may further include operations, features, controllers, circuits, means, or instructions for retrieving a set of portions of the second set of data from the memory device, and retrieving a set of codewords from the memory device, each codeword of the set being associated with at least a portion of the second set of data, where the third set of data includes the set of portions of the second set of data and the set of codewords.

Some examples of the method, apparatuses, and non-transitory computer-readable medium described herein may further include operations, features, controllers, circuits, means, or instructions for receiving a read command from a host device, where retrieving the second set of data and retrieving the codeword may be based on receiving the read command.

Some examples of the method, apparatuses, and non-transitory computer-readable medium described herein may further include operations, features, controllers, circuits, means, or instructions for generating the third set of data based on retrieving the second set of data and retrieving the codeword, where transmitting the third set of data may be based on generating the third set of data.

In some examples of the method, apparatuses, and non-transitory computer-readable medium described herein, receiving the first set of data over the channel may include operations, features, controllers, circuits, means, or instructions for receiving the first set of data as a single burst of data over the channel. In some examples of the method, apparatuses, and non-transitory computer-readable medium described herein, the second set of data includes a single burst of data associated with an access command.

In some examples of the method, apparatuses, and non-transitory computer-readable medium described herein, the second burst length may be less than the first burst length. In some examples of the method, apparatuses, and non-transitory computer-readable medium described herein, the first burst length may be associated with the width of the channel and a size of the first set of data.

In some examples of the method, apparatuses, and non-transitory computer-readable medium described herein, the codeword includes a SEC ECC or a SECDED ECC.

In some examples of the method, apparatuses, and non-transitory computer-readable medium described herein, the second set of data may be configured to be stored in the memory device as part of a write operation.

In some examples of the method, apparatuses, and non-transitory computer-readable medium described herein, the codeword may be configured to be stored in the memory device. In some examples of the method, apparatuses, and non-transitory computer-readable medium described herein, the codeword may be configured to detect or correct errors associated with corruption of the second set of data when stored in the memory device.

Figure 13:
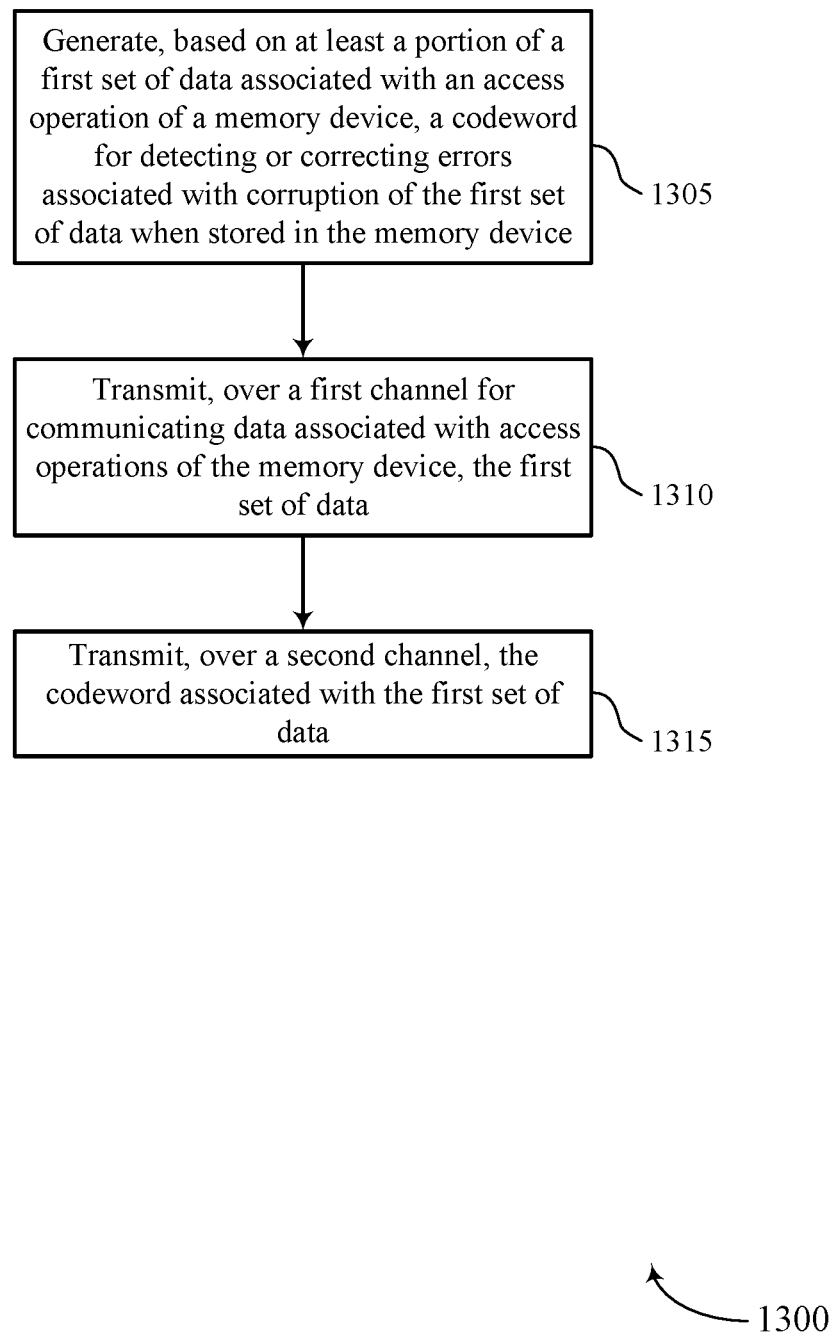

FIG. 13 shows a flowchart illustrating a method 1300 that supports methods and devices for error correction as disclosed herein. The operations of method 1300 may be implemented by a host device or its components as described herein. For example, the operations of method 1300 may be performed by a host device manager as described with reference to FIG. 9. In some examples, a host device may execute a set of instructions to control the functional elements of the host device to perform the functions described below. Additionally or alternatively, a host device may perform aspects of the functions described below using special-purpose hardware.

At 1305, the host device may generate, based on at least a portion of a first set of data associated with an access operation of a memory device, a codeword for detecting or correcting errors associated with corruption of the first set of data when stored in the memory device. The operations of 1305 may be performed according to the methods described with reference to FIGS. 5 and 6. In some examples, aspects of the operations of 1305 may be performed by a codeword generator as described with reference to FIG. 9.

At 1310, the host device may transmit, over a first channel for communicating data associated with access operations of the memory device, the first set of data. The operations of 1310 may be performed according to the methods described with reference to FIGS. 5 and 6. In some examples, aspects of the operations of 1310 may be performed by a data transmitter as described with reference to FIG. 9.

At 1315, the host device may transmit, over a second channel, the codeword associated with the first set of data. The operations of 1315 may be performed according to the methods described with reference to FIGS. 5 and 6. In some examples, aspects of the operations of 1315 may be performed by a codeword transmitter as described with reference to FIG. 9.

In some examples, the method may include identifying a first set of data associated with an access operation of a memory device, generating, based on at least a portion of the first set of data, a codeword for detecting or correcting errors associated with corruption of the first set of data when stored in the memory device, transmitting, over a first channel for communicating data associated with access operations of the memory device, the first set of data, and transmitting, over a second channel, the codeword associated with the first set of data.

In some examples, the second channel may be for communicating error correction information associated with the access operations of the memory device. In some examples, the second channel includes an ECC channel. In some examples, the codeword may be configured for detecting or correcting errors associated with transmitting the first set of data over the first channel.

In some examples, the method may include generating a second codeword for error correction of the first set of data, or of the codeword, or of both based on at least the portion of the first set of data and the codeword, and transmitting the second codeword over the second channel.

In some examples, the method may include transmitting a message to the memory device indicating that transmissions communicated over the first channel may have one or more codewords for error correction communicated over the second channel, where generating the codeword may be based on transmitting the message.

In some examples, the method may include transmitting, to the memory device, a write command associated with the first set of data, where transmitting the first set of data and transmitting the codeword may be based on transmitting the write command. In some examples, the write command may be transmitted over a third channel for communicating commands or addresses associated with the access operations.

In some examples, the method may include dividing the first set of data into a set of portions where transmitting the first set of data over the first channel includes transmitting the set of portions over the first channel, and generating a set of codewords for error correction based on the set of portions, where transmitting the codeword over the second channel includes transmitting the set of codewords over the second channel. In some examples, a single codeword of the set of codewords may be generated for each portion of the set of portions. In some examples, the codeword may be associated with all of the first set of data.

In some examples, the method may include receiving a second set of data over the first channel, receiving a second codeword over the second channel, and determining whether the second set of data includes an error based on the second codeword. In some examples, the method may include receiving a third codeword for error correction of the second set of data, or of the second codeword, or of both over the second channel, and determining whether the second set of data or the second codeword includes a second error based on receiving the third codeword.

In some examples, the method may include determining that the second set of data may be the first set of data based on receiving the second codeword. In some examples, the method may include correcting the error in the second set of data based on determining that the second set of data includes the error, and generating the first set of data from the second set of data based on correcting the error.

In some examples, the method may include receiving a set of codewords over the second channel, each codeword of the set being associated with at least a portion of the second set of data received over the first channel, where determining whether the second set of data includes the error may be based on receiving the set of codewords. In some examples, the method may include transmitting a read command to the memory device, where receiving the second set of data may be based on transmitting the read command.

In some examples, the first set of data includes a single burst of data associated with the access operation. In some examples, the codeword includes a SEC ECC or a SECDED ECC. In some examples, the first set of data may be configured to be stored in the memory device as part of a write operation. In some examples, the codeword may be configured to be stored in the memory device.

In some examples, an apparatus or apparatuses as described herein may perform a method or methods, such as the method 1300. The apparatus may include features, controllers, circuits, means, or instructions (e.g., a non-transitory computer-readable medium storing instructions executable by a processor) for identifying a first set of data associated with an access operation of a memory device, generating, based on at least a portion of the first set of data, a codeword for detecting or correcting errors associated with corruption of the first set of data when stored in the memory device, transmitting, over a first channel for communicating data associated with access operations of the memory device, the first set of data, and transmitting, over a second channel, the codeword associated with the first set of data.

In some examples of the method, apparatuses, and non-transitory computer-readable medium described herein, the second channel may be for communicating error correction information associated with the access operations of the memory device. In some examples of the method, apparatuses, and non-transitory computer-readable medium described herein, the second channel includes an ECC channel.

In some examples of the method, apparatuses, and non-transitory computer-readable medium described herein, the codeword may be configured for detecting or correcting errors associated with transmitting the first set of data over the first channel.

Some examples of the method, apparatuses, and non-transitory computer-readable medium described herein may further include operations, features, controllers, circuits, means, or instructions for generating a second codeword for error correction of the first set of data, or of the codeword, or of both based on at least the portion of the first set of data and the codeword, and transmitting the second codeword over the second channel.

Some examples of the method, apparatuses, and non-transitory computer-readable medium described herein may further include operations, features, controllers, circuits, means, or instructions for transmitting a message to the memory device indicating that transmissions communicated over the first channel may have one or more codewords for error correction communicated over the second channel, where generating the codeword may be based on transmitting the message.

Some examples of the method, apparatuses, and non-transitory computer-readable medium described herein may further include operations, features, controllers, circuits, means, or instructions for transmitting, to the memory device, a write command associated with the first set of data, where transmitting the first set of data and transmitting the codeword may be based on transmitting the write command.

In some examples of the method, apparatuses, and non-transitory computer-readable medium described herein, the write command may be transmitted over a third channel for communicating commands or addresses associated with the access operations.

Some examples of the method, apparatuses, and non-transitory computer-readable medium described herein may further include operations, features, controllers, circuits, means, or instructions for dividing the first set of data into a set of portions where transmitting the first set of data over the first channel includes transmitting the set of portions over the first channel, and generating a set of codewords for error correction based on the set of portions, where transmitting the codeword over the second channel includes transmitting the set of codewords over the second channel.

In some examples of the method, apparatuses, and non-transitory computer-readable medium described herein, a single codeword of the set of codewords may be generated for each portion of the set of portions. In some examples of the method, apparatuses, and non-transitory computer-readable medium described herein, the codeword may be associated with all of the first set of data.

Some examples of the method, apparatuses, and non-transitory computer-readable medium described herein may further include operations, features, controllers, circuits, means, or instructions for receiving a second set of data over the first channel, receiving a second codeword over the second channel, and determining whether the second set of data includes an error based on the second codeword.

Some examples of the method, apparatuses, and non-transitory computer-readable medium described herein may further include operations, features, controllers, circuits, means, or instructions for receiving a third codeword for error correction of the second set of data, or of the second codeword, or of both over the second channel, and determining whether the second set of data or the second codeword includes a second error based on receiving the third codeword.

Some examples of the method, apparatuses, and non-transitory computer-readable medium described herein may further include operations, features, controllers, circuits, means, or instructions for determining that the second set of data may be the first set of data based on receiving the second codeword.

Some examples of the method, apparatuses, and non-transitory computer-readable medium described herein may further include operations, features, controllers, circuits, means, or instructions for correcting the error in the second set of data based on determining that the second set of data includes the error, and generating the first set of data from the second set of data based on correcting the error.

Some examples of the method, apparatuses, and non-transitory computer-readable medium described herein may further include operations, features, controllers, circuits, means, or instructions for receiving a set of codewords over the second channel, each codeword of the set being associated with at least a portion of the second set of data received over the first channel, where determining whether the second set of data includes the error may be based on receiving the set of codewords.

Some examples of the method, apparatuses, and non-transitory computer-readable medium described herein may further include operations, features, controllers, circuits, means, or instructions for transmitting a read command to the memory device, where receiving the second set of data may be based on transmitting the read command.

In some examples of the method, apparatuses, and non-transitory computer-readable medium described herein, the first set of data includes a single burst of data associated with the access operation. In some examples of the method, apparatuses, and non-transitory computer-readable medium described herein, the codeword includes a SEC ECC or a SECDED ECC.

In some examples of the method, apparatuses, and non-transitory computer-readable medium described herein, the first set of data may be configured to be stored in the memory device as part of a write operation. In some examples of the method, apparatuses, and non-transitory computer-readable medium described herein, the codeword may be configured to be stored in the memory device.

Figure 14:
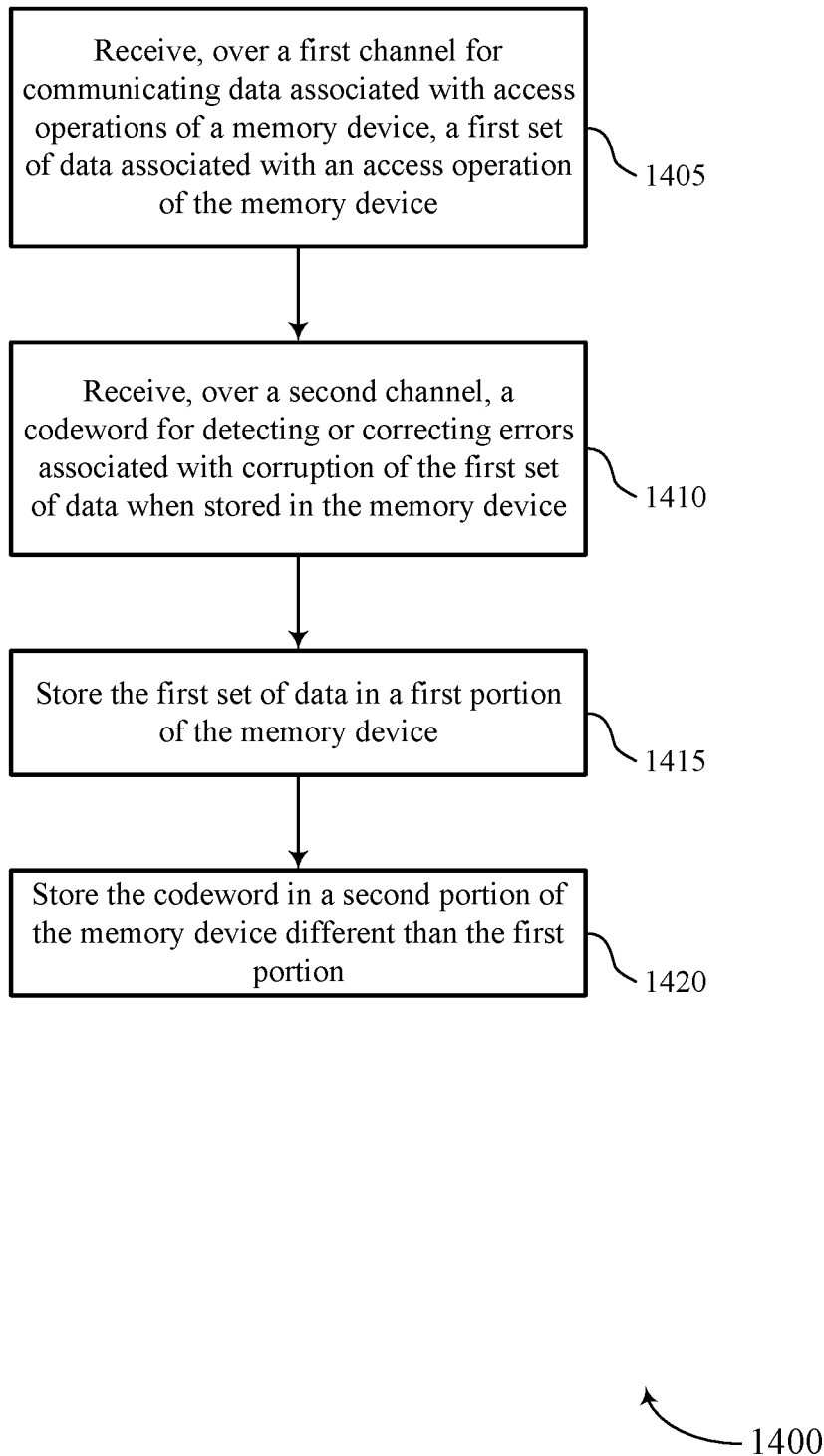

FIG. 14 shows a flowchart illustrating a method 1400 that supports methods and devices for error correction as disclosed herein. The operations of method 1400 may be implemented by a memory device or its components as described herein. For example, the operations of method 1400 may be performed by a memory device manager as described with reference to FIG. 10. In some examples, a memory device may execute a set of instructions to control the functional elements of the memory device to perform the functions described below. Additionally or alternatively, a memory device may perform aspects of the functions described below using special-purpose hardware.

At 1405, the memory device may receive, over a first channel for communicating data associated with access operations of a memory device, a first set of data associated with an access operation of the memory device. The operations of 1405 may be performed according to the methods described with reference to FIGS. 5 and 6. In some examples, aspects of the operations of 1405 may be performed by a data receiver as described with reference to FIG. 10.

At 1410, the memory device may receive, over a second channel, a codeword for detecting or correcting errors associated with corruption of the first set of data when stored in the memory device. The operations of 1410 may be performed according to the methods described with reference to FIGS. 5 and 6. In some examples, aspects of the operations of 1410 may be performed by a codeword receiver as described with reference to FIG. 10.

At 1415, the memory device may store the first set of data in a first portion of the memory device. The operations of 1415 may be performed according to the methods described with reference to FIGS. 5 and 6. In some examples, aspects of the operations of 1415 may be performed by a data storage component as described with reference to FIG. 10.

At 1420, the memory device may store the codeword in a second portion of the memory device different than the first portion. The operations of 1420 may be performed according to the methods described with reference to FIGS. 5 and 6. In some examples, aspects of the operations of 1420 may be performed by a codeword storage component as described with reference to FIG. 10.

In some examples, the method may include receiving, over a first channel for communicating data associated with access operations of a memory device, a first set of data associated with an access operation of the memory device, receiving, over a second channel, a codeword for detecting or correcting errors associated with corruption of the first set of data when stored in the memory device, storing the first set of data in a first portion of the memory device, and storing the codeword in a second portion of the memory device different than the first portion.

In some examples, the second channel may be for communicating error correction information associated with the access operations of the memory device. In some examples, the second channel includes a link ECC channel. In some examples, the codeword may be configured for detecting or correcting errors associated with receiving the first set of data over the first channel.

In some examples, the method may include receiving, over the second channel, a second codeword for error correction of the first set of data, or of the codeword, or of both, and storing the second codeword in the memory device. In some examples, the method may include storing the second codeword in a third portion of the memory device different than the first portion or the second portion.

In some examples, the method may include generating a second codeword for error correction of the first set of data, or of the codeword, or of both based on the first set of data and the codeword, and storing the second codeword in the memory device. In some examples, the method may include receiving a message from a host device indicating that transmissions communicated over the first channel may have one or more codewords for error correction communicated over the second channel, where receiving the first set of data may be based on receiving the message.

In some examples, the method may include configuring a receiver of the memory device based on receiving the message, where receiving the first set of data or receiving the codeword may be based on configuring the receiver. In some examples, the method may include receiving, from a host device, a write command associated with the first set of data, where receiving the first set of data, or of receiving the codeword, or of both may be based on receiving the write command.

In some examples, the method may include identifying a set of codewords in the first set of data, each codeword of the set being associated with at least a portion a portion of the first set of data, where storing the codeword in the second portion of the memory device further includes storing the set of codewords in the second portion of the memory device.

In some examples, the codeword may be associated with all of the first set of data. In some examples, the method may include retrieving a second set of data from the first portion of the memory device, retrieving a second codeword for error correction of the second set of data from the second portion of the memory device, transmitting, over the first channel, the second set of data to a host device, and transmitting, over the second channel, the second codeword to the host device. In some examples, the method may include retrieving a third codeword from the memory device for error correction of the second set of data, or of the second codeword, or of both, and transmitting, over the second channel, the third codeword to the host device.

In some examples, the method may include retrieving a third codeword from the memory device for error correction of the second set of data, or of the second codeword, or of both, and determining whether the second set of data or the second codeword includes an error, where transmitting the second set of data may be based on determining that the second set of data or the second codeword includes the error.

In some examples, the method may include correcting the error in the second set of data or the second codeword based on determining the second set of data or the second codeword includes the error, where transmitting the second set of data may be based on correcting the error. In some examples, the method may include retrieving a set of portions of the second set of data from the memory device, where transmitting the second set of data further includes transmitting the set of portions over the first channel, and retrieving a set of codewords from the memory device, each codeword of the set being associated with at least a portion of the second set of data, where transmitting the second codeword further includes transmitting the set of codewords over the second channel.

In some examples, the method may include receiving a read command from the host device, where retrieving the second set of data and retrieving the second codeword may be based on receiving the read command. In some examples, receiving the first set of data over the first channel may include receiving the first set of data as a single burst of data over the first channel. In some examples, receiving the codeword over the second channel may include receiving the codeword as a single burst of data over the second channel.

In some examples, the codeword includes a SEC ECC or a SECDED ECC. In some examples, the first set of data may be configured to be stored in the memory device as part of a write operation. In some examples, the codeword may be configured to be stored in the memory device.

In some examples, an apparatus or apparatuses as described herein may perform a method or methods, such as the method 1400. The apparatus may include features, controllers, circuits, means, or instructions (e.g., a non-transitory computer-readable medium storing instructions executable by a processor) for receiving, over a first channel for communicating data associated with access operations of a memory device, a first set of data associated with an access operation of the memory device, receiving, over a second channel, a codeword for detecting or correcting errors associated with corruption of the first set of data when stored in the memory device, storing the first set of data in a first portion of the memory device, and storing the codeword in a second portion of the memory device different than the first portion.

In some examples of the method, apparatuses, and non-transitory computer-readable medium described herein, the second channel may be for communicating error correction information associated with the access operations of the memory device. In some examples of the method, apparatuses, and non-transitory computer-readable medium described herein, the second channel includes a link ECC channel. In some examples of the method, apparatuses, and non-transitory computer-readable medium described herein, the codeword may be configured for detecting or correcting errors associated with receiving the first set of data over the first channel.

Some examples of the method, apparatuses, and non-transitory computer-readable medium described herein may further include operations, features, controllers, circuits, means, or instructions for receiving, over the second channel, a second codeword for error correction of the first set of data, or of the codeword, or of both, and storing the second codeword in the memory device.

In some examples of the method, apparatuses, and non-transitory computer-readable medium described herein, storing the second codeword may include operations, features, controllers, circuits, means, or instructions for storing the second codeword in a third portion of the memory device different than the first portion or the second portion.

Some examples of the method, apparatuses, and non-transitory computer-readable medium described herein may further include operations, features, controllers, circuits, means, or instructions for generating a second codeword for error correction of the first set of data, or of the codeword, or of both based on the first set of data and the codeword, and storing the second codeword in the memory device.

Some examples of the method, apparatuses, and non-transitory computer-readable medium described herein may further include operations, features, controllers, circuits, means, or instructions for receiving a message from a host device indicating that transmissions communicated over the first channel may have one or more codewords for error correction communicated over the second channel, where receiving the first set of data may be based on receiving the message.

Some examples of the method, apparatuses, and non-transitory computer-readable medium described herein may further include operations, features, controllers, circuits, means, or instructions for configuring a receiver of the memory device based on receiving the message, where receiving the first set of data or receiving the codeword may be based on configuring the receiver.

Some examples of the method, apparatuses, and non-transitory computer-readable medium described herein may further include operations, features, controllers, circuits, means, or instructions for receiving, from a host device, a write command associated with the first set of data, where receiving the first set of data, or of receiving the codeword, or of both may be based on receiving the write command.

Some examples of the method, apparatuses, and non-transitory computer-readable medium described herein may further include operations, features, controllers, circuits, means, or instructions for identifying a set of codewords in the first set of data, each codeword of the set being associated with at least a portion a portion of the first set of data, where storing the codeword in the second portion of the memory device further includes storing the set of codewords in the second portion of the memory device.

In some examples of the method, apparatuses, and non-transitory computer-readable medium described herein, the codeword may be associated with all of the first set of data. Some examples of the method, apparatuses, and non-transitory computer-readable medium described herein may further include operations, features, controllers, circuits, means, or instructions for retrieving a second set of data from the first portion of the memory device, retrieving a second codeword for error correction of the second set of data from the second portion of the memory device, transmitting, over the first channel, the second set of data to a host device, and transmitting, over the second channel, the second codeword to the host device.

Some examples of the method, apparatuses, and non-transitory computer-readable medium described herein may further include operations, features, controllers, circuits, means, or instructions for retrieving a third codeword from the memory device for error correction of the second set of data, or of the second codeword, or of both, and transmitting, over the second channel, the third codeword to the host device.

Some examples of the method, apparatuses, and non-transitory computer-readable medium described herein may further include operations, features, controllers, circuits, means, or instructions for retrieving a third codeword from the memory device for error correction of the second set of data, or of the second codeword, or of both, and determining whether the second set of data or the second codeword includes an error, where transmitting the second set of data may be based on determining that the second set of data or the second codeword includes the error.

Some examples of the method, apparatuses, and non-transitory computer-readable medium described herein may further include operations, features, controllers, circuits, means, or instructions for correcting the error in the second set of data or the second codeword based on determining the second set of data or the second codeword includes the error, where transmitting the second set of data may be based on correcting the error.

Some examples of the method, apparatuses, and non-transitory computer-readable medium described herein may further include operations, features, controllers, circuits, means, or instructions for retrieving a set of portions of the second set of data from the memory device, where transmitting the second set of data further includes transmitting the set of portions over the first channel, and retrieving a set of codewords from the memory device, each codeword of the set being associated with at least a portion of the second set of data, where transmitting the second codeword further includes transmitting the set of codewords over the second channel.

Some examples of the method, apparatuses, and non-transitory computer-readable medium described herein may further include operations, features, controllers, circuits, means, or instructions for receiving a read command from the host device, where retrieving the second set of data and retrieving the second codeword may be based on receiving the read command.

In some examples of the method, apparatuses, and non-transitory computer-readable medium described herein, receiving the first set of data over the first channel may include operations, features, controllers, circuits, means, or instructions for receiving the first set of data as a single burst of data over the first channel.

In some examples of the method, apparatuses, and non-transitory computer-readable medium described herein, receiving the codeword over the second channel may include operations, features, controllers, circuits, means, or instructions for receiving the codeword as a single burst of data over the second channel.

In some examples of the method, apparatuses, and non-transitory computer-readable medium described herein, the codeword includes a SEC ECC or a SECDED ECC. In some examples of the method, apparatuses, and non-transitory computer-readable medium described herein, the first set of data may be configured to be stored in the memory device as part of a write operation. In some examples of the method, apparatuses, and non-transitory computer-readable medium described herein, the codeword may be configured to be stored in the memory device.

It should be noted that the methods described herein describe possible implementations, and that the operations and the steps may be rearranged or otherwise modified and that other implementations are possible. Further, aspects from two or more of the methods may be combined.

In some examples, an apparatus or device may perform aspects of the functions described herein using general- or special-purpose hardware. The apparatus or device may include a host device, a memory device including an array of memory cells for storing data associated with the host device and one or more codewords for error detection or correction, and one or more channels for communicating the data and the one or more codewords between the host device and the memory device.

In some examples, the one or more codewords and the data may be communicated over a first channel of the one or more channels. In some examples, the one or more codewords and the data may be transmitted over a first channel in a single burst having a first burst length. In some examples, the first burst length of the single burst may be greater than a second burst length that corresponds to the data.

In some examples, the data may be communicated over a first channel of the one or more channels and the one or more codewords may be communicated over a second channel of the one or more channels different than the first channel. In some examples, the second channel may be a link ECC channel.

In some examples, the data may be communicated over the first channel during a same burst interval used to communicate the one or more codewords over the second channel. In some examples the apparatus or device may include a receiving component configured to receive the data and the one or more codewords and configured to send the one or more codewords to the array of memory cells.

In some examples the apparatus or device may include a conductive line for communicating the one or more codewords between the receiving component and the array of memory cells, where the one or more codewords may be stored in the array of memory cells. In some examples, the receiving component of the memory device includes a de-serializer coupled with the one or more channels.

In some examples the apparatus or device may include a component for detecting or correcting errors based on receiving the one or more codewords. In some examples the apparatus or device may include a component for decoding data bus inversion data. In some examples the apparatus or device may include a transmitting component configured to transmit the data and the one or more codewords stored in the array of memory cells to the host device.

In some examples the apparatus or device may include a conductive line for communicating the one or more codewords between the transmitting component and the array of memory cells, where the one or more codewords may be retrieved from the array of memory cells. In some examples, the transmitting component of the memory device includes a serializer coupled with the one or more channels. In some examples the apparatus or device may include a component for encoding data bus inversion data.

In some examples, an apparatus or device may perform aspects of the functions described herein using general- or special-purpose hardware. The apparatus or device may include an array of memory cells for storing data and one or more codewords for error detection or correction associated with the data, a receiving component configured to receive the data and the one or more codewords and configured to send the one or more codewords to the array of memory cells, and a conductive line for communicating the one or more codewords between the receiving component and the array of memory cells.

In some examples, the receiving component includes a de-serializer coupled with one or more channels. In some examples, the apparatus or device may include a component for detecting or correcting errors based on receiving the one or more codewords. In some examples, the apparatus or device may include a component for decoding data bus inversion data.

In some examples, the apparatus or device may include a component for encoding data bus inversion data. In some examples, the apparatus or device may include a transmitting component configured to transmit the data and the one or more codewords stored in the array of memory cells to a host device.

In some examples, the apparatus or device may include a second conductive line for communicating the one or more codewords between the transmitting component and the array of memory cells, where the one or more codewords may be retrieved from the array of memory cells. In some examples, the transmitting component includes a serializer coupled with one or more channels.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" used herein refers to a stratum or sheet of a geometrical structure. each layer may have three dimensions (e.g., height, width, and depth) and may cover at least a portion of a surface. For example, a layer may be a three-dimensional structure where two dimensions are greater than a third, e.g., a thin-film. Layers may include different elements, components, and/or materials. In some cases, one layer may be composed of two or more sublayers. In some of the appended figures, two dimensions of a three-dimensional layer are depicted for purposes of illustration. Those skilled in the art will, however, recognize that the layers are three-dimensional in nature.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   identifying a first set of data for communicating over a first channel between a memory device and a host device, the first channel associated with a channel width and the first set of data corresponding to a first burst length;
   generating a first codeword for error correction or error detection based at least in part on at least a portion of the first set of data;
   generating a second codeword for error correction or error detection based at least in part on the at least the portion of the first set of data and the first codeword; and
   transmitting, from the memory device or the host device, a second set of data that includes the first set of data, the first codeword, and the second codeword.

2. The method of claim 1, further comprising:
   generating the second codeword for error correction or error detection of the first set of data, the first codeword, or both, wherein generating the second codeword is based at least in part on generating the second codeword for error correction or error detection of the first set of data, the first codeword, or both.

3. The method of claim 1, further comprising:
   transmitting the second set of data over the first channel, wherein transmitting the second set of data is based at least in part on transmitting the second set of data over the first channel.

4. The method of claim 3, further comprising:
   transmitting the second set of data using a second burst length that is greater than the first burst length, wherein transmitting the second set of data is based at least in part on transmitting the second set of data using the second burst length.

5. The method of claim 1, further comprising:
   transmitting the first set of data over the first channel; and
   transmitting the first codeword and the second codeword over a second channel different than the first channel, wherein transmitting the second set of data is based at least in part on transmitting the first set of data over the first channel and transmitting the first codeword and the second codeword over the second channel.

6. The method of claim 5, further comprising:
   transmitting the first set of data using the first burst length; and
   transmitting the first codeword and the second codeword using the first burst length, wherein transmitting the second set of data is based at least in part on transmitting the first set of data using the first burst length and transmitting the first codeword and the second codeword using the first burst length.

7. The method of claim 1, further comprising:
   extending the channel width of the first channel to include the first codeword and the second codeword; and
   transmitting the second set of data over the first channel using the extended channel width.

8. The method of claim 7, further comprising:
   increasing a quantity of pins associated with the channel width by one or more pins, wherein extending the channel width to include the first codeword and the second codeword is based at least in part on increasing the quantity of pins associated with the channel width.

9. The method of claim 1, further comprising:
   dividing the first set of data into a plurality of portions; and
   generating a first plurality of codewords and a second plurality of codewords for error correction or error detection based at least in part on the plurality of portions, wherein the first plurality of codewords comprises the first codeword and the second plurality of codewords comprises the second codeword, and wherein the second set of data includes the first plurality of codewords and the second plurality of codewords.

10. An apparatus, comprising:
    a memory controller configured to cause the apparatus to:
    identify a first set of data for communicating over a first channel between a memory device and a host device, the first channel associated with a channel width and the first set of data corresponding to a first burst length;
    generate a first codeword for error correction or error detection based at least in part on at least a portion of the first set of data;
    generate a second codeword for error correction or error detection based at least in part on the at least the portion of the first set of data and the first codeword; and
    transmit, from the memory device or the host device, a second set of data that includes the first set of data, the first codeword, and the second codeword.

11. The apparatus of claim 10, wherein the memory controller is further configured to cause the apparatus to:
    generate the second codeword for error correction or error detection of the first set of data, the first codeword, or both, wherein generating the second codeword is based at least in part on generating the second codeword for error correction or error detection of the first set of data, the first codeword, or both.

12. The apparatus of claim 10, wherein the memory controller is further configured to cause the apparatus to:
transmit the second set of data over the first channel, wherein transmitting the second set of data is based at least in part on transmitting the second set of data over the first channel.

13. The apparatus of claim 12, wherein the memory controller is further configured to cause the apparatus to:
transmit the second set of data using a second burst length that is greater than the first burst length, wherein transmitting the second set of data is based at least in part on transmitting the second set of data using the second burst length.

14. The apparatus of claim 10, wherein the memory controller is further configured to cause the apparatus to:
transmit the first set of data over the first channel; and
transmit the first codeword and the second codeword over a second channel different than the first channel, wherein transmitting the second set of data is based at least in part on transmitting the first set of data over the first channel and transmitting the first codeword and the second codeword over the second channel.

15. The apparatus of claim 14, wherein the memory controller is further configured to cause the apparatus to:
transmit the first set of data using the first burst length; and
transmit the first codeword and the second codeword using the first burst length, wherein transmitting the second set of data is based at least in part on transmitting the first set of data using the first burst length and transmitting the first codeword and the second codeword using the first burst length.

16. The apparatus of claim 10, wherein the memory controller is further configured to cause the apparatus to:
extend the channel width of the first channel to include the first codeword and the second codeword; and
transmit the second set of data over the first channel using the extended channel width.

17. The apparatus of claim 16, wherein the memory controller is further configured to cause the apparatus to:
increase a quantity of pins associated with the channel width by one or more pins, wherein extending the channel width to include the first codeword and the second codeword is based at least in part on increasing the quantity of pins associated with the channel width.

18. The apparatus of claim 10, wherein the memory controller is further configured to cause the apparatus to:
divide the first set of data into a plurality of portions; and
generate a first plurality of codewords and a second plurality of codewords for error correction or error detection based at least in part on the plurality of portions, wherein the first plurality of codewords comprises the first codeword and the second plurality of codewords comprises the second codeword, and wherein the second set of data includes the first plurality of codewords and the second plurality of codewords.

19. A method, comprising:
receiving a first set of data over a first channel associated with a first channel width, the first set of data corresponding to a first burst length;
identifying, in the first set of data, a first codeword for error correction or error detection of a second set of data included in the first set of data and a second codeword associated with the first codeword and the second set of data; and
writing the second set of data, the first codeword, and the second codeword to one or more portions of a memory device.

20. The method of claim 19, further comprising:
writing the first set of data to a first portion of the memory device;
writing the first codeword to a second portion of the memory device different than the first portion of the memory device; and
writing the second codeword to a third portion of the memory device different than the first portion of the memory device and the second portion of the memory device.

* * * * *